US010676023B2

(12) United States Patent
Tatara et al.

(10) Patent No.: US 10,676,023 B2
(45) Date of Patent: Jun. 9, 2020

(54) VEHICLE LIGHTING SYSTEM, VEHICLE SYSTEM, AND VEHICLE

(71) Applicant: KOITO MANUFACTURING CO., LTD., Tokyo (JP)

(72) Inventors: Naoki Tatara, Shizuoka (JP); Toshihiro Okamura, Shizuoka (JP); Takeshi Masuda, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 16/321,751

(22) PCT Filed: Jul. 14, 2017

(86) PCT No.: PCT/JP2017/025718
§ 371 (c)(1),
(2) Date: Jan. 29, 2019

(87) PCT Pub. No.: WO2018/021063
PCT Pub. Date: Feb. 1, 2018

(65) Prior Publication Data
US 2019/0168664 A1 Jun. 6, 2019

(30) Foreign Application Priority Data

Jul. 29, 2016 (JP) ................................ 2016-149947
Jul. 29, 2016 (JP) ................................ 2016-149948
(Continued)

(51) Int. Cl.
B60Q 1/50 (2006.01)
B60Q 1/04 (2006.01)
(Continued)

(52) U.S. Cl.
CPC ............. *B60Q 1/50* (2013.01); *B60Q 1/0408* (2013.01); *B60Q 1/445* (2013.01); *B60Q 9/008* (2013.01)

(58) Field of Classification Search
CPC ........ B60Q 1/50; B60Q 1/0408; B60Q 1/445; B60Q 9/008
See application file for complete search history.

(56) References Cited

U.S. PATENT DOCUMENTS

2009/0206758 A1* 8/2009 Kobilke .................... F21K 9/00
315/113
2011/0080753 A1* 4/2011 Hering ..................... B60Q 1/20
362/545
(Continued)

FOREIGN PATENT DOCUMENTS

EP 3357754 A1 8/2018
GB 2531084 A 4/2016
(Continued)

OTHER PUBLICATIONS

International Search Report issued in Application No. PCT/JP2017/025718, dated Oct. 3, 2017 (5 pages).
(Continued)

Primary Examiner — Jong-Suk (James) Lee
Assistant Examiner — Christopher E Dunay
(74) Attorney, Agent, or Firm — Osha Liang LLP

(57) ABSTRACT

A vehicle illumination system for a vehicle capable of traveling in an automatic driving mode includes a left-side communication support lamp and a right-side communication support lamp configured to lit light toward an outside of the vehicle and arranged to be visually recognized from the front of the vehicle, and an illumination controller configured to, when the vehicle detects a target object, change an illumination state of at least one of the left-side communication support lamp and the right-side communication sup-
(Continued)

port lamp. Each of the left-side communication support lamp and the right-side communication support lamp includes a plurality of light-emitting segments arranged side by side in a right and left direction of the vehicle. The illumination controller is configured to change an illumination state of each of the plurality of light-emitting segments.

16 Claims, 29 Drawing Sheets

(30) Foreign Application Priority Data

| Jul. 29, 2016 | (JP) | ................................ | 2016-149949 |
| Jul. 29, 2016 | (JP) | ................................ | 2016-149950 |
| Jul. 29, 2016 | (JP) | ................................ | 2016-149951 |

(51) Int. Cl.
*B60Q 1/44* (2006.01)
*B60Q 9/00* (2006.01)

(56) References Cited

U.S. PATENT DOCUMENTS

| 2013/0135885 A1* | 5/2013 | Anzai ................... B60Q 1/0011 362/511 |
| 2013/0163273 A1* | 6/2013 | Ticktin ..................... F21V 5/04 362/555 |
| 2014/0016335 A1* | 1/2014 | Cho ........................ B60Q 1/06 362/466 |
| 2014/0264395 A1* | 9/2014 | Lee ......................... H01L 27/15 257/88 |
| 2015/0228195 A1 | 8/2015 | Beaurepaire et al. |
| 2015/0258928 A1* | 9/2015 | Goto ..................... B60Q 1/085 701/49 |
| 2016/0061396 A1* | 3/2016 | Bosua .................... G08C 23/04 362/231 |
| 2016/0323972 A1* | 11/2016 | Bora .................. H05B 33/0842 |
| 2017/0067609 A1 | 3/2017 | Ichikawa et al. |
| 2019/0268981 A1* | 8/2019 | Diep ..................... F21S 10/023 |
| 2019/0315271 A1* | 10/2019 | Tatara ..................... B60Q 1/50 |
| 2019/0327814 A1* | 10/2019 | Altinger .................. B60Q 3/80 |

FOREIGN PATENT DOCUMENTS

| JP | H09-277887 A | 10/1997 |
| JP | 2004-051080 A | 2/2004 |
| JP | 2008-081084 A | 4/2008 |
| JP | 2008-287669 A | 11/2008 |
| JP | 2011-521435 A | 7/2011 |
| JP | 2015-164828 A | 9/2015 |
| JP | 2015-174541 A | 10/2015 |
| JP | 2015-186944 A | 10/2015 |

OTHER PUBLICATIONS

Written Opinion issued in International Application No. PCT/JP2017/025718, dated Oct. 3, 2017 (17 pages).
Partial Supplementary European Search Report issued in European Application No. 17834071.7, dated Mar. 9, 2020 (17 pages).

* cited by examiner

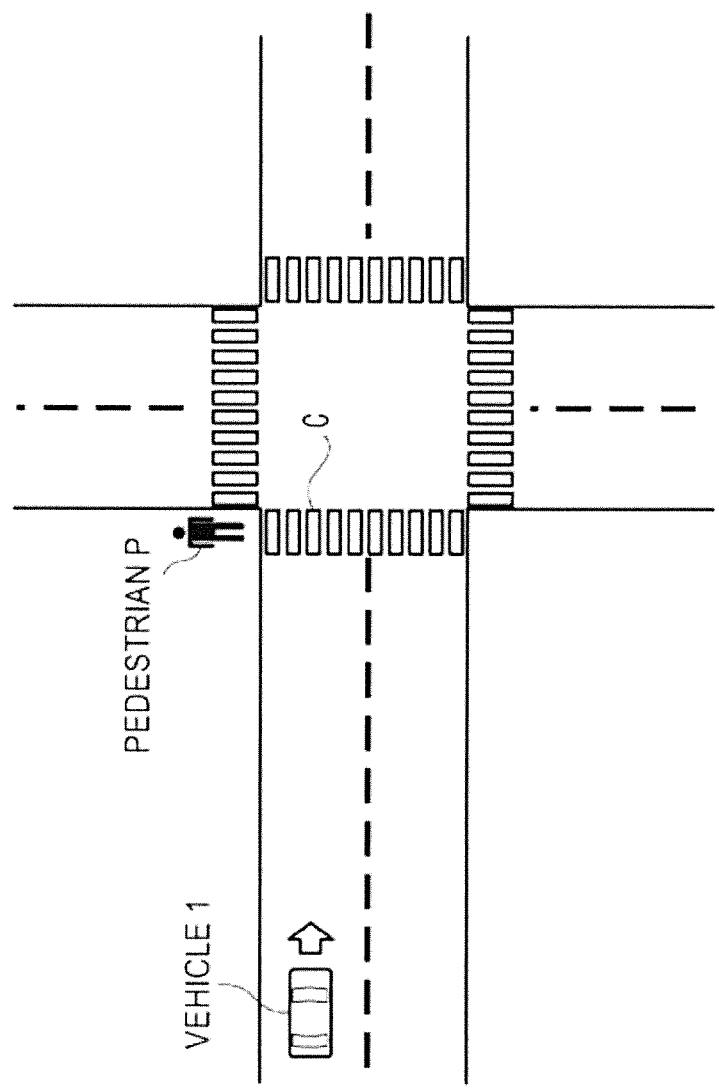
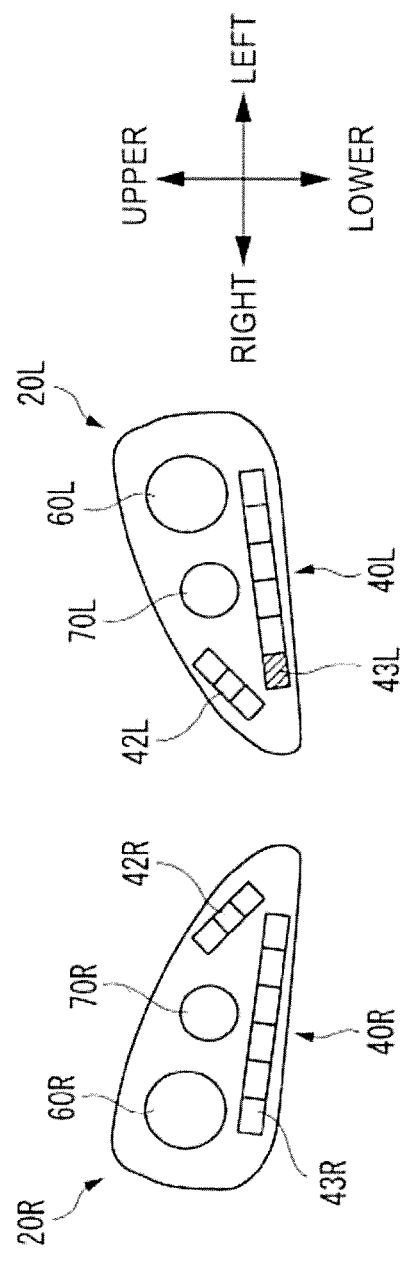
FIG.6A
FIG.6B

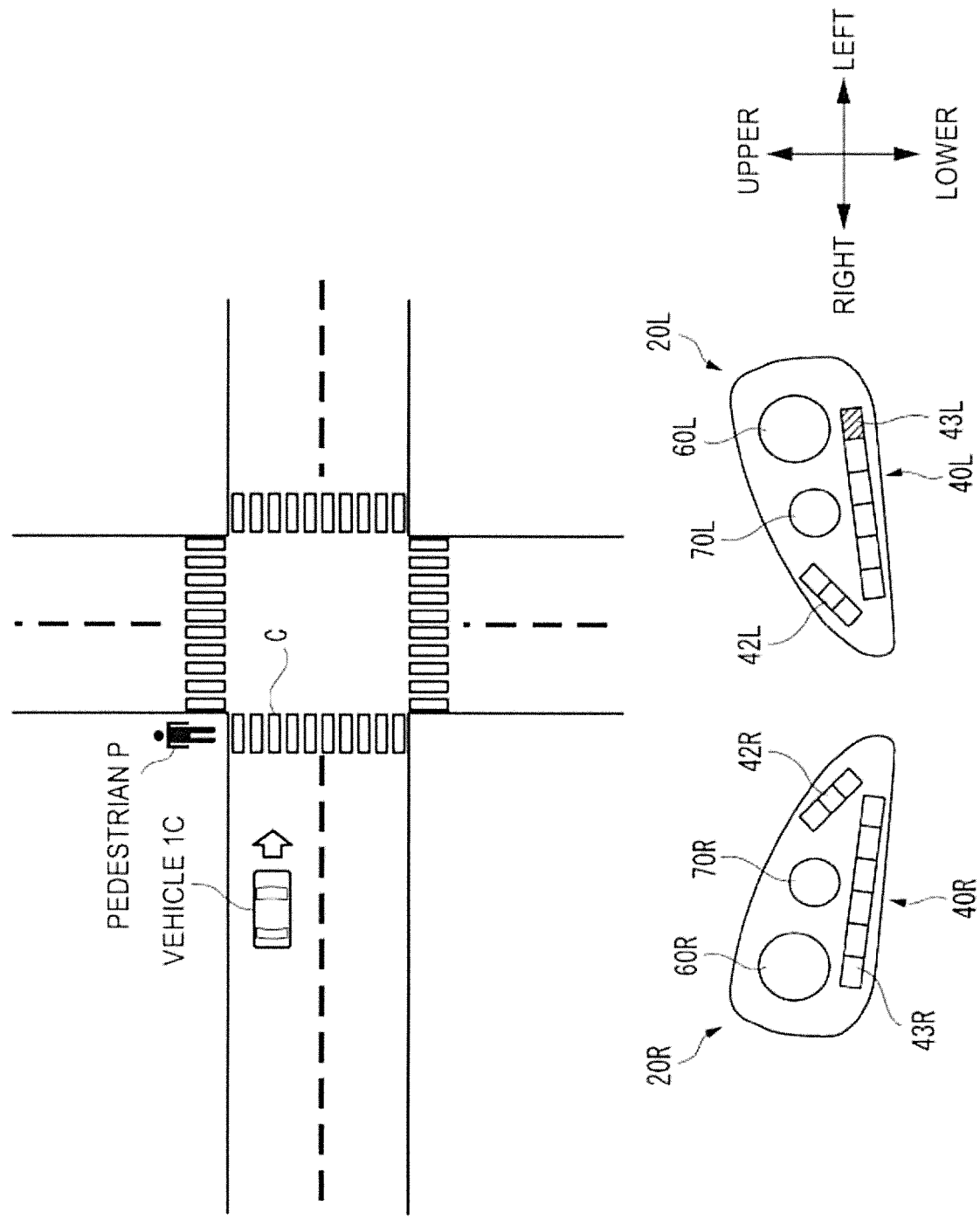

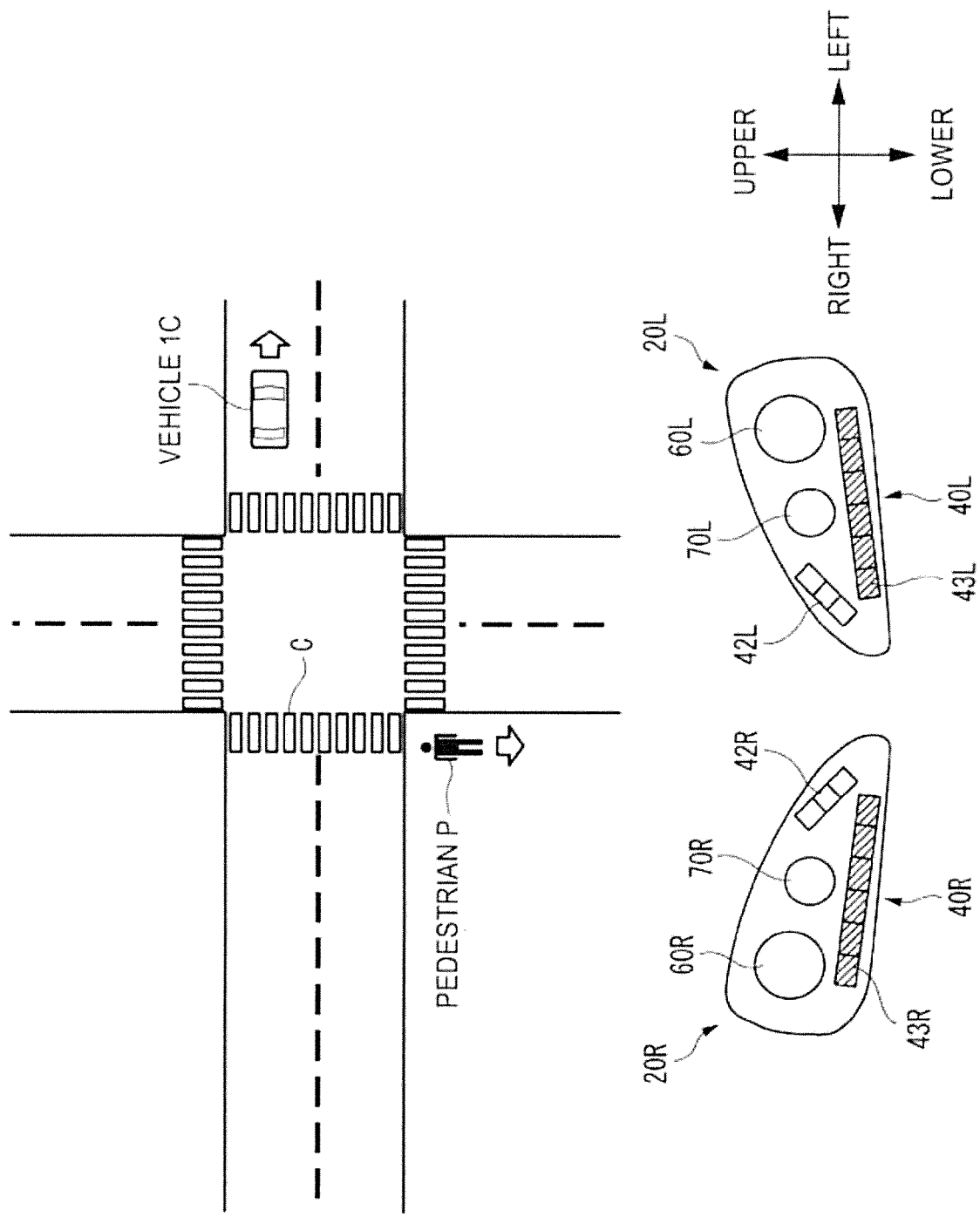

VEHICLE LIGHTING SYSTEM, VEHICLE SYSTEM, AND VEHICLE

CROSS-REFERENCE TO RELATED APPLICATIONS

The present application is a national stage application of PCT/JP2017/025718, which claims priority to Japanese Patent Application No. 2016-149947 filed on Jul. 29, 2016, Japanese Patent Application No. 2016-149948 filed on Jul. 29, 2016, Japanese Patent Application No. 2016-149949 filed on Jul. 29, 2016, Japanese Patent Application No. 2016-149950 filed on Jul. 29, 2016, and Japanese Patent Application No. 2016-149951 filed on Jul. 29, 2016, the contents of which are incorporated herein in their entirety.

BACKGROUND

Technical Field

The present disclosure relates to a vehicle illumination system. In particular, the present disclosure relates to a vehicle illumination system provided to a vehicle capable of traveling in an automatic driving mode. Also, the present disclosure relates to a vehicle system having the vehicle illumination system, and a vehicle having the vehicle system.

Related Art

Currently, research on an automatic driving technology of an automobile has been actively conducted in each country, and each country is considering the legislation so as to enable a vehicle (hereinafter, a "vehicle" refer to an automobile) to travel in an automatic driving mode on public roads. Here, in the automatic driving mode, a vehicle system automatically controls traveling of a vehicle. Specifically, in the automatic driving mode, the vehicle system automatically performs at least one of a steering control (control of a traveling direction of the vehicle), a brake control and an accelerator control (control of braking and acceleration/deceleration of the vehicle) based on various information obtained from a camera, a sensor, a radar and the like. On the other hand, in a manual driving mode to be described later, a driver controls the traveling of the vehicle, as in most of conventional vehicles. Specifically, in the manual driving mode, the traveling of the vehicle is controlled in conformity with a driver's operation (a steering operation, a braking operation, and an accelerator operation), and the vehicle system does not automatically perform the steering control, the brake control and the accelerator control. Meanwhile, the driving mode of the vehicle is not a concept existing only in some vehicles but a concept existing in all vehicles including conventional vehicles having no automatic driving function. For example, the driving mode of the vehicle is classified in accordance with a vehicle control method or the like.

Thus, in the future, it is expected that vehicles traveling in the automatic driving mode (hereinafter, appropriately referred to as "automatic driving vehicle") and vehicles traveling in the manual driving mode (hereinafter, appropriately referred to as "manual driving vehicle") coexist on public roads. Particularly, in a situation where many automatic driving vehicles are traveling on the public roads, it is preferably to present information, which indicates that the automatic driving vehicle recognizes a pedestrian and the like.

For example, when there is a pedestrian who intends to cross a crosswalk in front of the automatic driving vehicle, the pedestrian may be anxious about whether or not the pedestrian can cross the crosswalk, if the pedestrian does not know that the automatic driving vehicle recognizes the pedestrian.

In the meantime, Patent Document 1 discloses an automatic follow-up traveling system in which a following vehicle can automatically follow a preceding vehicle. In the automatic follow-up traveling system, each of the preceding vehicle and the following vehicle has an illumination system, character information for preventing the other vehicle from intruding between the preceding vehicle and the following vehicle is displayed on the illumination system of the preceding vehicle, and character information indicative of the automatic follow-up traveling mode is displayed on the illumination system of the following vehicle.

CITATION LIST

Patent Documents

Patent Document 1: JP-A-H09-277887

SUMMARY OF THE INVENTION

However, Patent Document 1 does not consider a vehicle illumination system and a vehicle system capable of presenting information, which indicates that the automatic driving vehicle recognizes a target object such as the pedestrian, the other vehicle and the like, to the target object. In the meantime, if the information, which indicates that the automatic driving vehicle recognizes the target object, can be presented to the target object, it is possible to beforehand prevent a traffic trouble that will occur between the target object and the automatic driving vehicle.

Also, in Patent Document 1, a display device for displaying the character information for preventing the other vehicle from intruding is mounted on a vehicle body roof of the vehicle, so that it is necessary to secure a space for mounting therein the display device. Like this, when the display device is arranged on the vehicle body roof, a dimension of the vehicle in a height direction increases and an outer appearance of the vehicle is also poor. Also, it is necessary to separately mount the display device to the vehicle, in addition to existing lamps (for example, a daytime running lamp (DRL), a turn signal lamp (TSR), a clearance lamp and the like), so that the total number of lamps to be mounted increases.

Also, in Patent Document 1, when the display device mounted in each of the preceding vehicle and the following vehicle is out of order, inter-vehicle communication cannot be performed because there is no separate backup display device. As a result, the other vehicle may intrude between the preceding vehicle and the following vehicle, so that the traveling safety of the following vehicle is degraded.

Meanwhile, in an automatic driving vehicle including an illumination system having a pedestrian-to-vehicle communication function, when the illumination system is out of order and a separate device configured to perform pedestrian-to-vehicle communication is not provided to the automatic driving vehicle, a possibility that the automatic driving vehicle may cause a traffic trouble with the pedestrian may increase. For this reason, for example, it is preferably to increase reliability of the pedestrian-to-vehicle communication function by doubling the device configured to perform pedestrian-to-vehicle communication.

The present disclosure is to provide a vehicle illumination system capable of presenting information, which indicates that a vehicle capable of traveling in an automatic driving mode recognizes a target object, to the target object. Also, the present disclosure is to provide a vehicle system capable of increasing reliability of a communication function between a vehicle and a target object.

A vehicle illumination system relating to a first aspect of the present disclosure is provided to a vehicle capable of traveling in an automatic driving mode, and includes: a left-side communication support lamp and a right-side communication support lamp configured to emit light toward an outside of the vehicle and arranged to be visually recognized from the front of the vehicle, and an illumination control unit configured to, when the vehicle detects a target object, change an illumination state of at least one of the left-side communication support lamp and the right-side communication support lamp, wherein each of the left-side communication support lamp and the right-side communication support lamp includes a plurality of light-emitting segments arranged side by side in a right and left direction of the vehicle, and wherein the illumination control unit is configured to change an illumination state of each of the plurality of light-emitting segments.

According to the above configuration, when the vehicle detects the target object such as a pedestrian, other vehicle and the like, the illumination control unit changes the illumination state of at least one of the left-side communication support lamp and the right-side communication support lamp. In this way, it is possible to provide the vehicle illumination system capable of presenting information, which indicates that the vehicle capable of traveling in the automatic driving mode recognizes the target object, to the target object. Also, since the target object can perceive that the vehicle recognizes the target object by seeing the change in the illumination state of at least one of the left-side communication support lamp and the right-side communication support lamp, the target object can feel relieved.

Also, the illumination control unit may be configured to change the illumination state of at least one of the left-side communication support lamp and the right-side communication support lamp, in correspondence to a relative positional relation between the vehicle and the target object.

According to the above configuration, the illumination state of at least one of the left-side communication support lamp and the right-side communication support lamp is changed, in correspondence to the relative positional relation between the vehicle and the target object. In this way, since the target object can perceive that the vehicle approaching the target object recognizes the target object, the target object can feel relieved.

Also, the illumination control unit may be configured to sequentially change a light-emitting segment, which is to be turned on or turned off, of the plurality of light-emitting segments of at least one of the left-side communication support lamp and the right-side communication support lamp, in correspondence to the relative positional relation between the vehicle and the target object.

According to the above configuration, the light-emitting segment, which is to be turned on or turned off, of the plurality of light-emitting segments of at least one of the left-side communication support lamp and the right-side communication support lamp is sequentially changed, in correspondence to the relative positional relation between the vehicle and the target object. In this way, since the target object can perceive that the vehicle approaching the target object recognizes the target object, the target object can feel relieved.

Also, when the vehicle stops after detecting the target object, the illumination control unit may change the illumination states of the left-side communication support lamp and the right-side communication support lamp.

According to the above configuration, when the vehicle stops after detecting the target object, the illumination states of the left-side communication support lamp and the right-side communication support lamp are changed. In this way, since the target object in the vicinity of a crosswalk can perceive that the vehicle recognizes the target object by seeing the change in the illumination states of the left-side communication support lamp and the right-side communication support lamp, the target object can cross in relief the crosswalk. As a result, the target object is urged to cross the crosswalk by the change in the illumination states of the left-side communication support lamp and the right-side communication support lamp.

Also, when the vehicle stops after detecting the target object, the illumination control unit may sequentially change a light-emitting segment, which is to be turned on or turned off, of the plurality of light-emitting segments of the left-side communication support lamp and the right-side communication support lamp, along a movement direction of the target object.

According to the above configuration, when the vehicle stops after detecting the target object, the light-emitting segment, which is to be turned on or turned off, of the plurality of light-emitting segments of the left-side communication support lamp and the right-side communication support lamp is sequentially changed along the movement direction of the target object. In this way, since the target object in the vicinity of the crosswalk can perceive that the vehicle recognizes the target object by seeing the situation where the light-emitting segments to be turned on or turned off are sequentially changed along the movement direction of the target object, the target object can cross in relief the crosswalk. As a result, the target object is urged to cross the crosswalk by the sequential change of the light-emitting segments in the movement direction of the target object.

Also, each of the plurality of light-emitting segments may include:
a first light-emitting element configured to emit light of a first color,
a second light-emitting element configured to emit light of a second color, and
a third light-emitting element configured to emit light of a third color.

The first color, the second color and the third color may be different, and the illumination control unit may be configured to individually control lightings of the first light-emitting element, the second light-emitting element and the third light-emitting element.

According to the above configuration, since each of the plurality of light-emitting segments has three light sources configured to emit lights of different colors, it is possible to form a variety of illumination patterns by the left-side communication support lamp and the right-side communication support lamp. In this way, it is possible to increase an amount of information to be communicated between the vehicle and the target object.

Also, the first light-emitting element may be configured to emit red light, the second light-emitting element may be configured to emit green light, and the third light-emitting element may be configured to emit blue light.

According to the above configuration, each of the plurality of light-emitting segments can emit the red light, the green light and the blue light toward the outside. That is, since each light-emitting segment has the RGB light sources, it is possible to emit the lights of diverse colors. In this way, it is possible to form a variety of illumination patterns by the left-side communication support lamp and the right-side communication support lamp, so that it is possible to increase the amount of information to be communicated between the vehicle and the target object.

A vehicle illumination system relating to a second aspect of the present disclosure is provided to a vehicle capable of traveling in an automatic driving mode, and includes:

a communication support lamp configured to emit light toward an outside of the vehicle and arranged to be visually recognized from the front of the vehicle, and an illumination control unit configured to, when the vehicle detects a target object, change an illumination state of the communication support lamp.

The communication support lamp includes a plurality of light-emitting segments arranged side by side in a predetermined direction.

Each of the plurality of light-emitting segments includes a plurality of light-emitting elements configured to emit lights.

The light-emitting colors of the plurality of light-emitting elements are different, and the illumination control unit is configured to individually control lightings of the plurality of light-emitting elements, thereby changing an illumination state of each of the plurality of light-emitting segments.

The illumination control unit is configured to control the illumination state of the communication support lamp so that the illumination system is to function as a daytime running lamp, a turn signal lamp or a clearance lamp.

According to the above configuration, the illumination control unit is configured to control the illumination state of the communication support lamp so that the illumination system is to function as the daytime running lamp (DRL), the turn signal lamp or the clearance lamp. Therefore, it is possible to provide the vehicle illumination system capable of implementing a function of presenting information, which indicates that the vehicle capable of traveling in the automatic driving mode recognizes a pedestrian, to the target object such as the pedestrian, the other vehicle and the like and a function of the existing lamps such as the DRL.

Also, each of the plurality of light-emitting segments may include:

a white light-emitting element configured to emit white light, a red light-emitting element configured to emit red light, a green light-emitting element configured to emit green light, and a blue light-emitting element configured to emit blue light.

The illumination control unit may be configured to control the illumination state of the communication support lamp so that the illumination system is to function as a daytime running lamp.

According to the above configuration, the illumination control unit is configured to control the illumination state of the communication support lamp so that the illumination system is to function as the daytime running lamp (DRL). Therefore, it is possible to provide the vehicle illumination system capable of implementing the function of presenting the information, which indicates that the vehicle capable of traveling in the automatic driving mode recognizes the target object, to the target object and a function of the DRL.

Also, a luminescence intensity of the white light that is to be emitted from the white light-emitting element may be greater than a luminescence intensity of white light that is to be obtained by mixing the red light to be emitted from the red light-emitting element, the green light to be emitted from the green light-emitting element and the blue light to be emitted from the blue light-emitting element.

According to the above configuration, the luminescence intensity of the white light that is to be emitted from the white light-emitting element is greater than the luminescence intensity of white light that is to be obtained by mixing the red light to be emitted from the red light-emitting element, the green light to be emitted from the green light-emitting element and the blue light to be emitted from the blue light-emitting element. For this reason, the vehicle illumination system can easily implement the function of the DRL by using the white light-emitting element configured to emit the white light having the high luminescence intensity.

Also, each of the plurality of light-emitting segments may include:

an amber light-emitting element configured to emit amber light, a green light-emitting element configured to emit green light, and a blue light-emitting element configured to emit blue light.

The illumination control unit may be configured to control the illumination state of the communication support lamp so that the illumination system is to function as a turn signal lamp.

According to the above configuration, the illumination control unit is configured to control the illumination state of the communication support lamp so that the illumination system is to function as the turn signal lamp (TSL). Therefore, it is possible to provide the vehicle illumination system capable of implementing the function of presenting the information, which indicates that the vehicle capable of traveling in the automatic driving mode recognizes the target object, to the target object and a function of the TSL.

A vehicle illumination system relating to a third aspect of the present disclosure is provided to a vehicle capable of traveling in an automatic driving mode, and includes:

a headlamp mounted to a front surface of the vehicle;

a communication support lamp configured to emit light toward an outside of the vehicle, and an illumination control unit configured to, when the vehicle detects a target object, change an illumination state of the communication support lamp.

The headlamp includes:

a housing, a cover mounted to the housing, and at least one lamp configured to emit light toward the outside of the vehicle and arranged in a lamp chamber formed by the housing and the cover.

The communication support lamp is arranged in the lamp chamber and includes a plurality of light-emitting segments arranged side by side in a predetermined direction of the vehicle.

The illumination control unit is configured to change an illumination state of each of the plurality of light-emitting segments.

According to the above configuration, the communication support lamp is arranged in the lamp chamber of the headlamp that is noticed by a target object such as a pedestrian, other vehicle and the like in front of the vehicle. Therefore, since the target object ahead of the vehicle can easily perceive the change in the illumination state of the communication support lamp, it is possible to increase effectiveness of a communication function between the vehicle and the target object. Also, since it is not necessary to separately provide a space, in which the communication support lamp is to be arranged, in the vehicle, it is possible to secure a degree of design freedom of an exterior package of the vehicle.

Also, the at least one lamp may include:

a low beam lamp configured to emit a low beam toward the front of the vehicle, and a high beam lamp configured to emit a high beam toward the front of the vehicle.

According to the above configuration, the communication support lamp is arranged in the lamp chamber of the headlamp including the low beam lamp and the high beam lamp. Therefore, since the target object ahead of the vehicle can easily perceive the change in the illumination state of the communication support lamp, it is possible to increase the effectiveness of the communication function between the vehicle and the target object.

A vehicle illumination system relating to a fourth aspect of the present disclosure is provided to a vehicle capable of traveling in an automatic driving mode, and includes:

a headlamp mounted to a front surface of the vehicle;

a first lamp configured to emit light toward an outside of the vehicle;

a communication support lamp configured to emit light toward the outside of the vehicle, and an illumination control unit configured to, when the vehicle detects a target object, change an illumination state of the communication support lamp.

The headlamp includes:

a housing, a cover mounted to the housing, and a second lamp configured to emit light toward the outside of the vehicle and arranged in a lamp chamber formed by the housing and the cover.

The first lamp is arranged at a predetermined place of the vehicle outside the lamp chamber, the communication support lamp is arranged in the lamp chamber and includes a plurality of light-emitting segments arranged side by side in a predetermined direction of the vehicle, and the illumination control unit is configured to change an illumination state of each of the plurality of light-emitting segments.

According to the above configuration, the communication support lamp is arranged in the lamp chamber of the headlamp that is noticed by a target object such as a pedestrian, other vehicle and the like in front of the vehicle. Therefore, since the target object ahead of the vehicle can easily perceive the change in the illumination state of the communication support lamp, it is possible to increase the effectiveness of the communication function between the vehicle and the target object. Also, since the first lamp is arranged at the predetermined place of the vehicle other than the lamp chamber of the headlamp, it is possible to sufficiently secure a space for arranging the communication support lamp in the lamp chamber of the headlamp without increasing an entire size of the headlamp.

Also, the first lamp may be any one of a low beam lamp configured to emit a low beam toward the front of the vehicle, and a high beam lamp configured to emit a high beam toward the front of the vehicle. The second lamp may be the other of the low beam lamp and the high beam lamp.

According to the above configuration, since one of the high beam lamp and the low beam lamp is arranged at the predetermined place of the vehicle other than the lamp chamber of the headlamp, it is possible to sufficiently secure the space for arranging the communication support lamp in the lamp chamber of the headlamp without increasing the entire size of the headlamp.

Also, the first lamp may be arranged at an inner side of a front window of the vehicle, a front grill or a bumper.

According to the above configuration, since the first lamp is arranged at the inner side of the front window of the vehicle, the front grill or the bumper, it is possible to sufficiently secure the space for arranging the communication support lamp in the lamp chamber of the headlamp without increasing the entire size of the headlamp.

Also, the illumination control unit may be configured to control the illumination state of the communication support lamp so that the communication support lamp is to function as a daytime running lamp.

According to the above configuration, the illumination control unit is configured to control the illumination state of the communication support lamp so that the communication support lamp is to function as the daytime running lamp (DRL). Therefore, since it is not necessary to separately provide the DRL in the lamp chamber of the headlamp, it is possible to sufficiently secure the space for arranging the communication support lamp in the lamp chamber of the headlamp without increasing the entire size of the headlamp.

Also, each of the plurality of light-emitting segments may include:

a first light-emitting element configured to emit light of a first color, a second light-emitting element configured to emit light of a second color, and a third light-emitting element configured to emit light of a third color, the first color, the second color and the third color may be different, and the illumination control unit may be configured to individually control lightings of the first light-emitting element, the second light-emitting element and the third light-emitting element, thereby changing the illumination state of each of the plurality of light-emitting segments.

According to the above configuration, since each of the plurality of light-emitting segments has three light sources configured to emit lights of different colors, it is possible to form a variety of illumination patterns by the communication support lamp. In this way, it is possible to increase an amount of information to be communicated between the vehicle and the target object.

Also, the first light-emitting element may be configured to emit red light, the second light-emitting element may be configured to emit green light, and the third light-emitting element may be configured to emit blue light.

According to the above configuration, each of the plurality of light-emitting segments can emit the red light, the green light and the blue light. That is, since each light-emitting segment has the RGB light sources, it is possible to emit the lights of diverse colors. In this ways, it is possible to form a variety of illumination patterns by the communication support lamp, so that it is possible to increase the amount of information to be communicated between the vehicle and the target object.

A vehicle system relating to an aspect of the present disclosure includes:

a detection unit configured to detect a target object and the like;

a position information acquisition unit configured to acquire position information of the target object, and the vehicle illumination system.

According to the above configuration, it is possible to provide the vehicle system capable of presenting the information, which indicates that the vehicle capable of driving in the automatic driving mode recognizes the target object, to the target object.

Also, a vehicle capable of driving in an automatic driving mode and including the vehicle system may be provided.

According to the above configuration, it is possible to provide an automatic driving vehicle system capable of presenting the information, which indicates that the vehicle recognizes the target object, to the target object.

A vehicle system relating to a first aspect of the present disclosure is provided to a vehicle capable of driving in an automatic driving mode, and includes:

an illumination system including:
a communication support lamp configured to emit light toward an outside of the vehicle and arranged to be visually recognized from the front of the vehicle, and
an illumination control unit configured to, when the vehicle detects a target object, change an illumination state of the communication support lamp, and
a vehicle exterior speaker system including:
a vehicle exterior speaker configured to output a sound toward the outside of the vehicle, the sound output from the vehicle exterior speaker being capable of being heard from the front of the vehicle, and
a vehicle exterior speaker control unit configured to, when the vehicle detects the target object, control the vehicle exterior speaker so that the sound is to be output toward the outside of the vehicle.

The communication support lamp includes a plurality of light-emitting segments arranged side by side in a predetermined direction, and
the illumination control unit is configured to change an illumination state of each of the plurality of light-emitting segments, thereby changing the illumination state of the communication support lamp.

According to the above configuration, when the vehicle detects the target object, the illumination state of the communication support lamp is changed. For this reason, a pedestrian can perceive that the vehicle recognizes the target object by seeing the change in the illumination state of the communication support lamp, and can thus feel relieved.

Also, when the vehicle detects the target object, the sound is output from the vehicle exterior speaker. For this reason, the target object can perceive that the vehicle recognizes the target object by hearing the sound output from the vehicle exterior speaker, and can thus feel relieved.

Also, even when the illumination system is out of order, it is possible to continuously perform communication between the vehicle and the target object by the vehicle exterior speaker.

In this way, it is possible to provide the vehicle system capable of improving the reliability of the communication function between the vehicle and the target object by the two systems of the illumination system and the vehicle exterior speaker system.

A vehicle system relating to a second aspect of the present disclosure is provided to a vehicle capable of driving in an automatic driving mode, and includes:
an illumination system including:
a communication support lamp configured to emit light toward an outside of the vehicle and arranged to be visually recognized from the front of the vehicle, and
an illumination control unit configured to, when the vehicle detects a target object, change an illumination state of the communication support lamp, and
a transmission unit configured to, when the vehicle detects a target object, wirelessly transmit a first control signal for controlling at least one of a display state and a speaker state of a portable electronic device carried by the target object to the portable electronic device.

The communication support lamp includes a plurality of light-emitting segments arranged side by side in a predetermined direction, and
the illumination control unit is configured to change an illumination state of each of the plurality of light-emitting segments, thereby changing the illumination state of the communication support lamp.

According to the above configuration, when the vehicle detects the target object, the illumination state of the communication support lamp is changed. For this reason, the target object can perceive that the vehicle recognizes the target object by seeing the change in the illumination state of the communication support lamp, and can thus feel relieved.

Also, when the vehicle detects the target object, the first control signal for controlling at least one of the display state and the speaker state of the portable electronic device carried by the target object (for example, a pedestrian) is wirelessly transmitted to the portable electronic device. Then, at least one of the display state and the speaker state of the portable electronic device is controlled in accordance with the wirelessly transmitted first control signal. As a result, the target object can perceive that the vehicle recognizes the target object by detecting at least one of the display state and the speaker state of the portable electronic device, and can thus feel relieved.

Also, even when the illumination system is out of order, the vehicle system can continue to perform communication between the vehicle and the target object by the wireless communication with the portable electronic device.

In this way, it is possible to provide the vehicle system capable of improving the reliability of the communication function between the vehicle and the target object.

A vehicle system relating to a third aspect of the present disclosure is provided to a vehicle capable of driving in an automatic driving mode, and includes:
an illumination system including:
a communication support lamp configured to emit light toward an outside of the vehicle and arranged to be visually recognized from the front of the vehicle, and
an illumination control unit configured to, when the vehicle detects a target object, change an illumination state of the communication support lamp, and
a transmission unit configured to, when the vehicle detects a target object, wirelessly transmit a second control signal for controlling at least one of a display state and a speaker state of a traffic infrastructure equipment in the vicinity of the target object to the traffic infrastructure equipment.

The communication support lamp includes a plurality of light-emitting segments arranged side by side in a predetermined direction, and
the illumination control unit is configured to change an illumination state of each of the plurality of light-emitting segments, thereby changing the illumination state of the communication support lamp.

According to the above configuration, when the vehicle detects the target object, the illumination state of the communication support lamp is changed. For this reason, a pedestrian can perceive that the vehicle recognizes the target object by seeing the change in the illumination state of the communication support lamp, and can thus feel relieved.

Also, when the vehicle detects the target object (for example, the pedestrian), the second control signal for controlling at least one of the display state and the speaker state of the traffic infrastructure equipment is wirelessly transmitted to the traffic infrastructure equipment. Then, at least one of the display state and the speaker state of the traffic infrastructure equipment is controlled in accordance with the wirelessly transmitted second control signal. As a result, the target object can perceive that the vehicle recognizes the target object by detecting at least one of the display state and the speaker state of the traffic infrastructure equipment, and can thus feel relieved.

Also, even when the illumination system is out of order, the vehicle system can continue to perform communication between the vehicle and the target object by the wireless communication with the traffic infrastructure equipment.

In this way, it is possible to provide the vehicle system capable of improving the reliability of the communication function between the vehicle and the target object.

Also, the vehicle system may further include a vehicle interior speaker system including:

a vehicle interior speaker configured to output a sound toward a passenger in the vehicle, and a vehicle interior speaker control unit configured to control the vehicle interior speaker so that the same sound as the sound output from the vehicle exterior speaker is to be output toward the passenger.

According to the above configuration, since the same sound as the sound output from the vehicle exterior speaker is output toward the passenger, the passenger can perceive that pedestrian-to-vehicle communication is appropriately performed between the pedestrian and the vehicle by hearing the sound, and can thus feel relieved.

Also, the vehicle system may further include a display device system including:

a display device on which the illumination state of the communication support lamp is to be displayed so that a passenger in the vehicle can visually recognize the same, and a display control unit configured to display the illumination state of the communication support lamp on the display device.

According to the above configuration, since the illumination state of the communication support lamp is displayed on the display device so that the passenger in the vehicle can visually recognize the same, the passenger can perceive that communication is appropriately performed between the vehicle and the target object by visually recognizing the illumination state of the communication support lamp displayed on the display device, and can thus feel relieved.

Also, each of the plurality of light-emitting segments may include:

a first light-emitting element configured to emit light of a first color, a second light-emitting element configured to emit light of a second color, and a third light-emitting element configured to emit light of a third color, the first color, the second color and the third color may be different, and the illumination control unit may be configured to individually control lightings of the first light-emitting element, the second light-emitting element and the third light-emitting element, thereby changing the illumination state of each of the plurality of light-emitting segments.

According to the above configuration, since each of the plurality of light-emitting segments has three light sources configured to emit lights of different colors, it is possible to form a variety of illumination patterns by the communication support lamp. In this way, it is possible to increase an amount of information to be communicated between the vehicle and the target object.

Also, the first light-emitting element may be configured to emit red light, the second light-emitting element may be configured to emit green light, and the third light-emitting element may be configured to emit blue light.

According to the above configuration, each of the plurality of light-emitting segments can emit the red light, the green light and the blue light. That is, since each light-emitting segment has the RGB light sources, it is possible to emit the lights of diverse colors. In this ways, it is possible to form a variety of illumination patterns by the communication support lamp, so that it is possible to increase the amount of information to be communicated between the vehicle and the target object.

Also, the vehicle system may further include:

a detection unit configured to detect a target object, and a position information acquisition unit configured to acquire position information of the target object.

According to the above configuration, it is possible to provide the vehicle system capable of improving the reliability of the communication function between the vehicle and the target object.

Also, a vehicle including the vehicle system and capable of traveling in an automatic driving mode may be provided.

According to the above configuration, it is possible to provide the automatic driving vehicle capable of improving the reliability of the communication function between the vehicle and the target object.

According to the present disclosure, it is possible to provide the vehicle illumination system capable of presenting the information, which indicates that the vehicle capable of traveling in the automatic driving mode recognizes the target object, to the target object. Also, according to the present disclosure, it is possible to provide the vehicle system capable of improving the reliability of the communication function between the vehicle and the target object.

BRIEF DESCRIPTION OF THE DRAWINGS

FIG. 6A depicts a situation where a pedestrian is in the vicinity of a crosswalk and a vehicle is approaching an intersection point, and FIG. 6B depicts illumination states of the left-side communication support lamp and the right-side communication support lamp in the situation shown in FIG. 6A.

FIG. 26A depicts a situation where the pedestrian is in the vicinity of the crosswalk and the vehicle is approaching the intersection point, and FIG. 26B depicts illumination states of the left-side illumination unit and the right-side illumination unit in the situation shown in FIG. 26A.

FIG. 28A depicts a situation where the pedestrian has crossed the crosswalk and the vehicle has passed the intersection point, and FIG. 28B depicts illumination states of the left-side illumination unit and the right-side illumination unit in the situation shown in FIG. 28A.

DETAILED DESCRIPTION

Figure 1:
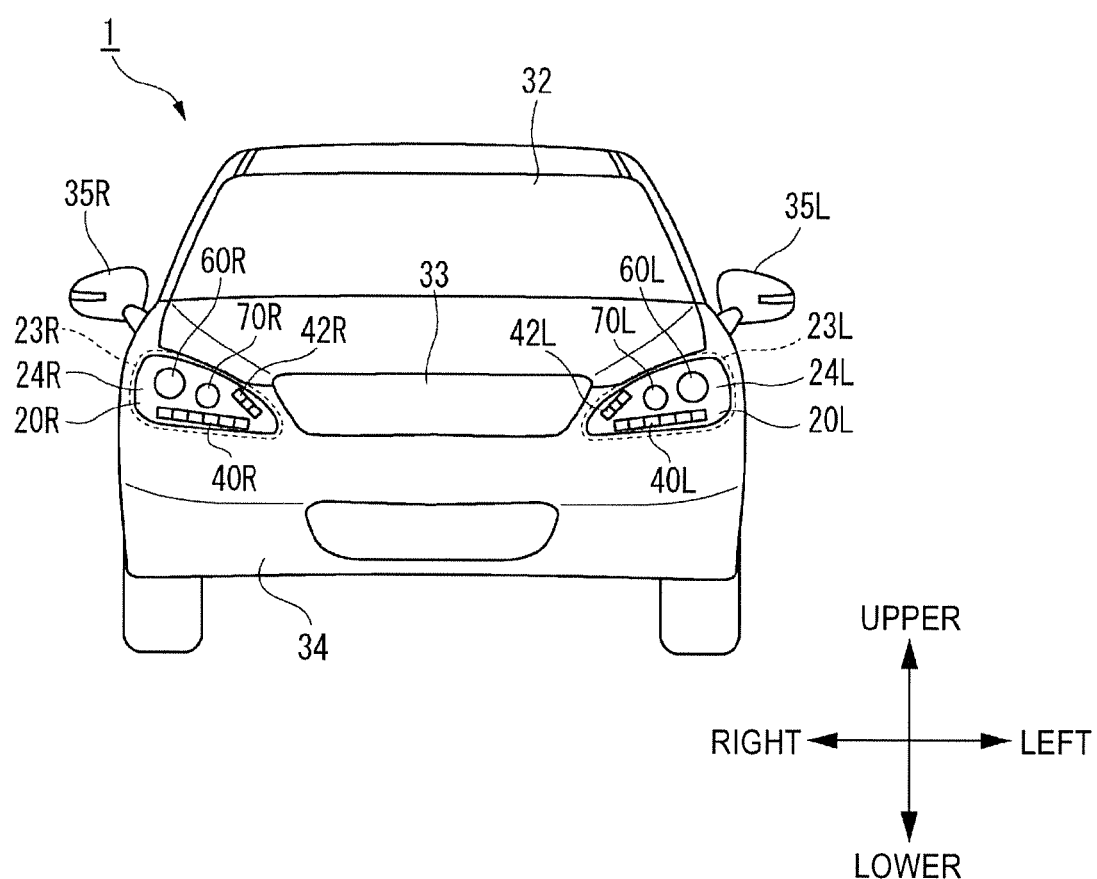
FIG. 1 is a front view of a vehicle having a vehicle illumination system in accordance with a first embodiment of the present invention (hereinafter, simply to referred to as 'first embodiment').

Embodiments of the present invention are described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Hereinafter, a first embodiment will be described with reference to the drawings. Meanwhile, for the sake of convenience of descriptions, the description of members having the same reference numerals as those already described in the description of the first embodiment will be omitted. Also, for the sake of convenience of description, dimensions of the respective members shown in the drawings may be different from actual dimensions of the respective members.

Also, in the description of the first embodiment, for the sake of convenience of description, "the right and left direction", "the front and rear direction" and "the upper and lower direction" will be appropriately mentioned. The directions are relative directions set with respect to a vehicle 1 shown in FIG. 1. Here, "the upper and lower direction" is a direction including "the upward direction" and "the downward direction". "The front and rear direction" is a direction including "the forward direction" and "the rearward direction". "The right and left direction" is a direction including "the rightward direction" and "the leftward direction".

Figure 2:
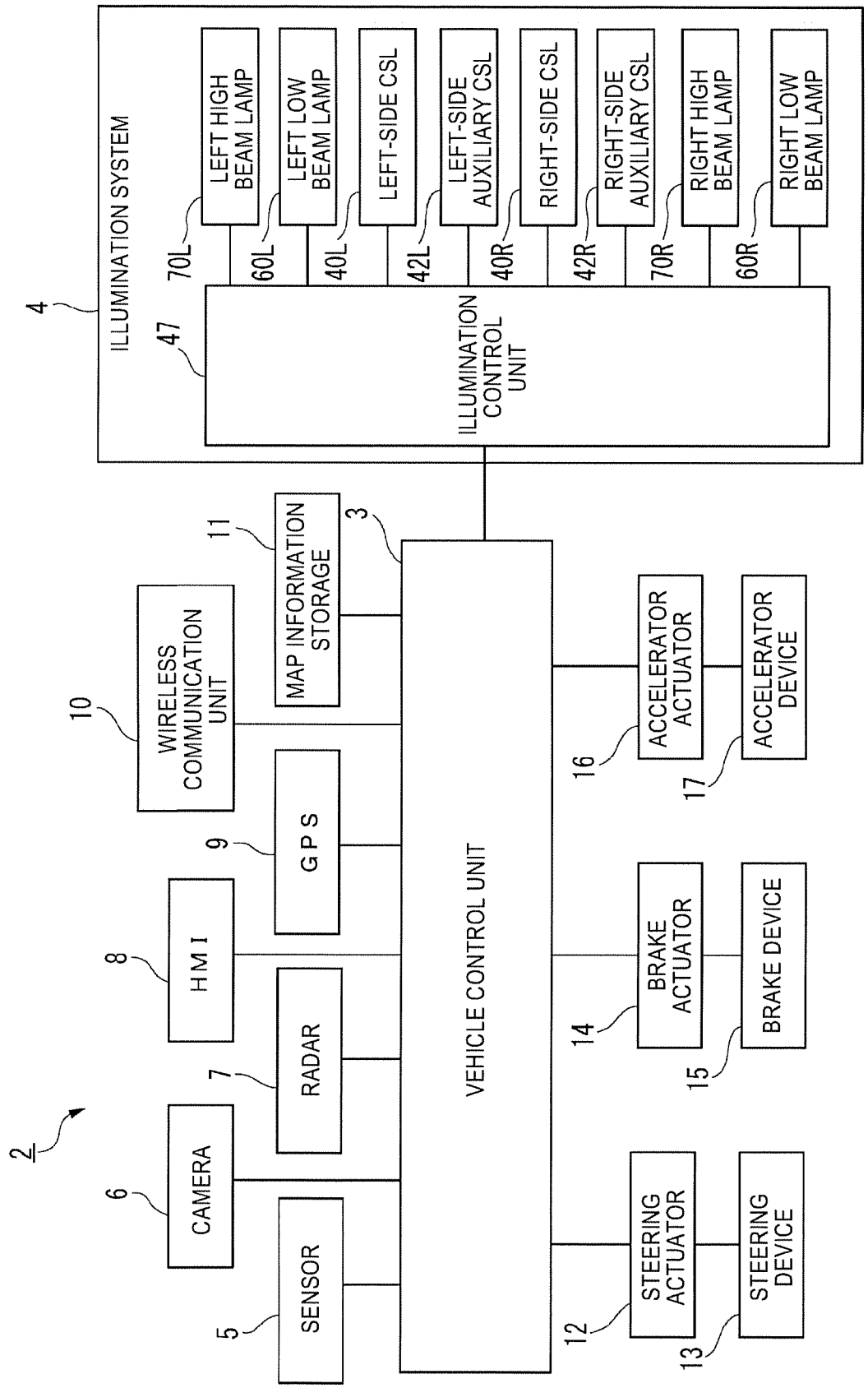
FIG. 2 is a block diagram depicting a vehicle system including the vehicle illumination system of the first embodiment.

First, a vehicle system 2 including a vehicle illumination system 4 of the first embodiment (hereinafter, simply referred to as "illumination system 4") is described with reference to FIGS. 1 and 2. FIG. 1 is a front view of the vehicle 1 having the illumination system 4 mounted thereto. FIG. 2 is a block diagram depicting the vehicle system 2.

The illumination system 4 includes a left-side headlamp 20L and a right-side headlamp 20R. The left-side headlamp 20L is mounted at a front left side of the vehicle 1, and includes a housing 23L, a cover 24L mounted to the housing 23L, a left low beam lamp 60L, and a left high beam lamp 70L. The cover 24L is configured by a light-penetrating member through which light can pass, for example. A lamp chamber is formed by the housing 23L and the cover 24L, and the left low beam lamp 60L and the left high beam lamp 70L are arranged in the lamp chamber. The left low beam lamp 60L is configured to emit a low beam toward the front of the vehicle 1. The left high beam lamp 70L is configured to emit a high beam toward the front of the vehicle 1. [0078] The right-side headlamp 20R is mounted at a front right side of the vehicle 1, and includes a housing 23R, a cover 24R mounted to the housing 23R, a right low beam lamp 60R and a right high beam lamp 70R. The cover 24R is configured by a light-penetrating member through which light can pass, for example. A lamp chamber is formed by the housing 23R and the cover 24R, and the right low beam lamp 60R and the right high beam lamp 70R are arranged in the lamp chamber. The right low beam lamp 60R is configured to emit a low beam toward the front of the vehicle 1. The right high beam lamp 70R is configured to emit a high beam toward the front of the vehicle 1. In the meantime, in below descriptions, the left-side headlamp 20L and the right-side headlamp 20R may be collectively referred to as 'headlamp 20'.

The illumination system 4 further includes a left-side communication support lamp 40L (hereinafter, simply referred to as 'left-side CSL 40L'), a left-side auxiliary communication support lamp 42L (hereinafter, simply referred to as 'left-side auxiliary CSL 42L'), a right-side communication support lamp 40R (hereinafter, simply referred to as 'right-side CSL 40R'), a right-side auxiliary communication support lamp 42R (hereinafter, simply referred to as 'fight-side auxiliary CSL 42R'), and an illumination control unit 47. In the meantime, in below descriptions, the left-side CSL 40L and the right-side CSL 40R may be collectively referred to as 'CSL 40'. Each of the left-side CSL 40L, the left-side auxiliary CSL 42L, the right-side CSL 40R and the right-side auxiliary CSL 42R is a lamp for supporting communication between a target object such as a pedestrian, other vehicle and the like and the vehicle 1.

The left-side CSL 40L and the left-side auxiliary CSL 42L are configured to emit light toward an outside of the vehicle 1, and are arranged in the lamp chamber of the left-side headlamp 20L so that they can be visually recognized from the front of the vehicle 1. Here, the description "emit light toward an outside of the vehicle 1" means that the light emitted from the left-side CSL 40L or the left-side auxiliary CSL 42L can be visually recognized by a pedestrian and the like outside the vehicle 1, and does not necessarily mean that the left-side CSL 40L and the left-side auxiliary CSL 42L directly irradiate the light toward a target object such as a pedestrian and the like outside the vehicle 1. The left-side CSL 40L is arranged to extend in the right and left direction of the vehicle 1. The left-side auxiliary CSL 42L is arranged to extend in a direction inclined relative to the left-side CSL 40L by a predetermined angle (for example, an acute angle).

The right-side CSL 40R and the right-side auxiliary CSL 42R are configured to emit light toward the outside of the vehicle 1, and are arranged in the lamp chamber of the right-side headlamp 20R so that they can be visually recognized from the front of the vehicle 1. Here, the description "emit light toward an outside of the vehicle 1" means that the light emitted from the right-side CSL 40R or the right-side auxiliary CSL 42R can be visually recognized by the pedestrian and the like outside the vehicle 1, and does not necessarily mean that the right-side CSL 40R and the right-side auxiliary CSL 42R directly irradiate the light toward the target object such as the pedestrian and the like outside the vehicle 1. The right-side CSL 40R is arranged to extend in the right and left direction of the vehicle 1. The right-side auxiliary CSL 42R is arranged to extend in a direction inclined relative to the right-side CSL 40R by a predetermined angle (for example, an acute angle).

In the meantime, in the first embodiment, both the left low beam lamp 60L and the left high beam lamp 70L are arranged in the lamp chamber of the left-side headlamp 20L. However, one of them may be arranged at a bumper 34, a front grill 33, a left-side door mirror 35L or a front window 32 of the vehicle 1. Likewise, both the right low beam lamp 60R and the right high beam lamp 70R are arranged in the lamp chamber of the right-side headlamp 20R. However, one of them may be arranged at the bumper 34, the front grill 33, a right-side door mirror 35R or the front window 32 of the vehicle 1.

Subsequently, the vehicle system 2 of the vehicle 1 is described with reference to FIG. 2. As shown in FIG. 2, the vehicle system 2 includes a vehicle control unit 3, an illumination system 4, a sensor 5, a camera 6, a radar 7, a HMI (Human Machine Interface) 8, a GPS (Global Positioning System) 9, a wireless communication unit 10, and a map information storage 11. In addition, the vehicle system 2 includes a steering actuator 12, a steering device 13, a brake actuator 14, a brake device 15, an accelerator actuator 16, and an accelerator device 17.

The vehicle control unit 3 is configured to control traveling of the vehicle 1. The vehicle control unit 3 is configured by, for example, at least one an electronic control unit (ECU) and is connected to a power supply (not shown). The electronic control unit may include at least one microcontroller having one or more processors and one or more memories, and other electronic circuits having an active element such as a transistor and a passive element. The processor is, for example, a CPU (Central Processing Unit), an MPU (Micro Processing Unit) and/or a GPU (Graphics Processing Unit). The CPU may be configured by a plurality of CPU cores. The GPU may be configured by a plurality of GPU cores. The memory includes a ROM (Read Only Memory) and a RAM (Random Access Memory). In the ROM, a vehicle control program may be stored. For example, the vehicle control program may include an artificial intelligence (AI) program. The AI program is a program established by a supervised or unsupervised machine learning using a neural network such as deep learning. In the RAM, the vehicle control program, vehicle control data and/or surrounding environment information indicative of a surrounding environment of the vehicle may be temporarily stored. The processor may be configured to develop, on the RAM, a program designated from the vehicle control program stored in the ROM and to execute a variety of processes in cooperation with the RAM.

Also, the electronic control unit (ECU) may be configured by at least one integrated circuit such as ASIC (Application Specific Integrated Circuit), FPGA (Field-Programmable Gate Array) and the like. Also, the electronic control unit may be configured by a combination of at least one microcontroller and at least one integrated circuit (FPGA and the like).

As described above, the illumination system 4 includes the illumination control unit 47, the left-side headlamp 20L, the right-side headlamp 20R, the left-side CSL 40L (left-side communication support lamp), the left-side auxiliary CSL 42L (left-side auxiliary communication support lamp), the right-side CSL 40R (right-side communication support lamp), and the right-side auxiliary CSL 42R (right-side auxiliary communication support lamp). The illumination control unit 47 is configured to control illumination states of the left low beam lamp 60L and left high beam lamp 70L of the left-side headlamp 20L. For example, the illumination control unit 47 may be configured to move and/or change a light distribution pattern of the low beam to be emitted from the left low beam lamp 60L. Also, the illumination control unit 47 may be configured to move and/or change a light distribution pattern of the high beam to be emitted from the left high beam lamp 70L.

Likewise, the illumination control unit 47 is configured to control illumination states of the right low beam lamp 60R and right high beam lamp 70R of the right-side headlamp 20R. For example, the illumination control unit 47 may be configured to move and/or change a light distribution pattern of the low beam to be emitted from the right low beam lamp 60R. Also, the illumination control unit 47 may be configured to move and/or change a light distribution pattern of the low beam to be emitted from the right high beam lamp 70R.

Also, the illumination control unit 47 is configured to change illumination states (for example, an illumination color, an illumination intensity, a blinking cycle, an illumination place, an illumination area and the like) of the left-side CSL 40L and the right-side CSL 40R. Also, the illumination control unit 47 is configured to change illumination states (for example, an illumination color, an illumination intensity, a blinking cycle, an illumination place, an illumination area and the like) of the left-side auxiliary CSL 42L and the right-side auxiliary CSL 42R.

The illumination control unit 47 is configured by at least one an electronic control unit (ECU) and is connected to the power supply (not shown). The electronic control unit may include at least one microcontroller having one or more processors and one or more memories, and other electronic circuits (transistors and the like). The processor is, for example, a CPU, an MPU, a GPU and/or a TPU. The CPU may be configured by a plurality of CPU cores. The GPU may be configured by a plurality of GPU cores. The memory includes a ROM and a RAM. Also, the electronic control unit (ECU) may be configured by at least one integrated circuit such as ASIC, FPGA and the like. Also, the electronic control unit may be configured by a combination of at least one microcontroller and at least one integrated circuit (FPGA and the like). In the first embodiment, the vehicle control unit 3 and the illumination control unit 47 are provided as separate configurations but may be integrally configured. That is, the illumination control unit 43 and the vehicle control unit 3 may be configured by a single electronic control unit. The configurations of the left-side CSL 40L and the right-side CSL 40R will be described later.

The sensor 5 includes an acceleration sensor, a speed sensor, a gyro sensor, and the like. The sensor 5 is configured to detect a traveling condition of the vehicle 1 and to output traveling condition information indicative of the traveling condition of the vehicle 1 to the vehicle control unit 3. The sensor 5 may further include a seating sensor configured to detect whether a driver is sitting on a driver seat, a face direction sensor configured to detect a direction of a driver's face, an external weather sensor configured to detect an external weather condition, a passenger detection sensor configured to detect whether there is a passenger in a vehicle, and the like.

The camera 6 is, for example, a camera including an imaging device such as a CCD (Charge-Coupled Device) and a CMOS (complementary MOS). The radar 7 is a millimeter wave radar, a microwave radar, a laser radar (for example, LiDAR), or the like. The camera 6 and/or the radar 7 is configured to detect information (surrounding environment information) about surrounding environments (other vehicles, pedestrians, road shapes, traffic signs, obstacles, and the like) of the vehicle 1 and to output the surrounding environment information to the vehicle control unit 3.

The HMI 8 includes an input unit configured to receive an input operation from a driver and an output unit configured to output the traveling state information and the like to the driver. The input unit includes a steering wheel, an accelerator pedal, a brake pedal, a driving mode changeover switch for switching the driving mode of the vehicle 1, and the like. The output unit includes a display configured to display the traveling state information, the surrounding environment information and the illumination state of the illumination system 4, and the like.

The GPS (Global Positioning System) 9 is configured to acquire current position information of the vehicle 1 and to output the acquired current position information to the vehicle control unit 3. The wireless communication unit 10 is configured to receive information (for example, other vehicle traveling information, and the like) relating to other vehicles around the vehicle 1 from the other vehicles and to transmit information (for example, host vehicle traveling information, and the like) relating to the vehicle 1 to the other vehicles (inter-vehicle communication).

Also, the wireless communication unit 10 is configured to receive infrastructure information from infrastructure equipment such as a traffic light, a marker lamp and the like and to transmit the host vehicle traveling information of the vehicle 1 to the infrastructure equipment (road-to-vehicle communication). Also, the wireless communication unit 10 is configured to receive information relating to a pedestrian from a portable electronic device (a smart phone, a tablet, a wearable device, a notebook computer or the like) carried by the pedestrian and to transmit the host vehicle traveling information of the vehicle 1 to the portable electronic device (pedestrian-to-vehicle communication). The vehicle 1 may be configured to perform communication with the other vehicle, the infrastructure equipment or the portable electronic device by an ad hook mode directly or via an access point. The wireless communication standards include, for example, Wi-Fi (registered trademark), Bluetooth (registered trademark), ZigBee (registered trademark) or LPWA. Also, the vehicle 1 may be configured to perform communication with the other vehicle, the infrastructure equipment or the portable electronic device via a mobile communication network. The map information storage 11 is an external storage device such as a hard disk drive in which map information is stored, and is configured to output the map information to the vehicle control unit 3. The map information may be updated via the wireless communication unit 10 and a communication network such as the Internet whenever a predetermined time period elapses.

When the vehicle 1 travels in an automatic driving mode, the vehicle control unit 3 automatically generates at least one of a steering control signal, an accelerator control signal and a brake control signal, based on the traveling state information, the surrounding environment information, the current position information, the map information and the vehicle control program. The steering actuator 12 is configured to receive the steering control signal from the vehicle control unit 3 and to control the steering device 13 on the basis of the received steering control signal. The brake actuator 14 is configured to receive the brake control signal from the vehicle control unit 3 and to control the brake device 15 on the basis of the received brake control signal. The accelerator actuator 16 is configured to receive the accelerator control signal from the vehicle control unit 3 and to control the accelerator device 17 on the basis of the received accelerator control signal. In this way, in the automatic driving mode, the traveling of the vehicle 1 is automatically controlled by the vehicle system 2.

On the other hand, when the vehicle 1 travels in a manual driving mode, the vehicle control unit 3 generates a steering control signal, an accelerator control signal and a brake control signal in conformity with a driver's manual operation on the accelerator pedal, the brake pedal and the steering wheel. In this way, in the manual driving mode, the steering control signal, the accelerator control signal and the brake control signal are generated by the driver's manual operation, so that the traveling of the vehicle 1 is controlled by the driver.

Subsequently, the driving mode of the vehicle 1 is described. The driving mode includes an automatic driving mode and a manual driving mode. The automatic driving mode includes a full-automatic driving mode, an advanced driving support mode, and a driving support mode. In the full-automatic driving mode, the vehicle system 2 is configured to automatically perform all of the traveling controls of the steering control, the brake control and the accelerator control, and the driver is not in a state where it is possible to drive the vehicle 1. In the advanced driving support mode, the vehicle system 2 is configured to automatically perform all of the traveling controls of the steering control, the brake control and the accelerator control, and the driver does not drive the vehicle 1 although the driver is in a state where it is possible to drive the vehicle 1. In the driving support mode, the vehicle system 2 is configured to automatically perform a part of the traveling controls of the steering control, the brake control and the accelerator control, and the driver drives the vehicle 1 under the driving support of the vehicle system 2. On the other hand, in the manual driving mode, the vehicle system 2 is configured not to automatically perform the traveling controls, and the driver drives the vehicle 1 without the driving support of the vehicle system 2.

Also, the driving mode of the vehicle 1 may be switched by operating a driving mode changeover switch. In this case, the vehicle control unit 3 is configured to switch the driving mode of the vehicle 1 among the four driving modes (the full-automatic driving mode, the advanced driving support mode, the driving support mode, and the manual driving mode) in accordance with a driver's operation on the driving mode changeover switch. Also, the driving mode of the vehicle 1 may be automatically switched on the basis of information relating to a travel-allowed section where traveling of an automatic driving vehicle is allowed or a travel-prohibited section where the traveling of the automatic driving vehicle is prohibited or information relating to the external weather condition. In this case, the vehicle control unit 3 is configured to switch the driving mode of the vehicle 1, based on such information. Also, the driving mode of the vehicle 1 may be automatically switched by using a seating sensor, a face direction sensor, or the like. In this case, the vehicle control unit 3 may be configured to switch the driving mode of the vehicle 1, based on an output signal from the seating sensor or the face direction sensor.

Figure 3:
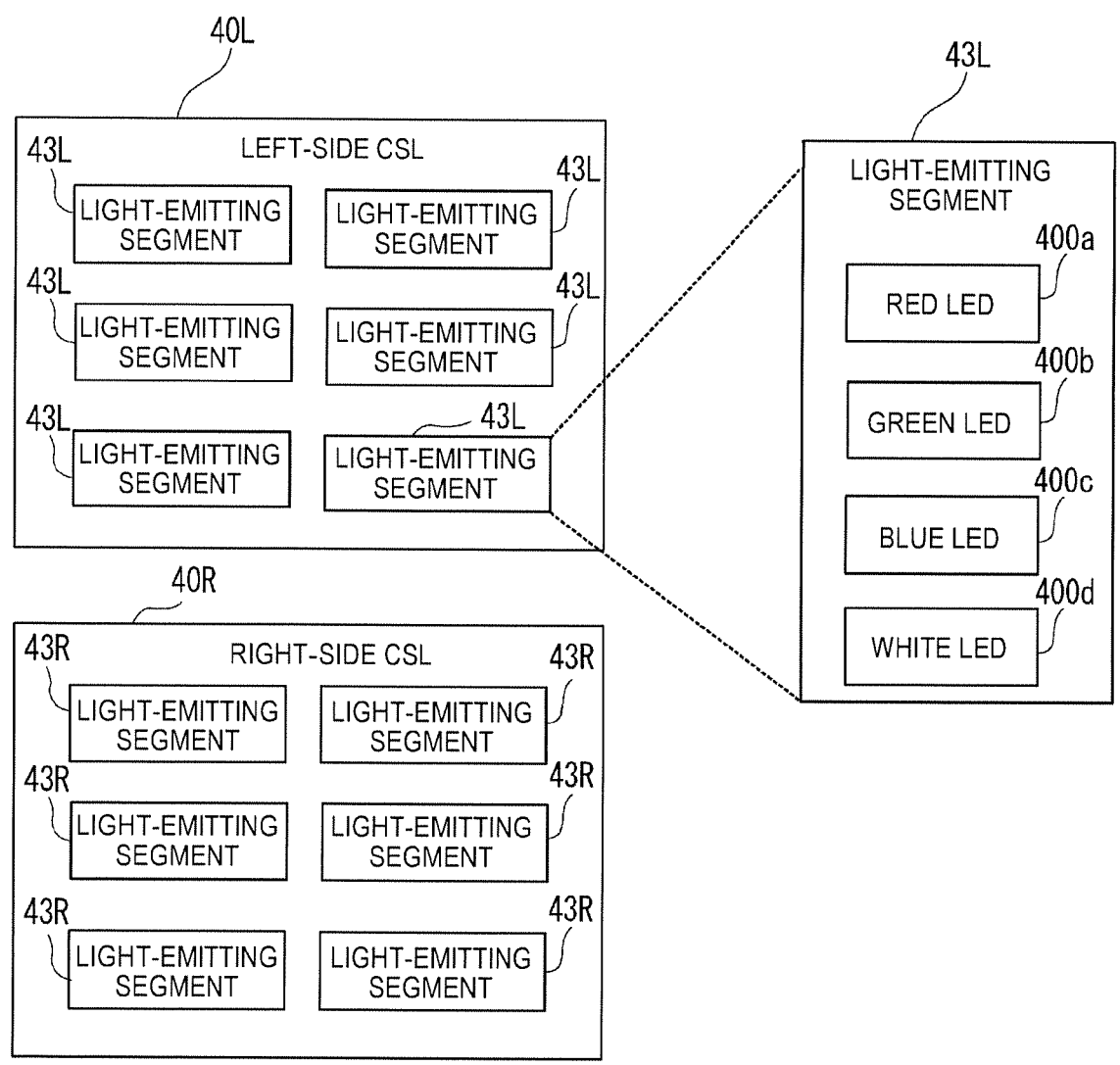
FIG. 3 is a block diagram depicting a left-side communication support lamp and a right-side communication support lamp.
Figure 4:
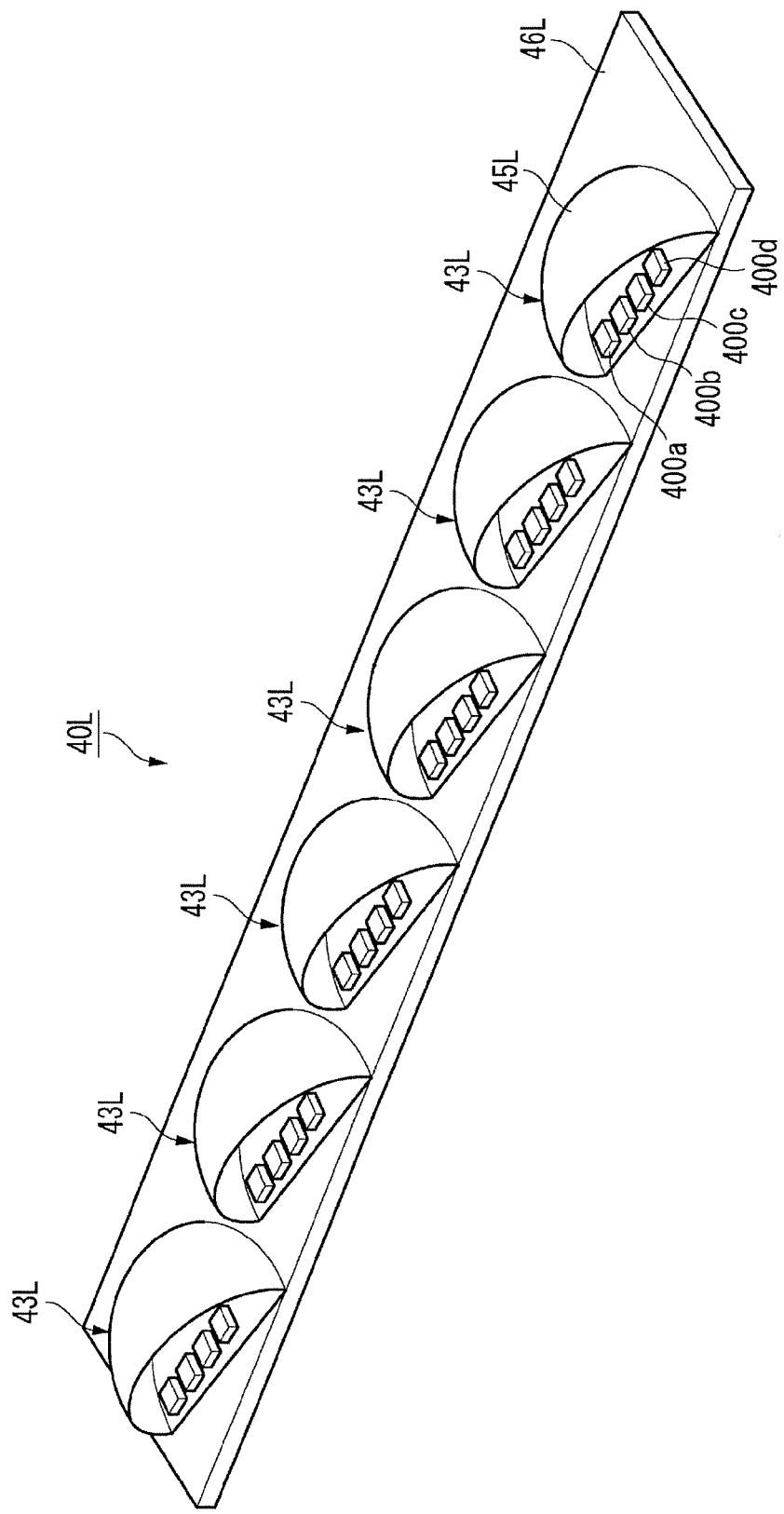
FIG. 4 is a perspective view pictorially depicting an example of the left-side communication support lamp.

Subsequently, the specific configurations of the left-side CSL 40L and the right-side CSL 40R are described with reference to FIGS. 3 and 4. FIG. 3 is a block diagram depicting the left-side CSL 40L and the right-side CSL 40R. FIG. 4 is a perspective view pictorially depicting an example of the left-side CSL 40L.

As shown in FIG. 3, the left-side CSL 40L includes six light-emitting segments 43L. The six light-emitting segments 43L are arranged side by side in the right and left direction of the vehicle 1 (refer to FIG. 6B and the like). Here, it should be noted that the technical meaning of the state where the six light-emitting segments 43L are arranged side by side in the right and left direction includes not only a state where the six light-emitting segments 43L are arranged side by side in a direction parallel with the right and left direction but also a state where the six light-emitting segments 43L are arranged side by side in a direction inclined relative to the right and left direction by a predetermined angle. In the meantime, the predetermined angle is equal to or smaller than 45°.

Each of the light-emitting segments 43L includes a red LED (Light Emitting Diode) 400a (red light-emitting element) configured to emit red light, a green LED 400b (green light-emitting element) configured to emit green light, a blue LED 400c (blue light-emitting element) configured to emit blue light and a white LED 400d (white light-emitting element) configured to emit white light. In the below, for the sake of convenience of descriptions, the red LED 400a, the green LED 400b, the blue LED 400c and the white LED 400d may be collectively referred to as 'LED 400'.

Here, a luminescence intensity of the white light to be emitted from the white LED 400d is preferably greater than a luminescence intensity of white light obtained by mixing the red light to be emitted from the red LED 400a, the green light to be emitted from the green LED 400b and the blue light be emitted from the blue LED 400c. In this case, the vehicle illumination system 4 can easily implement a function of a daytime running lamp (hereinafter, referred to as DRL) or a clearance lamp by using the white LED 400d configured to emit the white light having the high luminescence intensity.

As shown in FIG. 4, the left-side CSL 40L further includes a plate-shaped circuit board 46L on which the six light-emitting segments 43L are mounted. On the circuit board 46L, a wiring pattern (not shown) for supplying an electric signal to each LED 400 is formed. Each LED 400 is arranged on the circuit board 46L so as to be electrically connected to the wiring pattern formed on the circuit board 46L. Also, each of the light-emitting segments 43L further includes a reflector 45L configured to reflect the light emitted from each LED 400 toward the outside of the vehicle 1. Each reflector 45L is arranged on the circuit board 46L so as to cover the four corresponding LEDs 400.

The illumination control unit 47 (refer to FIG. 2) is electrically connected to each LED 400 of each light-emitting segment 43L through the wiring pattern formed on the circuit board 46L. For example, when one of the six light-emitting segments 43L emits the red light, the illumination control unit 47 supplies an electric signal (for example, PWM (Pulse Width Modulation) signal) to the red LED 400a belonging to the one light-emitting segment 43L through the wiring pattern. Then, the red LED 400a emits the red light, in correspondence to the electric signal supplied from the illumination control unit 47. In this way, the red light is emitted from the light-emitting segment 43L. Also, when all of the six light-emitting segments 43L emit the white light, the illumination control unit 47 supplies the electric signal to the white LEDs 400d belonging to the respective light-emitting segments 43L through the wiring pattern. Then, the respective white LEDs 400d emit the white light, in correspondence to the electric signal supplied from the illumination control unit 47. As a result, since the white light is emitted from all of the six light-emitting segments 43L, the illumination system 4 functions as a DRL or a clearance lamp.

In this way, the illumination control unit 47 can individually control lightings of the respective LEDs 400 belonging to the respective light-emitting segments 43L (i.e., individually supply the electric signal to the respective LEDs 400), thereby changing an illumination state (for example, the illumination color, the illumination intensity, the blinking cycle and the like) of each of the light-emitting segments 43L. Also, the illumination control unit 47 can change the illumination state of each of the light-emitting segments 43L, thereby changing an illumination state of the left-side CSL 40L.

Also, the right-side CSL 40R includes six light-emitting segments 43R. The six light-emitting segments 43R are arranged side by side in the right and left direction of the vehicle 1 (refer to FIG. 6B and the like). Here, it should be noted that the technical meaning of the state where the six light-emitting segments 43R are arranged side by side in the right and left direction includes a state where the six light-emitting segments 43R are arranged side by side in a direction inclined relative to the right and left direction by a predetermined angle, as described above. In the meantime, the predetermined angle is equal to or smaller than 45°. Each of the light-emitting segments 43R includes a red LED 400a, a green LED 400b, a blue LED 400c, and a white LED 400d. The specific configuration of the right-side CSL 40R is the same as the specific configuration of the left-side CSL 40L shown in FIG. 4.

The illumination control unit 47 is electrically connected to each LED 400 of each light-emitting segment 43R through the wiring pattern formed on the circuit board 46L. The illumination control unit 47 can individually control lightings of the respective LEDs 400 belonging to the respective light-emitting segments 43R (i.e., individually supply the electric signal to the respective LEDs 400), thereby changing an illumination state (for example, the illumination color, the illumination intensity, the blinking cycle and the like) of each of the light-emitting segments 43R. Also, the illumination control unit 47 can change the illumination state of each of the light-emitting segments 43R, thereby changing an illumination state of the right-side CSL 40R. Like this, the illumination control method of the right-side CSL 40R is the same as the illumination control method of the left-side CSL 40L shown in FIG. 4.

Also, the illumination control unit 47 is configured to control the illumination states of the left-side CSL 40L and the right-side CSL 40R so that the left-side CSL 40L and the right-side CSL 40R are to function as DRLs, turn signal lamps (hereinafter, simply referred to as TSL) or clearance lamps.

Also, each of the left-side auxiliary CSL 42L and the right-side auxiliary CSL 42R shown in FIG. 2 includes a plurality of light-emitting segments (not shown). Each of the light-emitting segments includes one or more LEDs (not shown). The illumination control unit 47 is configured to individually supply the electric signal to each LED belonging to each light-emitting segment, thereby changing an illumination states of each light-emitting segment. In this way, the illumination control unit 47 can change the illumination states (the illumination color, the illumination intensity, the blinking cycle and the like) of the left-side auxiliary CSL 42L and the right-side auxiliary CSL 42R.

Figure 5:
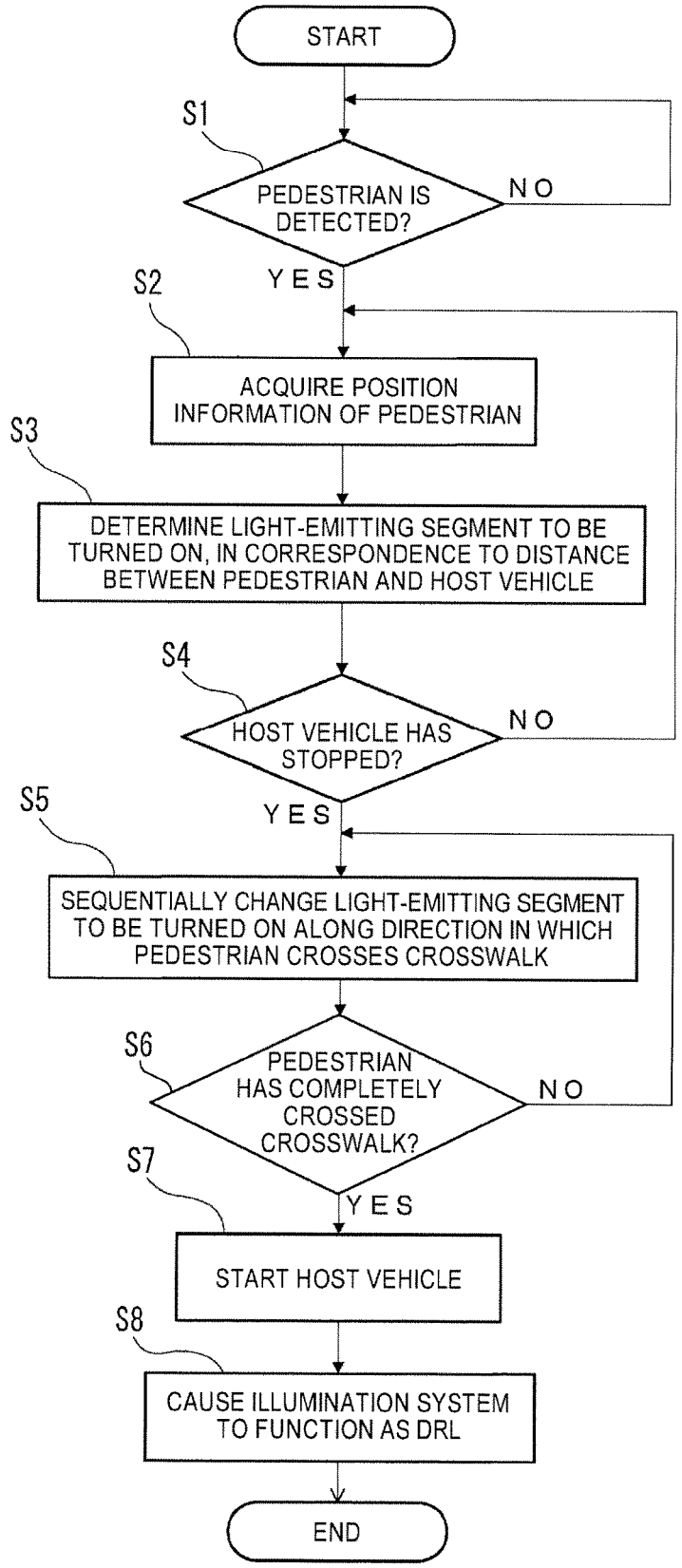
FIG. 5 is a flowchart for illustrating an operation flow of the vehicle illumination system of the first embodiment.

Subsequently, an operation flow of the illumination system 4 is described with reference to FIGS. 5 to 10B. FIG. 5 is a flowchart for illustrating an operation flow of the illumination system 4. FIG. 6A depicts a situation where a pedestrian P is in the vicinity of a crosswalk and the vehicle 1 is approaching the crosswalk C. FIG. 6B depicts illumination states of the left-side CSL 40L and the right-side CSL 40R in the situation shown in FIG. 6A. The descriptions of FIGS. 7A-7B and thereafter are basically the same as the descriptions of FIGS. 6A and 6B.

As shown in FIGS. 5 and 6A-6B, the vehicle control unit 3 (detection unit) first detects the pedestrian P in the vicinity of the crosswalk C ahead of the vehicle 1 that is traveling in the automatic driving mode (in particular, the full-automatic driving mode or the advanced driving support mode) (step S1). In particular, the camera 6 and/or the radar 7 acquire the surrounding environment information (for example, image data and the like) of the vehicle 1, and transmit the acquired surrounding environment information to the vehicle control unit 3. The vehicle control unit 3 detects the pedestrian P in the vicinity of the crosswalk C, based on the surrounding environment information transmitted from the camera 6 and/or the radar 7. When detecting the pedestrian P, an object identification algorithm may be used, for example. When the pedestrian P is detected (YES in step S1), the vehicle control unit 3 (position information acquisition unit) acquires position information of the pedestrian P, based on the transmitted surrounding environment information (step S2). Here, the position information of the pedestrian P is information about a relative position of the pedestrian P to the vehicle 1. On the other hand, when the pedestrian P is not detected (NO in step S1), the processing returns to step S1.

In the meantime, the vehicle control unit 3 functions as the detection unit configured to detect the pedestrian P and the position information acquisition unit configured to acquire the position information of the pedestrian P. Instead of this configuration, however, the camera 6 and/or the radar 7 may function as the detection unit configured to detect the pedestrian P1 and the position information acquisition unit.

Also, the vehicle control unit 3 may be configured to detect the pedestrian P and to acquire the position information of the pedestrian P by pedestrian-to-vehicle communication via the wireless communication unit 10, instead of using the camera 6 and/or the radar 7. In this case, the wireless communication unit 10 is configured to receive the position information of the pedestrian P (position coordinate of the pedestrian P) from a portable electronic device such as a portable phone, a smart phone, a tablet, a wearable device (for example, AR glass) or the like carried by the pedestrian P and to provide the position information to the vehicle control unit 3. The vehicle control unit 3 may be configured to acquire the information (position information of the pedestrian P) about the relative position of the pedestrian P to the vehicle 1, based on the position information of the pedestrian P (position coordinate of the pedestrian P) acquired from the portable electronic device via the wireless communication unit 10 and the position information of the vehicle 1 (position coordinate of the vehicle 1) acquired via the GPS 9.

Also, the vehicle control unit 3 may be configured to detect the pedestrian P and to acquire the position information of the pedestrian P by the road-to-vehicle communication through the wireless communication unit 10. For example, the infrastructure equipment (for example, a traffic light equipped in the vicinity of an intersection point, or the like) in the vicinity of the pedestrian P includes an image acquisition means such as a camera capable of acquiring an image of the pedestrian P, and detects the pedestrian P and acquires the position information of the pedestrian P (position coordinate of the pedestrian P) by the image acquisition means. The wireless communication unit 10 of the vehicle 1 receives the position information of the pedestrian P1 and the like from the infrastructure equipment, and provides the position information and the like to the vehicle control unit 3. The vehicle control unit 3 may acquire the information (position information of the pedestrian P) about the relative position of the pedestrian P to the vehicle 1, based on the position information of the pedestrian P (position coordinate of the pedestrian P) acquired from the infrastructure equipment via the wireless communication unit 10 and the position information of the vehicle 1 (position coordinate of the vehicle 1) acquired via the GPS 9.

Then, in step S3, the vehicle control unit 3 determines the light-emitting segment 43L to be turned on, in correspondence to a distance D (an example of the relative positional relation) between the pedestrian P and the vehicle 1. Specifically, the vehicle control unit 3 may specify the distance D between the pedestrian P and the vehicle 1, based on the position information of the pedestrian P (information about the relative position of the pedestrian P to the vehicle 1). For example, the distance D may be the shortest distance between the pedestrian P and the vehicle 1.

Then, the vehicle control unit 3 determines the light-emitting segment 43L to be turned on of the left-side CSL 40L, in correspondence to the specified distance D. Here, a table or a relation equation indicative of a relation between a range of the distance D between the pedestrian P and the vehicle 1 and the light-emitting segment 43L to be turned on may be stored in advance in the ROM of the vehicle control unit 3. In this case, the vehicle control unit 3 may determine the light-emitting segment 43L to be turned on, based on the specified distance D and the table or relation equation indicative of the relation between the range of the distance D and the light-emitting segment 43L to be turned on.

Thereafter, the vehicle control unit 3 generates an illumination control signal for designating the light-emitting segment 43L to be turned on, and transmits the illumination control signal to the illumination control unit 47. The illumination control unit 47 supplies the electric signal to the light-emitting segment 43L to be turned on (i.e., the designated light-emitting segment 43L), based on the transmitted illumination control signal. In this way, the designated light-emitting segment 43L is turned on by the electric signal supplied from the illumination control unit 47.

For example, when turning on the light-emitting segment 43L to be turned with the red light, the vehicle control unit 3 generates an illumination control signal for designating the red LED 400*a* belonging to the light-emitting segment 43L to be turned on, in correspondence to the specified distance D, and transmits the illumination control signal to the illumination control unit 47. The illumination control unit 47 supplies the electric signal to the red LED 400*a* belonging to the light-emitting segment 43L to be turned on, based on the transmitted illumination control signal. As a result, the designated light-emitting segment 43L is turned on with the red light by the electric signal supplied from the illumination control unit 47. Likewise, the electric signal is supplied to the green LED 400*b*, so that the designated light-emitting segment 43L can be turned on with the green light. The electric signal is supplied to the blue LED 400*c*, so that the designated light-emitting segment 43L can be turned on with the blue light. The electric signal is supplied to the white LED 400*d*, so that the designated light-emitting segment 43L can be turned on with the white light.

Then, in step S4, the vehicle control unit 3 determines whether the vehicle 1 has stopped ahead of the crosswalk C, based on the traveling state information of the vehicle 1 acquired by the sensor 5. When it is determined that the vehicle 1 has not stopped ahead of the crosswalk C (i.e., the vehicle is traveling) (NO in step S4), the processing returns to step S2. In this way, the series of processing from step S2 to step S4 is repetitively executed until it is determined that the vehicle 1 has stopped.

For example, as shown in FIGS. 6A-6B, when the distance D between the vehicle 1 and the pedestrian P is D1, the vehicle control unit 3 determines that the light-emitting segment 43L, which is positioned at the rightmost side, of the six light-emitting segments 43L of the left-side CSL 40L is to be turned on, and transmits the illumination control signal to the illumination control unit 47. The illumination control unit 47 turns on the light-emitting segment 43L positioned at the rightmost side, based on the transmitted illumination control signal. Here, the illumination color of the light-emitting segment 43L positioned at the rightmost side is not particularly limited. For example, the light-emitting segment 43L positioned at the rightmost side may be turned on with the red light.

Figures 7A, 7B:
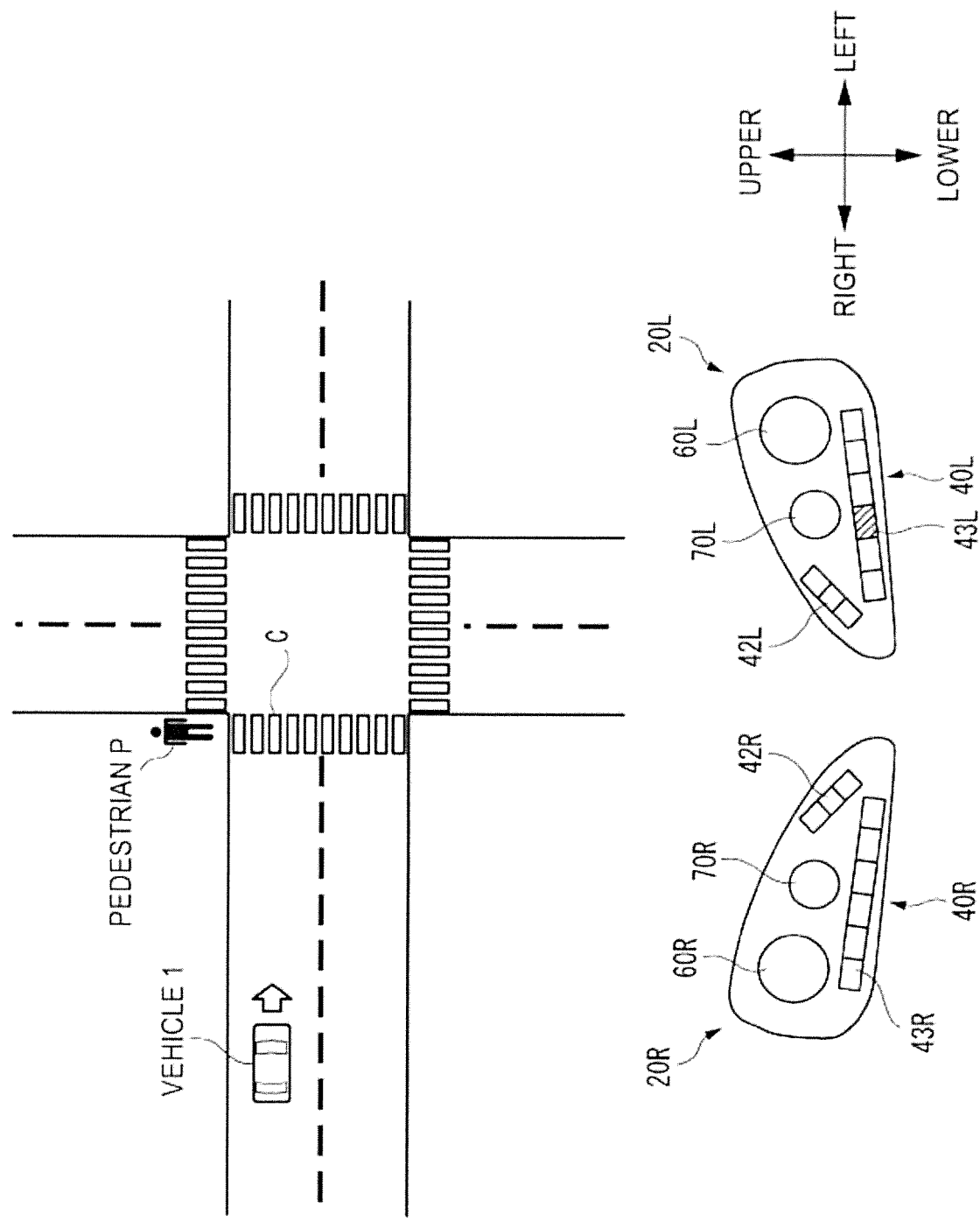
FIG. 7A depicts a situation where the pedestrian is in the vicinity of the crosswalk and the vehicle is approaching the intersection point.
FIG. 7B depicts illumination states of the left-side communication support lamp and the right-side communication support lamp in the situation shown in FIG. 7A.

Also, as shown in FIGS. 7A-7B, when the distance D between the vehicle 1 and the pedestrian P is D2 (here, D2<D1 because the vehicle 1 is traveling toward the intersection point), the vehicle control unit 3 determines that the light-emitting segment 43L, which is located at a third position from a right end of the left-side CSL 40L, of the six light-emitting segments 43L of the left-side CSL 40L is to be turned on, and transmits the illumination control signal to the illumination control unit 47. The illumination control unit 47 turns on the light-emitting segment 43L located at the third position from the right end, based on the transmitted illumination control signal.

Figures 8A, 8B:
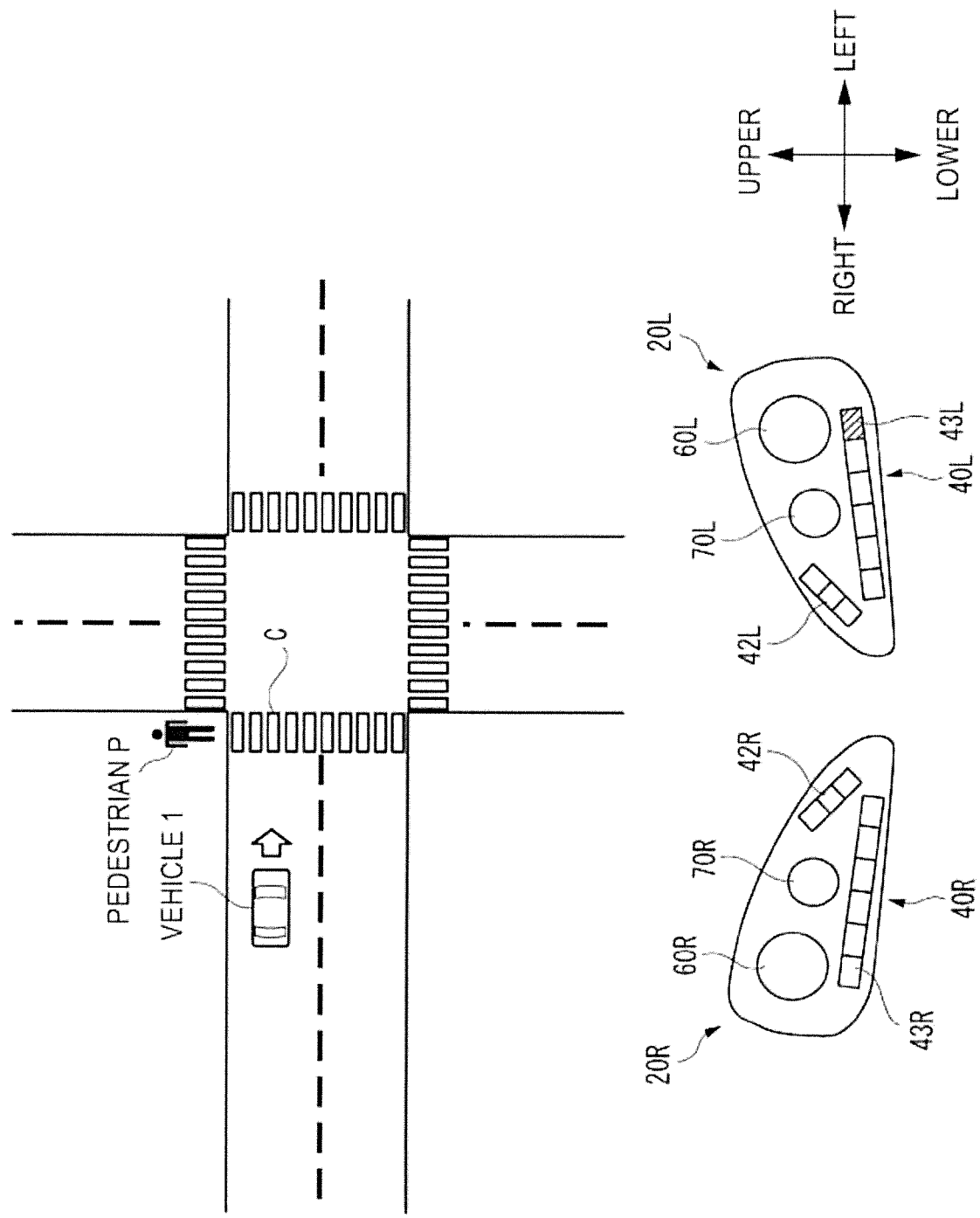
FIG. 8A depicts a situation where the pedestrian is in the vicinity of the crosswalk and the vehicle is approaching the intersection point.
FIG. 8B depicts illumination states of the left-side communication support lamp and the right-side communication support lamp in the situation shown in FIG. 8A.

Also, as shown in FIGS. 8A-8B, when the distance D between the vehicle 1 and the pedestrian P is D3 (here, D3<D2 because the vehicle 1 is traveling toward the intersection point), the vehicle control unit 3 determines that the light-emitting segment 43L, which is positioned at the leftmost side, of the six light-emitting segments 43L of the left-side CSL 40L is to be turned on, and transmits the illumination control signal to the illumination control unit 47. The illumination control unit 47 turns on the light-emitting segment 43L positioned at the leftmost side, based on the transmitted illumination control signal.

Also, although not shown, the illumination control unit 47 may turn on the light-emitting segments 43L located at second, fourth and fifth positions from the right end of the left-side CSL 40L, in correspondence to the distance D between the vehicle 1 and the pedestrian P. In this respect, when the distance D is D2, the light-emitting segment 43L located at the second position from the right end may be turned on. When the distance D is D4, the light-emitting segment 43L located at the fourth position from the right end may be turned on. Also, when the distance D is D5, the light-emitting segment 43L located at the fifth position from the right end may be turned on. At this time, a relation of D1>D2>D3>D4>D5>D6 is established.

In this way, the illumination control unit 47 is configured to change the illumination state of the left-side CSL 40L, in correspondence to the distance D between the vehicle 1 and the pedestrian P. In particular, the illumination control unit 47 is configured to sequentially change the light-emitting segment 43L to be turned on of the six light-emitting segments 43L of the left-side CSL 40L, in correspondence to the distance D between the vehicle 1 and the pedestrian P. In this respect, the illumination control unit 47 may be configured to sequentially change the light-emitting segment 43L to be turned on from the right end of the left-side CSL 40L toward a left end as the distance D decreases.

According to the first embodiment, the light-emitting segment 43L to be turned on of the plurality of light-emitting segments 43L of the left-side CSL 40L is sequentially changed, in correspondence to the distance D between the vehicle 1 and the pedestrian P. Therefore, the pedestrian P can perceive that the vehicle 1 approaching the pedestrian P recognizes the pedestrian P and can thus feel relieved.

In the meantime, in the first embodiment, since the pedestrian P exists at the left side, as seen from the vehicle 1, the illumination control unit 47 changes only the illumination state of the left-side CSL 40L but may be configured to change the illumination states of both the left-side CSL 40L and the right-side CSL 40R. In this case, while the illumination control unit 47 may change the illumination state of the left-side CSL 40L so that the light-emitting segment 43L to be turned on is to sequentially change, the illumination control unit may change the illumination state of the right-side CSL 40R so that the light-emitting segment 43R to be turned on is to sequentially change. Also, the pedestrian P exists at the right side, as seen from the vehicle 1, the illumination control unit 47 may change only the illumination state of the right-side CSL 40R or may change the illumination states of both the right-side CSL 40R and the left-side CSL 40L. Also, while the illumination control unit 47 may change the illumination state of one of the left-side CSL 40L and the right-side CSL 40R, the illumination control unit may cause the other of the left-side CSL 40L and the right-side CSL 40R to function as the DRL, the TSL or the clearance lamp.

Also, in the first embodiment, the illumination control unit 47 sequentially changes the light-emitting segment 43L to be turned on. However, to the contrary, the illumination control unit may be configured to sequentially change the light-emitting segment 43L to be turned off. In this case, before the pedestrian P is detected, all the light-emitting segments 43L of the left-side CSL 40L are turned on. Thereafter, the illumination control unit 47 may be configured to sequentially change the light-emitting segment 43L to be turned off of the six light-emitting segments 43L, in correspondence to the distance D between the vehicle 1 and the pedestrian P. In this respect, the illumination control unit 47 may be configured to sequentially change the light-emitting segment 43L to be turned off from the right end of the left-side CSL 40L toward the left end as the distance D decreases. Also, in the first embodiment, the illumination control unit 47 turns on only one of the six light-emitting segments 43L, in correspondence to the distance D but may be configured to turn on or turn off the two or more light-emitting segments 43L, in correspondence to the distance D.

Also, the illumination control unit 47 may be configured to blink each light-emitting segment 43L, thereby changing the illumination state of the left-side CSL 40L. For example, the illumination control unit 47 may be configured to sequentially change the light-emitting segment 43L to be blinked, thereby changing the illumination state of the left-side CSL 40L. Likewise, the illumination control unit 47 may be configured to sequentially change the light-emitting segment 43R to be blinked, thereby changing the illumination state of the right-side CSL 40R. Also, a blinking cycle of the light-emitting segment 43L may be constant or may be varied. When varying the blinking cycle of the light-emitting segment 43L, the illumination control unit 47 may set the blinking cycle of the light-emitting segment 43L to be blinked to T1 for a predetermined time period (for example, several seconds) after the vehicle 1 detects the pedestrian P, and may set the blinking cycle of the light-emitting segment 43L to be blinked to T2 longer than T1 after the predetermined time period elapses. In this way, the blinking cycle of the light-emitting segment 43L is shortened for the predetermined time period after the vehicle 1 detects the pedestrian P, so that the pedestrian P can easily perceive that the vehicle 1 recognizes the pedestrian P.

Also, in the first embodiment, the illumination control unit 47 may be configured to turn on one of all the light-emitting segments 43L with a predetermined color (for example, green) and to turn on the other light-emitting segments 43L with a color (for example, white) different from the predetermined color. In this state, the illumination control unit 47 may be configured to sequentially change the light-emitting segment 43L to be turned on with the predetermined color.

Also, the vehicle control unit 3 may be configured to determine the light-emitting segment 43L to be turned on, in correspondence to an angle θ (an example of the relative positional relation) defined by a line connecting the vehicle 1 and the pedestrian P and the traveling direction of the vehicle 1. Specifically, the vehicle control unit 3 may be configured to specify the angle θ, based on the position information of the pedestrian P (information about the relative position of the pedestrian P to the vehicle 1) and to determine the light-emitting segment 43L to be turned on of the left-side CSL 40L, in correspondence to the specified angle θ.

Returning to FIG. 5, when the vehicle control unit 3 determines that the vehicle 1 has stopped ahead of the crosswalk C (YES in step S4), the illumination control unit 47 sequentially changes the light-emitting segment to be turned on of the six light-emitting segments 43L of the left-side CSL 40L and the six light-emitting segments 43R of the right-side CSL 40R, along a direction (hereinafter, referred to as 'movement direction') in which the pedestrian P crosses the crosswalk C (step S5). In this way, when the vehicle 1 has stopped after detecting the pedestrian P, the illumination control unit 47 changes the illumination states of the left-side CSL 40L and of the right-side CSL 40R.

Figure 9A:
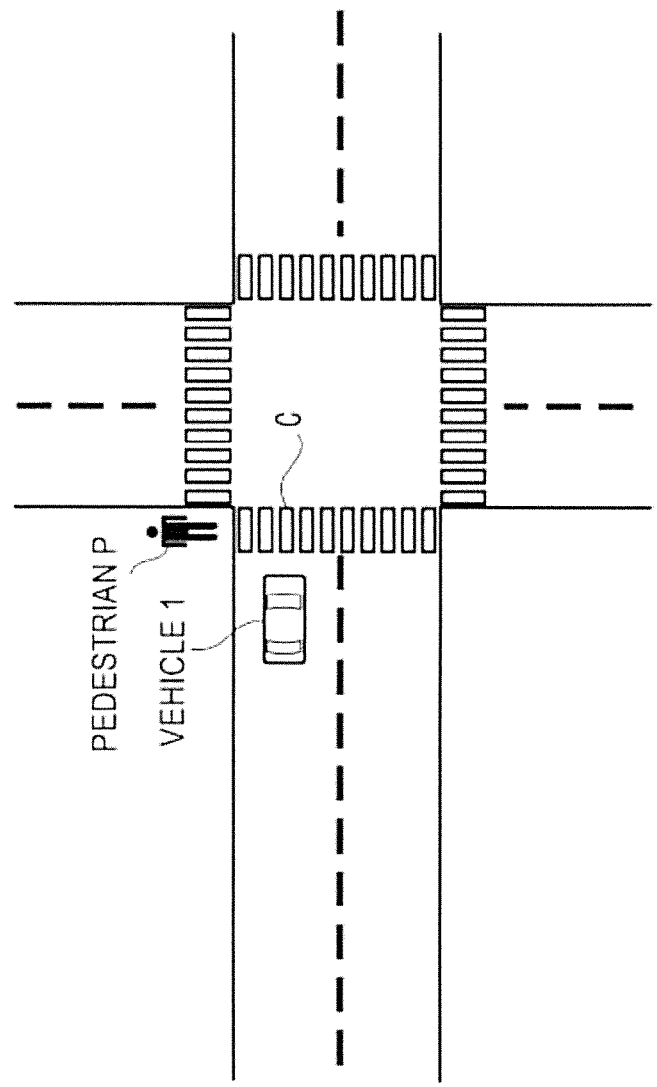
FIG. 9A depicts a situation where the pedestrian is in the vicinity of the crosswalk and the vehicle has stopped ahead of the crosswalk.

Specifically, when it is determined that the vehicle 1 has stopped, based on the traveling state information of the vehicle 1 acquired by the sensor 5, the vehicle control unit 3 determines the movement direction of the pedestrian P by determining whether the pedestrian P exists at the left side or the right side relative to the vehicle 1. For example, as shown in FIG. 9A, when the pedestrian P exists at the left side relative to the vehicle 1, the vehicle control unit 3 determines that the pedestrian P exists at the left side relative to the vehicle 1 and determines that the movement direction of the pedestrian P is a rightward direction, as seen from the vehicle 1. To the contrary, when the pedestrian P exists at the right side relative to the vehicle 1, the vehicle control unit 3 determines that the pedestrian P exists at the right side relative to the vehicle 1 and determines that the movement direction of the pedestrian P is a leftward direction, as seen from the vehicle 1.

Figure 9B:
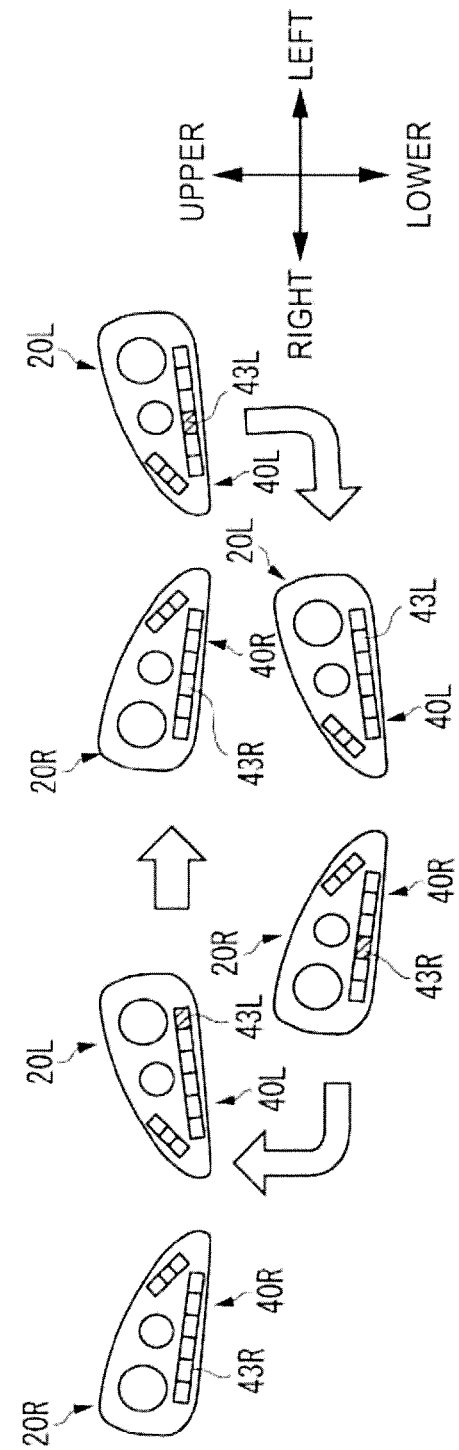
FIG. 9B depicts illumination states of the left-side communication support lamp and the right-side communication support lamp in the situation shown in FIG. 9A.

Then, the vehicle control unit 3 generates an illumination control signal for instructing generation of an illumination pattern to be sequentially turned on along the movement direction of the pedestrian P and transmits the illumination control signal to the illumination control unit 47. The illumination control unit 47 sequentially changes the light-emitting segment to be turned on of the six light-emitting segments 43L; 43R along the movement direction of the pedestrian P, based on the transmitted illumination control signal. For example, in the situation shown in FIG. 9A, the vehicle control unit 3 transmits an illumination control signal for instructing generation of an illumination pattern to be sequentially turned on rightward to the illumination control unit 47, and the illumination control unit 47 sequentially changes rightward the light-emitting segment to be turned on, based on the transmitted illumination control signal. In FIG. 9B, the light-emitting segment 43L positioned at the leftmost side, the light-emitting segment 43L located at the fourth position from the left end of the left-side CSL 40L and the light-emitting segment 43R located at the fourth position from the left end of the right-side CSL 40R are respectively turned on. However, actually, one light-emitting segment may be sequentially turned on or two or more light-emitting segments may be sequentially turned on between the light-emitting segment 43L positioned at the leftmost side (hereinafter, referred to as 'light-emitting segment 43Lm') and the light-emitting segment 43R positioned at the rightmost side (hereinafter, referred to as 'light-emitting segment 43Rm'). In the meantime, the sequential lighting of the light-emitting segments includes not only the lighting where the light-emitting segment is turned on one by one between the light-emitting segment 43Lm and the light-emitting segment 43Rm but also the lighting where the light-emitting segment is turned on every other segment (or every two or more segments).

Then, in step S6, the vehicle control unit 3 determines whether the pedestrian P has completely crossed the crosswalk C, based on the surrounding environment information transmitted from the camera 6 and/or the radar 7. When it is determined that the pedestrian P has not completely crossed the crosswalk C (NO in step S6), the processing returns to step S5. In this way, while the pedestrian P is crossing the crosswalk C, the processing of step S5 and step S6 is repetitively executed.

According to the first embodiment, the light-emitting segment to be turned on of the six light-emitting segments 43L; 43R is sequentially turned on along the movement direction of the pedestrian P, so that the illumination states of the left-side CSL 40L and of the right-side CSL 40R are changed. In this way, the pedestrian P in the vicinity of the crosswalk C can perceive that the vehicle 1 recognizes the pedestrian P by seeing the sequential change of the light-emitting segment to be turned on, and can cross in relief the crosswalk C. As a result, the light-emitting segment is sequentially turned on along the movement direction of the pedestrian P, so that the pedestrian P is urged to cross the crosswalk C.

Also, the left-side CSL 40L and the right-side CSL 40R are respectively arranged in the lamp chambers of the left-side headlamp 20L and the right-side headlamp 20R that are noticed by the pedestrian P in front of the vehicle 1. In this respect, the left-side headlamp 20L is mounted with the left low beam lamp 60L and the left high beam lamp 70L, and the right-side headlamp 20R is mounted with the right low beam lamp 60R and the right high beam lamp 70R. Therefore, since the pedestrian P ahead of the vehicle 1 can easily perceive the change in the illumination states of the left-side CSL 40L and the right-side CSL 40R, it is possible to increase effectiveness of the pedestrian-to-vehicle communication between the pedestrian P and the vehicle 1. Also, since it is not necessary to separately provide spaces, in which the left-side CSL 40L and the right-side CSL 40R are to be arranged, in the vehicle, it is possible to secure a degree of design freedom of an exterior package of the vehicle 1.

In the meantime, in the first embodiment, the light-emitting segment to be turned on is sequentially changed. However, to the contrary, the light-emitting segments 43L, 43R to be turned on may be sequentially changed. For example, the illumination control unit 47 turns off all the light-emitting segments 43L, 43R immediately after the vehicle 1 has stopped ahead of the crosswalk C. Then, the illumination control unit 47 sequentially changes the light-emitting segment to be turned off of the six light-emitting segments 43L, 43R along the movement direction of the pedestrian P, based on an illumination control signal for instructing generation of an illumination pattern to be sequentially turned off along the movement direction of the pedestrian P. Meanwhile, in the below, the light-emitting segments 43L, 43R may be simply referred to as the light-emitting segment 43.

Also, the illumination control unit 47 may sequentially change the light-emitting segment 43L, 43R to be blinked. Also, a blinking cycle of the light-emitting segment 43 may be constant or may be varied. When varying the blinking cycle of the light-emitting segment 43, the illumination control unit 47 may set the blinking cycle of the light-emitting segment 43 to be blinked to T1 for a predetermined time period (for example, several seconds) after the vehicle 1 has stopped, and may set the blinking cycle of the light-emitting segment 43 to be blinked to T2 longer than T1 after the predetermined time period elapses. In this way, the blinking cycle of the light-emitting segment 43 is shortened for the predetermined time period after the vehicle 1 has stopped, so that the pedestrian P can easily perceive that the vehicle 1 recognizes the pedestrian P.

Also, the illumination control unit 47 may sequentially change the illumination color of the light-emitting segment. For example, the illumination control unit 47 turns on all the light-emitting segments 43L, 43R with the white light immediately after the vehicle 1 has stopped ahead of the crosswalk C. Then, the illumination control unit 47 sequentially changes the light-emitting segment, which is to be turned on with the green light, of the six light-emitting segments 43L; 43R along the movement direction of the pedestrian P, based on an illumination control signal for instructing generation of an illumination pattern to be sequentially turned on with the green light along the movement direction of the pedestrian P. In this example, one of all the light-emitting segments is turned on with the green light and the other light-emitting segments are turned on with the white light. Also, the light-emitting segment to be turned on with the green light sequentially changes along the movement direction of the pedestrian P. In the meantime, the green light has been here exemplified. However, the light-emitting segment may be sequentially turned on with the light of another color.

Also, in the first embodiment, when the vehicle 1 has stopped after detecting the pedestrian P, the illumination control unit 47 changes the illumination states of the left-side CSL 40L and the right-side CSL 40R. However, the illumination state of one of the left-side CSL 40L and the right-side CSL 40R may be changed.

Also, in the first embodiment, when the vehicle 1 has stopped ahead of the crosswalk C, the illumination control unit 47 sequentially changes the light-emitting segment 43 to be turned on. However, in order to present information, which indicates that the vehicle 1 has stopped, toward the pedestrian P, the illumination states of the left-side CSL 40L and the right-side CSL 40R may be changed in a manner different from the first embodiment. For example, when the vehicle 1 has stopped ahead of the crosswalk C, the illumination control unit 47 may blink each of the light-emitting segments 43 and then gradually change a blinking state of each of the light-emitting segments 43. Specifically, the illumination control unit 47 may gradually change the blinking cycle of each of the light-emitting segments 43 or gradually change the luminescence intensity of each of the light-emitting segments 43 being blinked. Also, the illumination control unit 47 may present information for urging the pedestrian P to cross the crosswalk C toward the pedestrian P while presenting the information, which indicates that the vehicle 1 has stopped, toward the pedestrian P.

Returning to FIGS. 6A-6B, when it is determined that the pedestrian P has completely crossed the crosswalk C (YES in step S6), the vehicle control unit 3 starts the vehicle 1 (step S7). Specifically, the vehicle control unit 3 transmits an accelerator control signal to the accelerator actuator 16, and the accelerator actuator 16 controls the accelerator device 17, based on the transmitted accelerator control signal. In this way, the vehicle 1 is started. On the other hand, before the pedestrian P has completely crossed the crosswalk C, the vehicle 1 may be started.

Figures 10A, 10B:
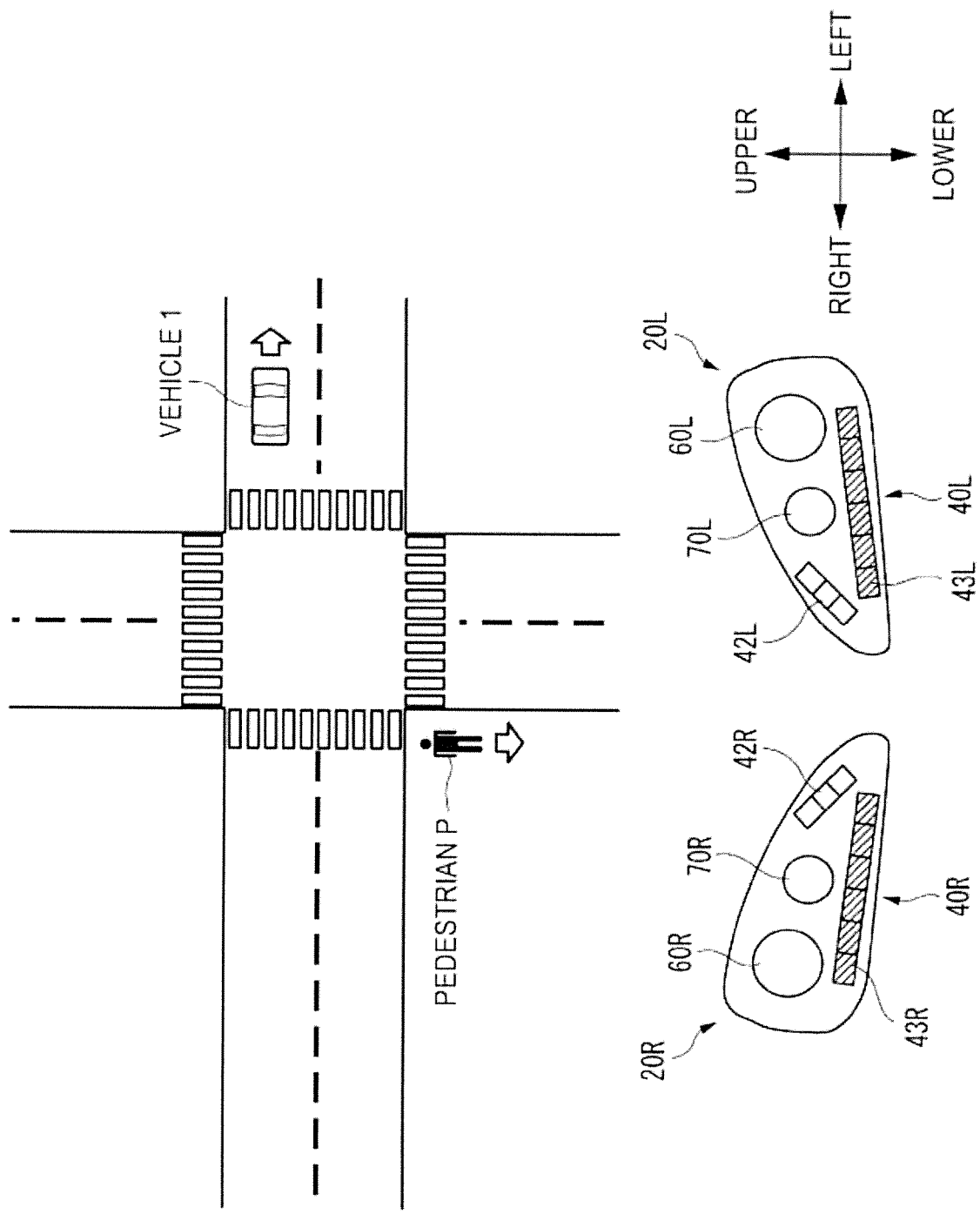
FIG. 10A depicts a situation where the pedestrian has crossed the crosswalk and the vehicle has passed the intersection point.
FIG. 10B depicts illumination states of the left-side communication support lamp and the right-side communication support lamp in the situation shown in FIG. 10A.

Then, as shown in FIG. 10B, the illumination control unit 47 turns on all the light-emitting segments 43L, 43R with the white light, thereby causing the illumination system 4 to function as the DRL (step S8). In particular, the vehicle control unit 3 transmits an illumination control signal for instructing the illumination system 4 to function as the DRL to the illumination control unit 47, and the illumination control unit 47 supplies the electric signal to the white LED 400*d* belonging to each of the light-emitting segments 43L, 43R, based on the transmitted illumination control signal. Each white LED 400*d* emits the white light, in correspondence to the supplied electric signal. The illumination system 4 may be caused to function as the DRL after the vehicle 1 has passed the intersection point, as shown in FIG. 10A, or immediately after the vehicle 1 is started. In this way, the series of operation flows of the illumination system 4 are over. In the meantime, the illumination control unit 47 may cause the illumination system 4 to function as the clearance lamp, instead of the DRL.

In the meantime, when the vehicle 1 starts, the illumination control unit 47 may change the illumination states of the left-side CSL 40L and the right-side CSL 40R so as to present information, which indicates that the vehicle 1 starts, toward the pedestrian P. For example, the illumination control unit 47 may blink all the light-emitting segments 43L, 43R by a predetermined number of times (for example, three times) so as to present the information, which indicates that the vehicle 1 starts, toward the pedestrian P.

Then, the illumination control unit 47 causes the illumination system 4 to function as the DRL.

According to the first embodiment, when the vehicle 1 detects the pedestrian P, the illumination control unit 47 changes the illumination states of the left-side CSL 40L and the right-side CSL 40R and causes the illumination system 4 to function as the DRL in normal times. In this way, it is possible to provide the illumination system 4 capable of implementing the function of presenting the information, which indicates that the vehicle 1 traveling in the automatic driving mode recognizes the pedestrian P, to the pedestrian P and the function of the DRL (or the clearance lamp). Also, since the pedestrian P can perceive that the vehicle 1 recognizes the pedestrian P by seeing the change in the illumination states of the left-side CSL 40L and the right-side CSL 40R, the pedestrian can feel relieved.

Also, since it is not necessary to separately provide the DRL to the headlamp 20, it is possible to sufficiently secure a space for arranging the CSL 40 in the lamp chamber of the headlamp 20 without increasing an entire size of the headlamp 20.

Also, since each of the six light-emitting segments 43L, 43R includes the red LED 400*a*, the green LED 400*b* and the blue LED 400*c*, each light-emitting segment can emit the red light, the green light and the blue light toward the outside. That is, since each of the light-emitting segments has the RGB light sources, it is possible to emit the lights of diverse colors. In this ways, it is possible to form a variety of illumination patterns by the left-side CSL 40L and the right-side CSL 40R, so that it is possible to increase an amount of information in the pedestrian-to-vehicle communication between the pedestrian P and the vehicle 1.

Modified Embodiments

Figure 11:
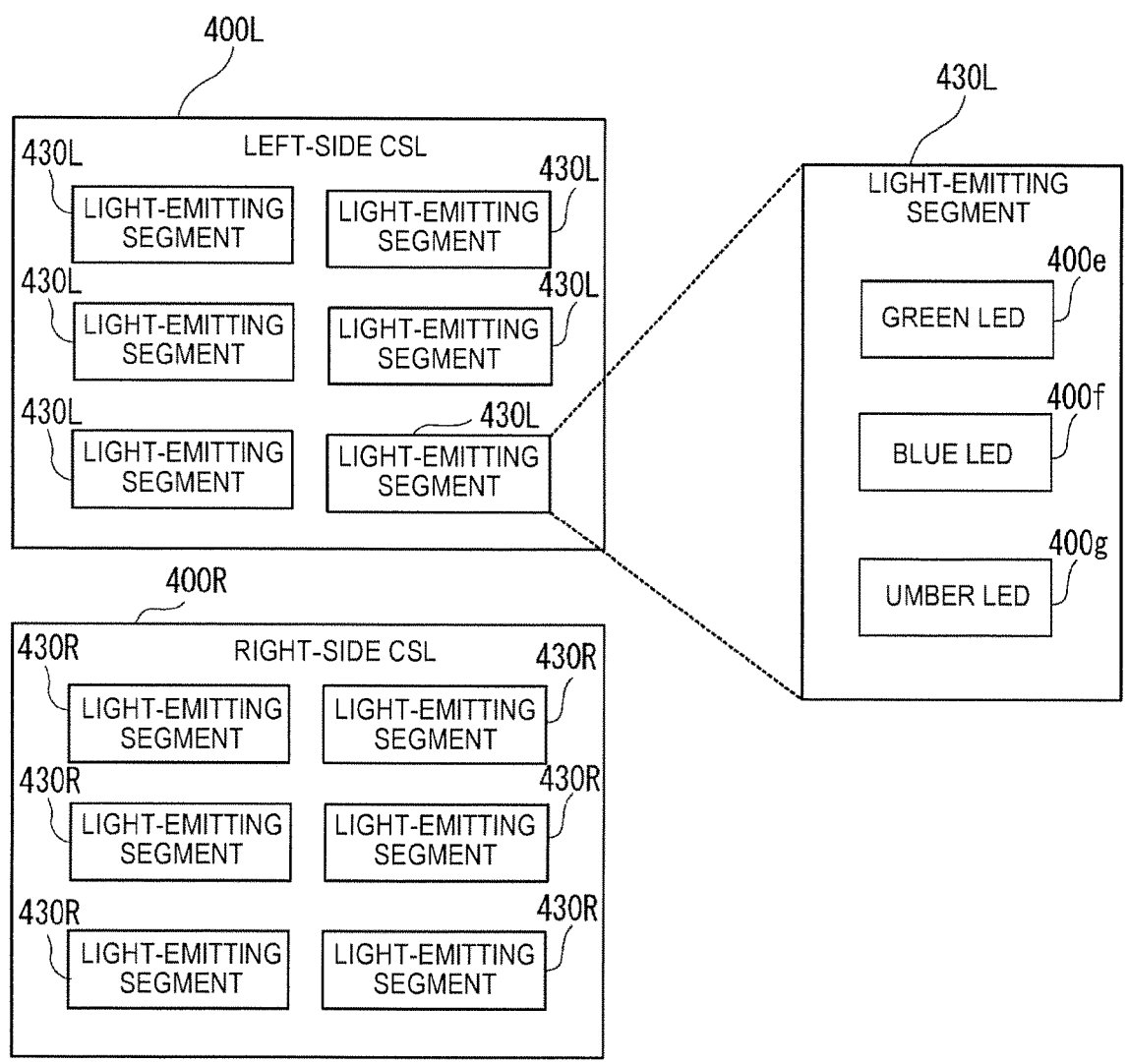
FIG. 11 is a block diagram depicting a left-side communication support lamp and a right-side communication support lamp in accordance with a modified embodiment.
Figure 12:
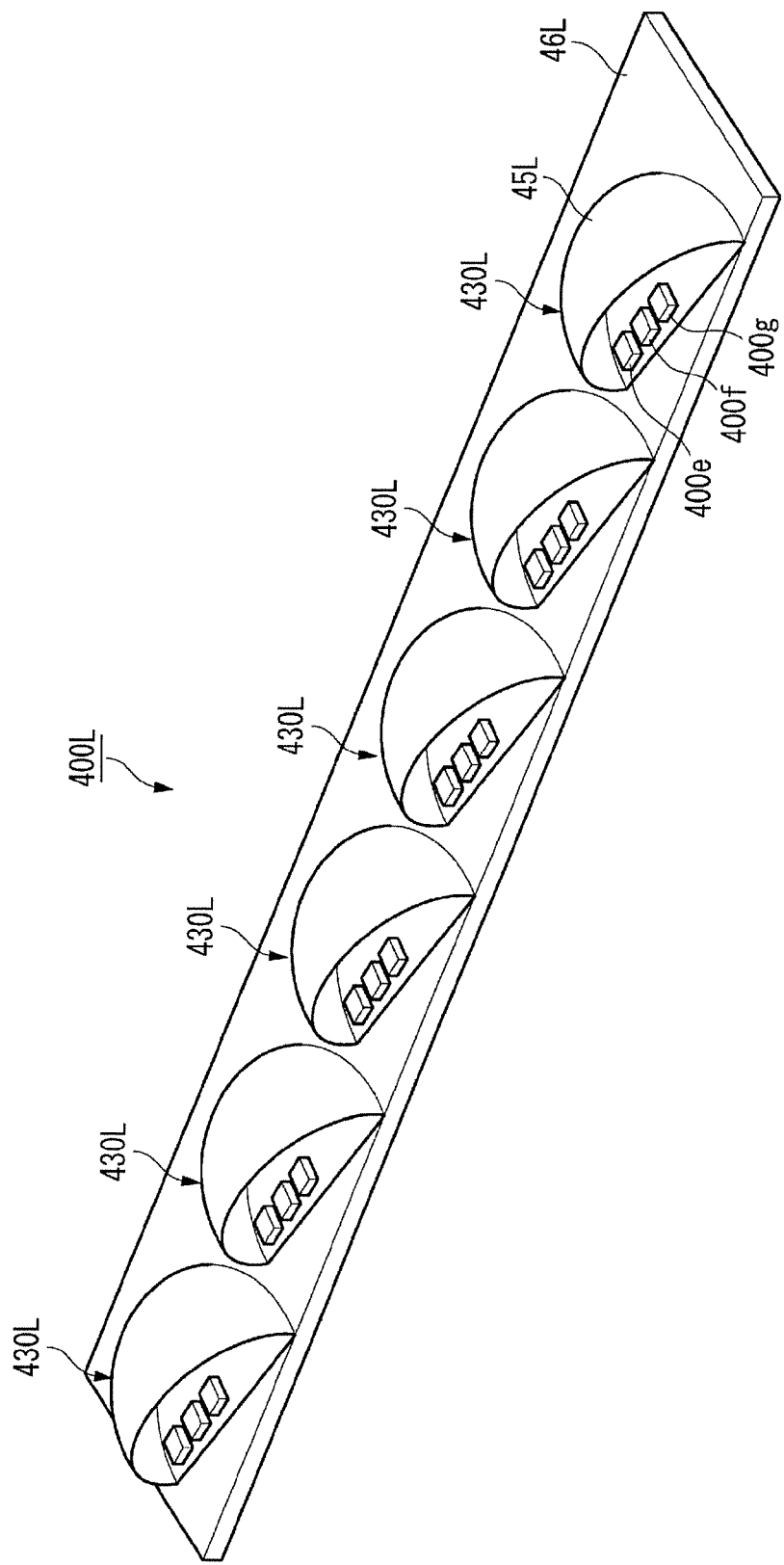
FIG. 12 is a perspective view pictorially depicting an example of the left-side communication support lamp shown in FIG. 11.
Figure 13A:
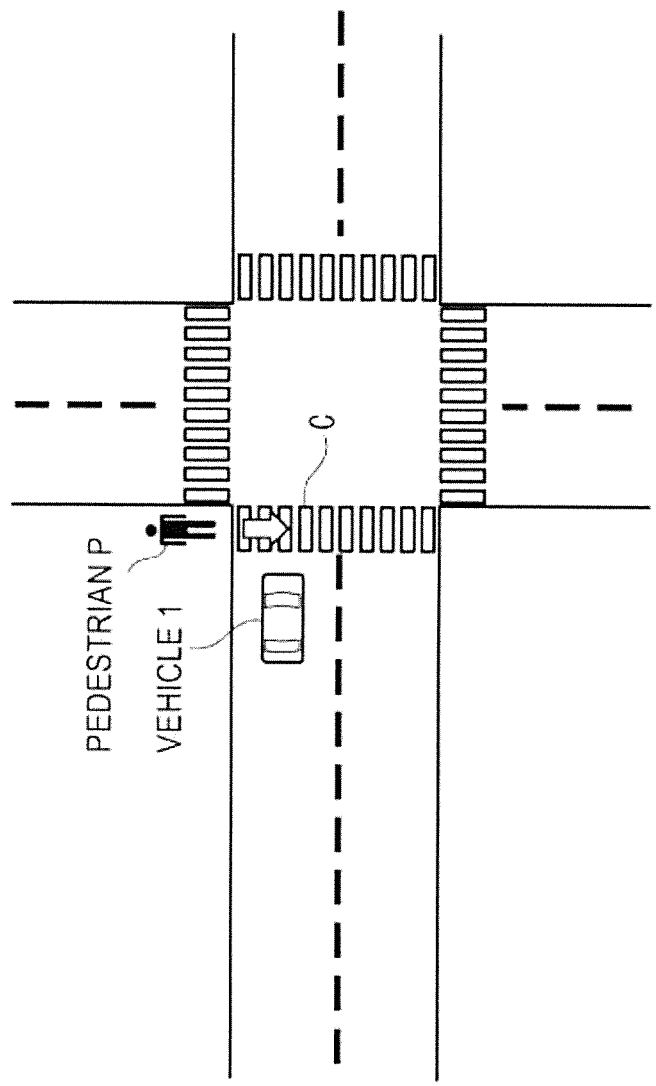
FIG. 13A depicts a situation where the pedestrian is in the vicinity of the crosswalk and the vehicle has stopped ahead of the crosswalk.
Figure 13B:
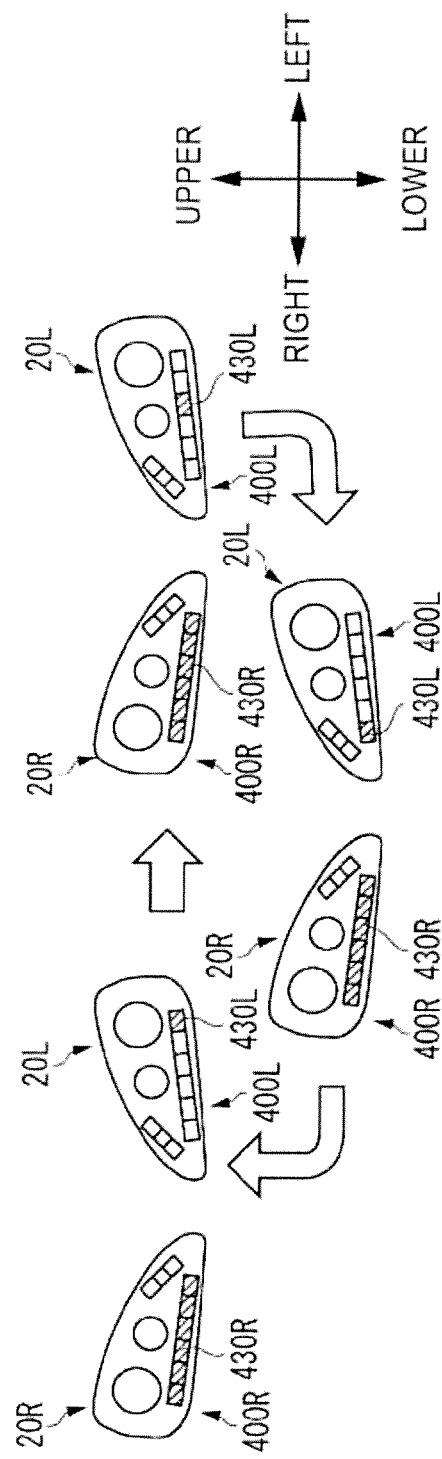
FIG. 13B depicts illumination states of the left-side communication support lamp and the right-side communication support lamp in the situation shown in FIG. 13A.
Figures 14A, 14B:
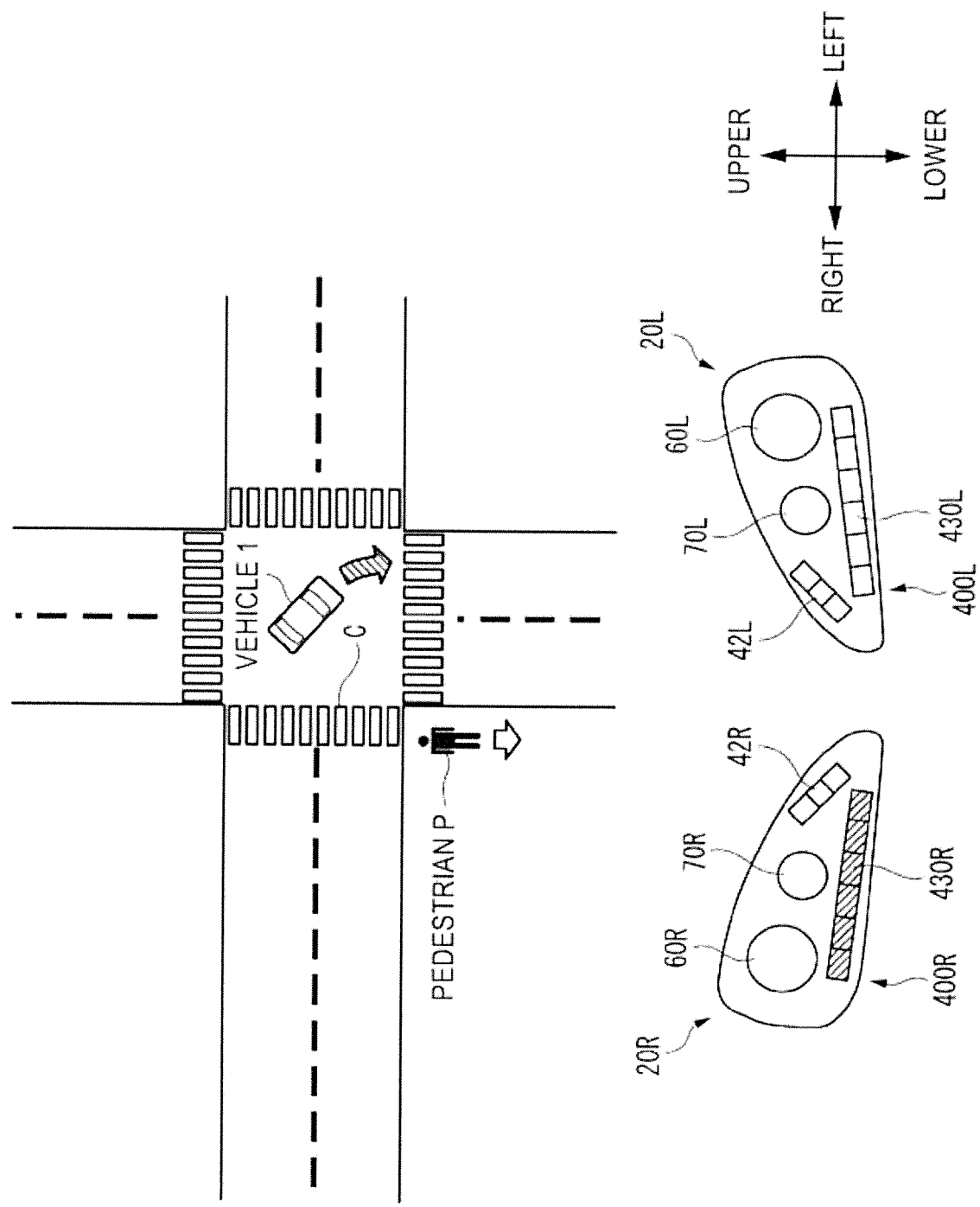
FIG. 14A depicts a situation where the pedestrian has crossed the crosswalk and the vehicle is turning right.
FIG. 14B depicts illumination states of the left-side communication support lamp and the right-side communication support lamp in the situation shown in FIG. 14A.

Subsequently, a left-side CSL 400L and a right-side CSL 400R in accordance with a modified embodiment of the first embodiment are described with reference to FIGS. 11 to 14B. FIG. 11 is a block diagram depicting the left-side CSL 400L and the right-side CSL 400R. FIG. 12 is a perspective view pictorially depicting an example of the left-side CSL 400L shown in FIG. 11. FIG. 13A depicts a situation where the pedestrian P is in the vicinity of the crosswalk C and the vehicle 1 has stopped ahead of the crosswalk C. FIG. 13B depicts illumination states of the left-side CSL 400L and the right-side CSL 400R in the situation shown in FIG. 13A. FIG. 14A depicts a situation where the pedestrian P has crossed the crosswalk C and the vehicle 1 is turning right. FIG. 14B depicts illumination states of the left-side CSL 400L and the right-side CSL 400R in the situation shown in FIG. 14A. In the below, the matters already described are not repeatedly described.

As shown in FIG. 11, the left-side CSL 400L includes six light-emitting segments 430L arranged side by side in the right and left direction. Each of the light-emitting segments 430L includes a green LED 400*e* (green light-emitting element), a blue LED 400*f* (blue light-emitting element), and an amber LED 400*g* (amber light-emitting element) configured to emit amber light. In the below, for the sake of convenience of description, the green LED 400*e*, the blue LED 400*f* and the amber LED 400*g* may be collectively referred to as the LED 400.

The illumination control unit 47 can individually control lightings of the respective LEDs 400 belonging to the respective light-emitting segments 430L (i.e., individually supply the electric signal to the respective LEDs 400), thereby changing an illumination state of each of the light-emitting segments 430L. Also, the illumination control unit 47 can change the illumination state of each of the light-emitting segments 430L, thereby changing an illumination state of the left-side CSL 400L. For example, when all the six light-emitting segments 430L emit the amber light, the illumination control unit 47 supplies the electric signal to the amber LED 400g belonging to each of the light-emitting segments 430L through the wiring pattern. Then, each of the amber LEDs 400g emits the amber light, in correspondence to the electric signal supplied from the illumination control unit 47. Also, the illumination control unit 47 may synchronously blink the respective light-emitting segments 430L with a predetermined frequency by supplying a pulse signal having a predetermined frequency (for example, 1 to 2 Hz) to the amber LEDs 400g belonging to the respective light-emitting segments 430L. As a result, the illumination control unit 47 can cause the illumination system 4 to function as the TSL.

Also, the right-side CSL 400R includes six light-emitting segments 430R arranged side by side in the right and left direction. Each of the light-emitting segments 430R includes a green LED 400e, a blue LED 400f, and an amber LED 400g. The specific configuration of the right-side CSL 400R is the same as the specific configuration of the left-side CSL 400L shown in FIG. 11.

The illumination control unit 47 can individually control lightings of the respective LEDs 400 belonging to the respective light-emitting segments 430R (i.e., individually supply the electric signal to the respective LEDs 400), thereby changing an illumination state of each of the light-emitting segments 430R. The illumination control method of the right-side CSL 400R is the same as the illumination control method of the left-side CSL 400L shown in FIG. 4.

Subsequently, an operation flow of the illumination system 4 including the left-side CSL 400L and the right-side CSL 400R of the modified embodiment is described with reference to FIGS. 5, 13A-13B and 14A-14B. This operation flow is different from the operation flow of the first embodiment, in terms of steps S5 and S8. Also, in this operation flow, it is assumed that the vehicle 1 is turning right at the intersection point. Therefore, processing of steps S5 and S8 are described.

As shown in FIG. 13B, in step S5, the illumination control unit 47 synchronously blinks the six light-emitting segments 430R with a predetermined cycle (for example, 1 to 2 Hz) while sequentially changing the light-emitting segment 430L to be turned on of the six light-emitting segments 430L along the movement direction of the pedestrian P, based on the illumination control signal transmitted from the vehicle control unit 3.

In this way, the pedestrian P in the vicinity of the crosswalk C can perceive that the vehicle 1 recognizes the pedestrian P by seeing the sequential change of the light-emitting segment 430L to be turned on, and can thus cross in relief the crosswalk C. As a result, the light-emitting segment 430L is sequentially turned on along the movement direction of the pedestrian P, so that the pedestrian P is urged to cross the crosswalk C. Also, the pedestrian P can perceive that the vehicle 1 is to turn right by seeing the situation where the respective light-emitting segments 430R emit the amber light and synchronously blink with the predetermined frequency. That is, the illumination system 4 can implement the function of presenting the information, which indicates that the vehicle 1 recognizes the pedestrian P, to the pedestrian P, and the function of the TSL.

In step S8, as shown in FIG. 14B, the illumination control unit 47 turns off the light-emitting segments 430L and synchronously blinks the respective light-emitting segments 430R with the amber light, thereby causing the illumination system 4 to function only as the TSL. Then, when it is determined that the right turn of the vehicle 1 is over, based on the surrounding environment information transmitted from the camera 6 and/or the radar 7, the vehicle control unit 3 generates an illumination control signal for stopping the function of the TSL and transmits the illumination control signal to the illumination control unit 47. The illumination control unit 47 turns off the light-emitting segments 430R, based on the transmitted illumination control signal. On the other hand, when the vehicle 1 turns left, the illumination control unit 47 synchronously blinks the respective light-emitting segments 430L with the amber light, thereby causing the illumination system 4 to function as the TSL.

Second Embodiment

Figure 15:
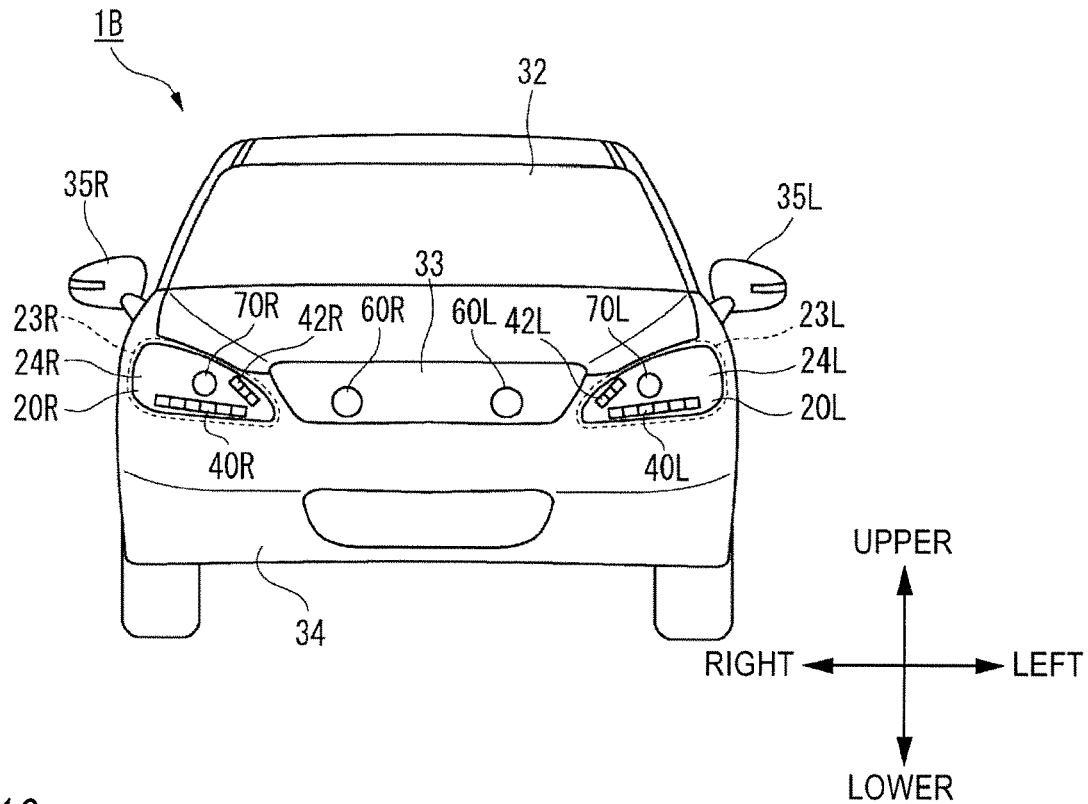
FIG. 15 is a front view of the vehicle having a vehicle illumination system in accordance with a second embodiment of the present invention (hereinafter, simply to referred to as 'first embodiment').

In the below, a vehicle 1B in accordance with a second embodiment is described with reference to FIGS. 15 and 2. FIG. 15 is a front view of the vehicle 1B having the illumination system 4 mounted thereto.

As shown in FIG. 15, the illumination system 4 (refer to FIG. 2) includes the left-side headlamp 20L, the left low beam lamp 60L, the right-side headlamp 20R, and the right low beam lamp 60R. The left-side headlamp 20L is mounted to a front left side of the vehicle 1B, and includes the housing 23L, the cover 24L mounted to the housing 23L, and the left high beam lamp 70L (second lamp). The cover 24L is configured by a light-penetrating member through which light can pass, for example. A lamp chamber is formed by the housing 23L and the cover 24L, and the left high beam lamp 70L is arranged in the lamp chamber. The left high beam lamp 70L is configured to emit the high beam toward the front of the vehicle 1B. The left low beam lamp 60L (first lamp) is arranged at the front grill 33 of the vehicle 1B, which is an example of the place of the vehicle 1B outside the lamp chamber of the left-side headlamp 20L, and is configured to emit the low beam toward the front of the vehicle 1B.

The right-side headlamp 20R is mounted to a front right side of the vehicle 1B, and includes the housing 23R, the cover 24R mounted to the housing 23R, and the right high beam lamp 70R (second lamp). The cover 24R is configured by a light-penetrating member through which light can pass, for example. A lamp chamber is formed by the housing 23R and the cover 24R, and the right high beam lamp 70R is arranged in the lamp chamber. The right high beam lamp 70R is configured to emit the high beam toward the front of the vehicle 1B. The right low beam lamp 60R (first lamp) is arranged at the front grill 33 of the vehicle 1B, which is an example of the place of the vehicle 1B outside the lamp chamber of the right-side headlamp 20R, and is configured to emit the low beam toward the front of the vehicle 1B.

The illumination system 4 further includes the left-side CSL 40L, the left-side auxiliary CSL 42L, the right-side CSL 40R, the right-side auxiliary CSL 42R, and the illumination control unit 47 (refer to FIG. 2). Each of the left-side CSL 40L, the left-side auxiliary CSL 42L, the right-side CSL 40R and the right-side auxiliary CSL 42R is a lamp for supporting communication between the target object such as the pedestrian, the other vehicle and the like and the vehicle 1B.

The left-side CSL 40L and the left-side auxiliary CSL 42L are configured to emit the light toward an outside of the vehicle 1B, and are arranged in the lamp chamber of the left-side headlamp 20L so that they can be visually recognized from the front of the vehicle 1B. The left-side CSL 40L is arranged to extend in the right and left direction of the vehicle 1B. The left-side auxiliary CSL 42L is arranged to extend in a direction inclined relative to the left-side CSL 40L by a predetermined angle (for example, an acute angle).

The right-side CSL 40R and the right-side auxiliary CSL 42R are configured to emit the light toward an outside of the vehicle 1B, and are arranged in the lamp chamber of the right-side headlamp 20R so that they can be visually recognized from the front of the vehicle 1B. The right-side CSL 40R is arranged to extend in the right and left direction of the vehicle 1B. The right-side auxiliary CSL 42R is arranged to extend in a direction inclined relative to the right-side CSL 40R by a predetermined angle (for example, an acute angle).

Like this, the vehicle 1B of the second embodiment is different from the vehicle 1 of the first embodiment, in that the left low beam lamp 60L and the right low beam lamp 60R are arranged at the front grill 33. In the meantime, since the vehicle system and the illumination system of the second embodiment have the same configurations as the vehicle system 2 and the illumination system 4 shown in FIG. 2, the descriptions thereof are omitted. Also, in the second embodiment, both the left low beam lamp 60L and the right low beam lamp 60R are arranged at the front grill 33 but may be arranged at the bumper 34, the front grill 33, the left-side door mirror 35L, the right-side door mirror 35R or the front window 32 of the vehicle 1B.

According to the second embodiment, the left-side CSL 40L and the right-side CSL 40R are respectively arranged in the lamp chambers of the left-side headlamp 20L and the right-side headlamp 20R, which are noticed by the pedestrian P ahead of the vehicle 1B. In this respect, the left-side headlamp 20L is mounted with the left high beam lamp 70L, and the right-side headlamp 20R is mounted with the right high beam lamp 70R. Therefore, since the pedestrian P ahead of the vehicle 1B can easily perceive the change in the illumination states of the left-side CSL 40L and the right-side CSL 40R, it is possible to increase the effectiveness of the pedestrian-to-vehicle communication between the pedestrian P and the vehicle 1B. Also, the left low beam lamp 60L is arranged at the front grill 33 of the vehicle 1B other than the lamp chamber of the left-side headlamp 20L, and the right low beam lamp 60R is arranged at the front grill 33 of the vehicle 1B other than the lamp chamber of the right-side headlamp 20R. For this reason, it is possible to sufficiently secure the space for arranging the left-side CSL 40L in the lamp chamber of the left-side headlamp 20L without increasing the entire size of the left-side headlamp 20L and to sufficiently secure the space for arranging the right-side CSL 40R in the lamp chamber of the right-side headlamp 20R without increasing the entire size of the right-side headlamp 20R.

Subsequently, first to fifth modified embodiments of the second embodiment are described with reference to FIGS. 16 to 20.

First Modified Embodiment

Figure 16:
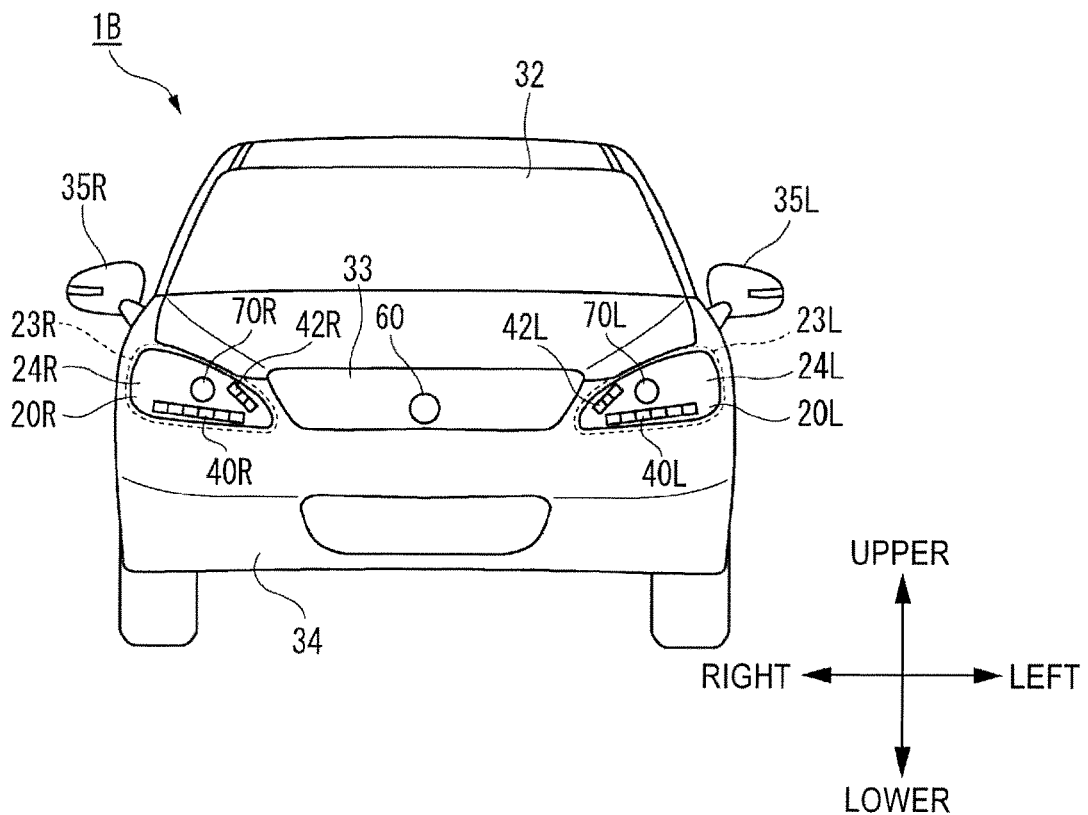
FIG. 16 is a front view of the vehicle having a vehicle illumination system in accordance with a first modified embodiment of the second embodiment.

FIG. 16 is a front view of the vehicle 1B having an illumination system of the first modified embodiment. The illumination system shown in FIG. 16 is different from the illumination system shown in FIG. 15, in that the number of the low beam lamp is one. That is, in the illumination system shown in FIG. 15, the two low beam lamps (i.e., the left low beam lamp 60L and the right low beam lamp 60R) are arranged at the front grill 33. However, in the illumination system shown in FIG. 16, one low beam lamp 60 (first lamp) is arranged at the front grill 33.

Second Modified Embodiment

Figure 17:
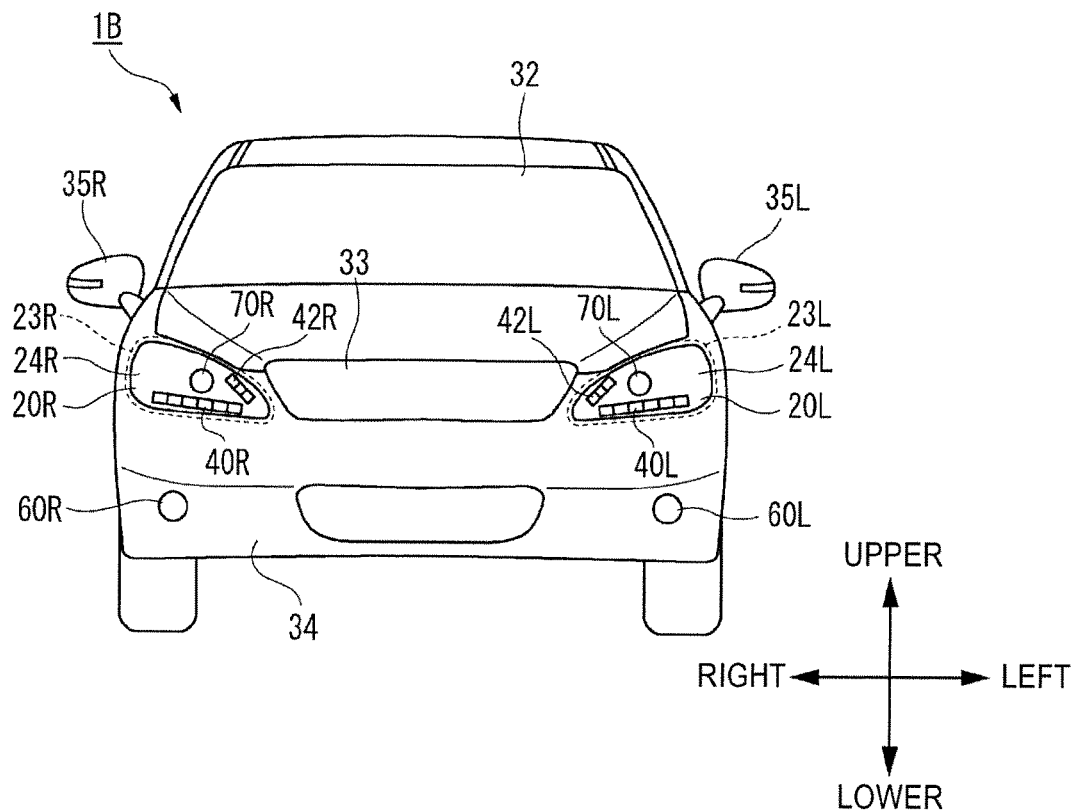
FIG. 17 is a front view of the vehicle having a vehicle illumination system in accordance with a second modified embodiment of the second embodiment.

FIG. 17 is a front view of the vehicle 1B having an illumination system of the second modified embodiment. The illumination system shown in FIG. 17 is different from the illumination system shown in FIG. 15, in that the left low beam lamp 60L and the right low beam lamp 60R are arranged at the bumper 34.

Third Modified Embodiment

Figure 18:
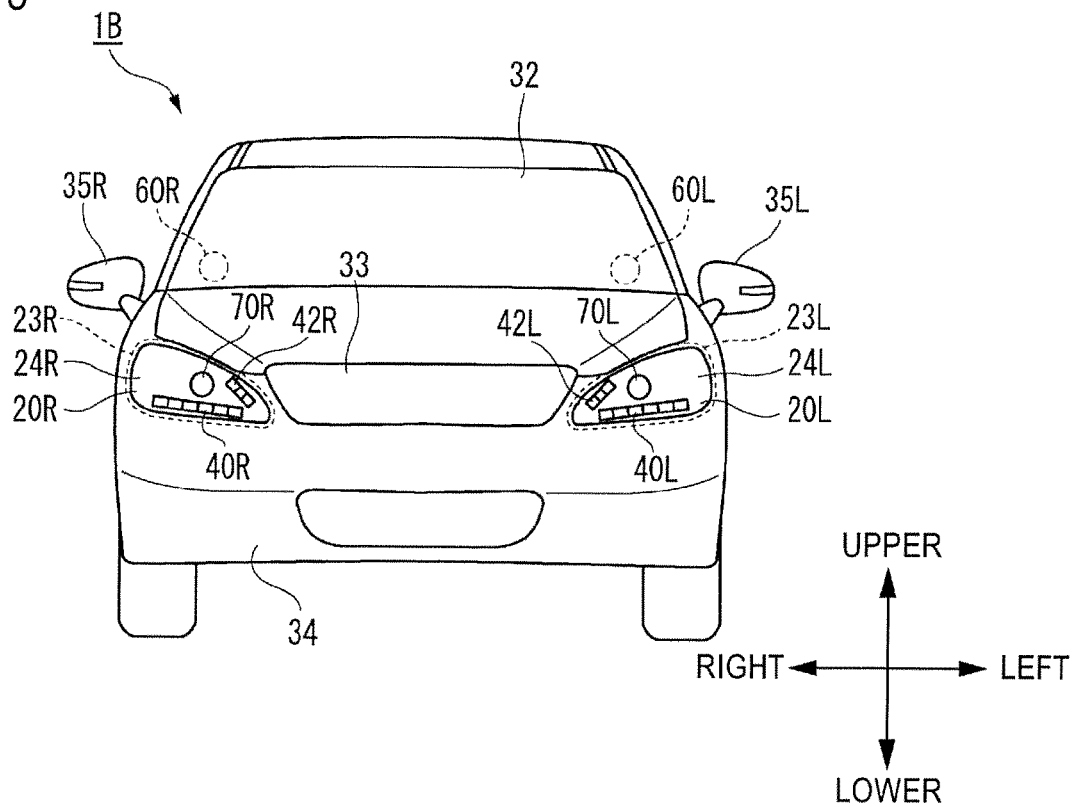
FIG. 18 is a front view of the vehicle having a vehicle illumination system in accordance with a third modified embodiment of the second embodiment.

FIG. 18 is a front view of the vehicle 1B having an illumination system of the third modified embodiment. The illumination system shown in FIG. 18 is different from the illumination system shown in FIG. 15, in that the left low beam lamp 60L and the right low beam lamp 60R are arranged in the vicinity of a lower part of the front window 32 so as to face an inner surface of the front window 32. In this case, the low beams emitted from the left low beam lamp 60L and the right low beam lamp 60R are irradiated to a front region of the vehicle 1B through the front window 32.

Fourth Modified Embodiment

Figure 19:
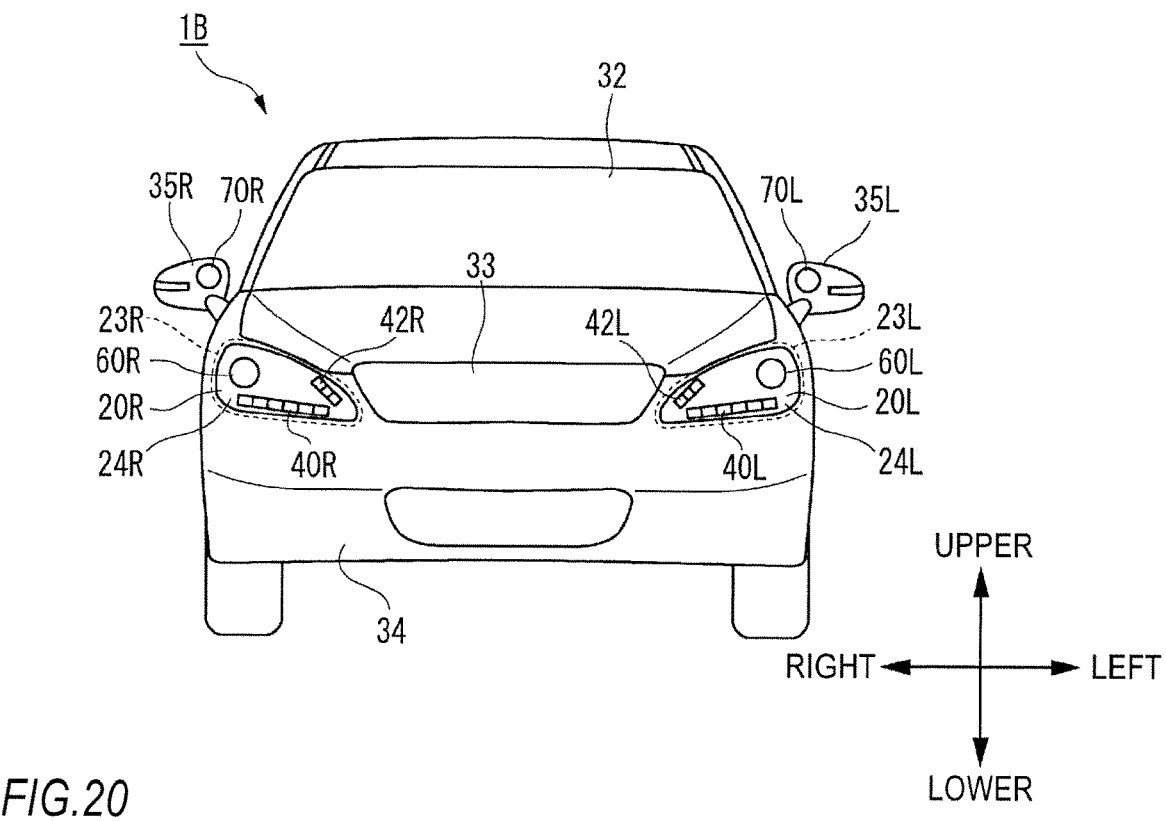
FIG. 19 is a front view of the vehicle having a vehicle illumination system in accordance with a fourth modified embodiment of the second embodiment.

FIG. 19 is a front view of the vehicle 1B having an illumination system of the fourth modified embodiment. In the illumination system shown in FIG. 19, the left low beam lamp 60L (second lamp) is arranged in the lamp chamber of the left-side headlamp 20L, and the right low beam lamp 60R (second lamp) is arranged in the lamp chamber of the right-side headlamp 20R. Also, the left high beam lamp 70L (first lamp) is arranged at the left-side door mirror 35L, and the right high beam lamp 70R (first lamp) is arranged at the right-side door mirror 35R.

Fifth Modified Embodiment

Figure 20:
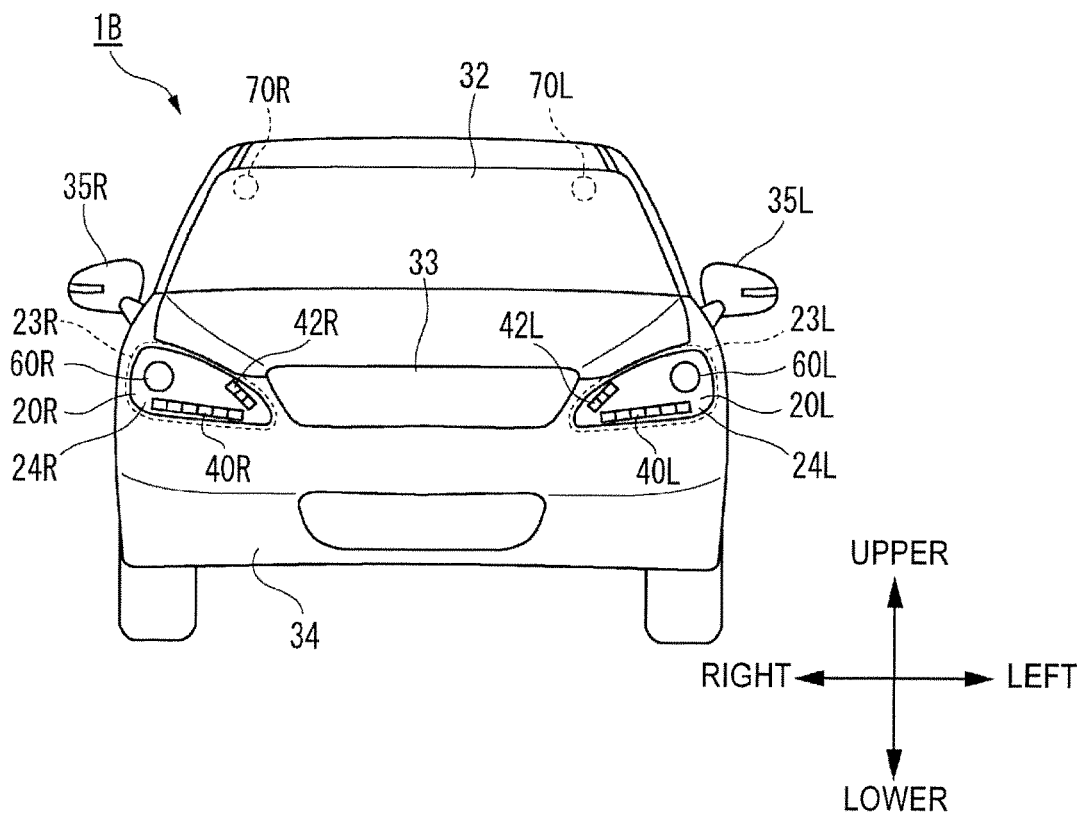
FIG. 20 is a front view of the vehicle having a vehicle illumination system in accordance with a fifth modified embodiment of the second embodiment.

FIG. 20 is a front view of the vehicle 1B having an illumination system of the fifth modified embodiment. The illumination system shown in FIG. 20 is different from the illumination system shown in FIG. 19, in that the left high beam lamp 70L and the right high beam lamp 70R are arranged in the vicinity of an upper part of the front window 32 so as to face an inner surface of the front window 32. In this case, the high beams emitted from the left high beam lamp 70L and the right high beam lamp 70R are irradiated to the front region of the vehicle 1B through the front window 32.

Also, in this embodiment, both the high beam lamp and the low beam lamp may be arranged at predetermined places of the vehicle 1B outside the lamp chamber of the headlamp 20. In this case, the clearance lamp, the DRL and/or the TSL may be arranged in the lamp chamber of the headlamp 20. Also, to the contrary, while the high beam lamp and the low beam lamp are arranged in the lamp chamber of the headlamp 20, the clearance lamp, the DRL and/or the TSL may be arranged at predetermined places of the vehicle 1B outside the lamp chamber of the headlamp 20.

Third Embodiment

Figure 21:
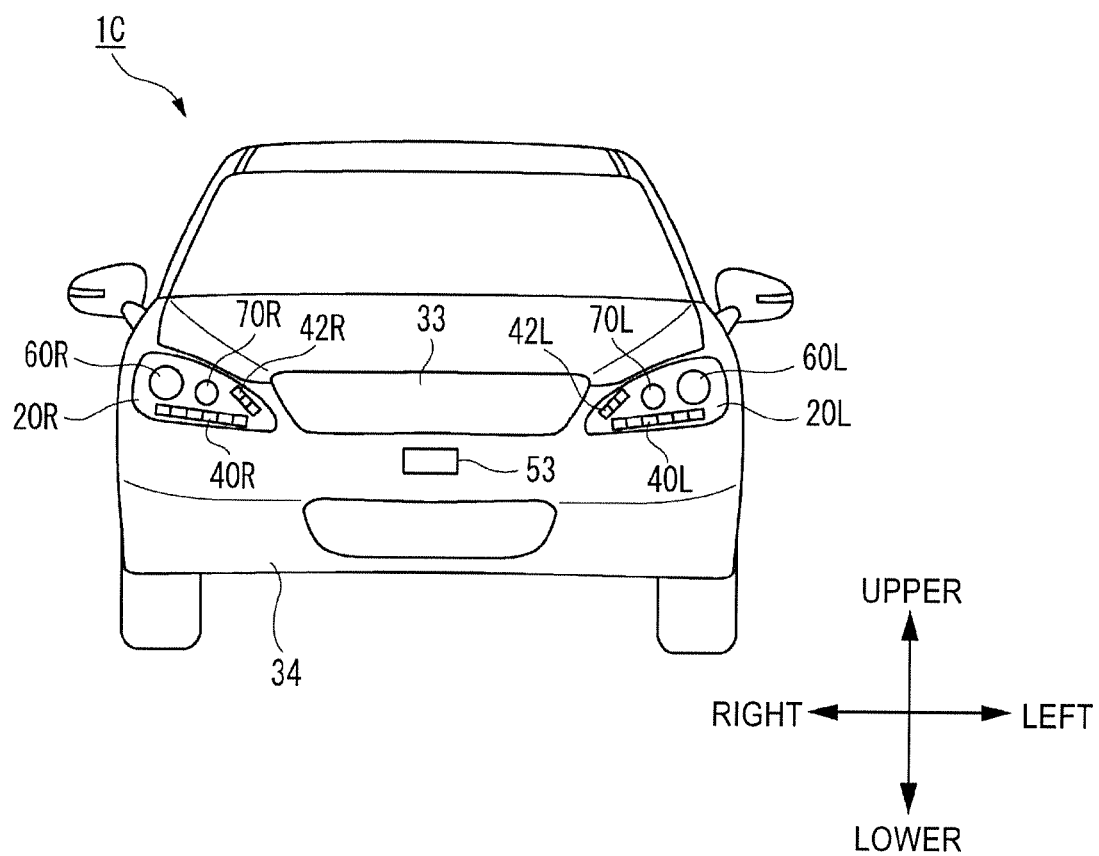
FIG. 21 is a front view of the vehicle having a vehicle illumination system in accordance with a third embodiment of the present invention.
Figure 22:
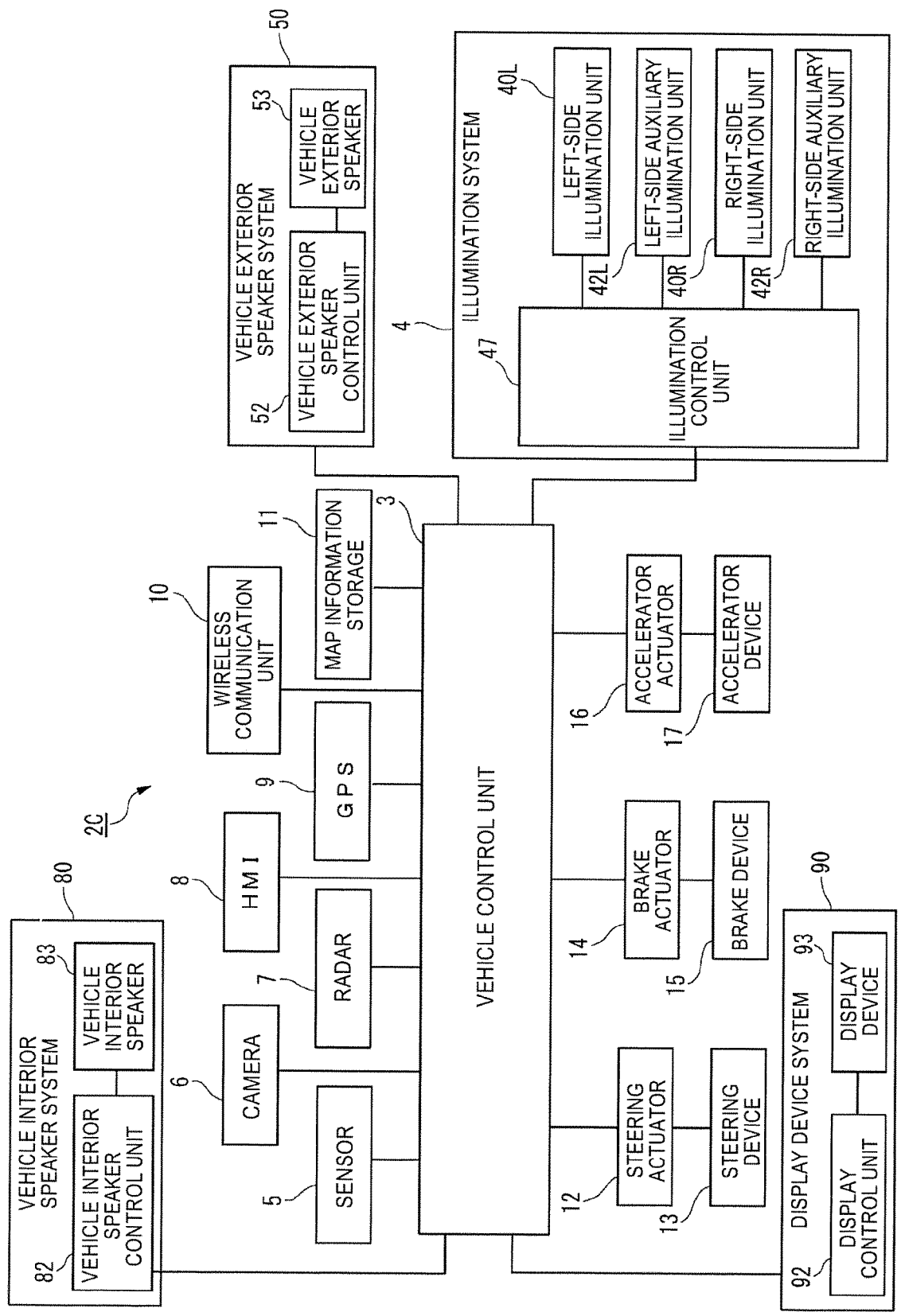
FIG. 22 is a block diagram depicting a vehicle system of the third embodiment.

In the below, a third embodiment of the present invention is described with reference to the drawings. In the third embodiment, the description of members having the same reference numerals as those already described in the description of the first embodiment will be omitted. First, a vehicle system 2C of the third embodiment is described with reference to FIGS. 21 and 22. FIG. 21 is a front view of the vehicle 1C. FIG. 22 is a block diagram depicting the vehicle system 2C. The vehicle 1C is a vehicle (automobile) capable of traveling in the automatic driving mode, and includes the illumination system 4 (refer to FIG. 22). The illumination system 4 includes the left-side CSL 40L, the left-side auxiliary CSL 42L, the right-side CSL 40R, the right-side auxiliary CSL 42R, and the illumination control unit 47.

The left-side CSL 40L and the left-side auxiliary CSL 42L are arranged in the lamp chamber of the left-side headlamp 20L mounted at a front left side of the vehicle 1C so that they can be visually recognized from the front of the vehicle 1C. The lamp chamber of the left-side headlamp 20L is formed by a lamp housing (not shown) and a transparent cover (not shown) connected to the lamp housing. The left-side CSL 40L is arranged to extend in the right and left direction of the vehicle 1C. The left-side auxiliary CSL 42L is arranged to extend in a direction inclined relative to the left-side CSL 40L by a predetermined angle (for example, an acute angle). The left-side headlamp 20L includes the left low beam lamp 60L configured to irradiate the low beam to a front region of the vehicle 1C and the left high beam lamp 70L configured to irradiate the high beam to the front region of the vehicle 1C.

The right-side CSL 40R and the right-side auxiliary CSL 42R are arranged in the lamp chamber of the right-side headlamp 20R mounted at a front right side of the vehicle 1C so that they can be visually recognized from the front of the vehicle 1C. The right-side CSL 40R is arranged to extend in the right and left direction of the vehicle 1C. The right-side auxiliary CSL 42R is arranged to extend in a direction inclined relative to the right-side CSL 40R by a predetermined angle (for example, an acute angle). The right-side headlamp 20R includes the right low beam lamp 60R configured to irradiate the low beam to the front region of the vehicle 1C and the right high beam lamp 70R configured to irradiate the high beam to the front region of the vehicle 1C.

In the meantime, the arrangement places of the left-side CSL 40L and the left-side auxiliary CSL 42L are not particularly limited inasmuch as they can be visually recognized from the front of the vehicle 1C. Likewise, the arrangement places of the right-side CSL 40R and the right-side auxiliary CSL 42R are not particularly limited inasmuch as they can be visually recognized from the front of the vehicle 1C.

Subsequently, the vehicle system 2C of the vehicle 1C is described with reference to FIG. 22. As shown in FIG. 22, the vehicle system 2C includes the vehicle control unit 3, the illumination system 4, the sensor 5, the camera 6, the radar 7, the HMI 8, the GPS 9, the wireless communication unit 10, and the map information storage 11. Also, the vehicle system 2C includes the steering actuator 12, the steering device 13, the brake actuator 14, the brake device 15, the accelerator actuator 16, and the accelerator device 17. Also, the vehicle system 2C includes a vehicle exterior speaker system 50, a vehicle interior speaker system 80, and a display device system 90.

As described above, the illumination system 4 includes the illumination control unit 47, the left-side CSL 40L, the left-side auxiliary CSL 42L, the right-side CSL 40R, and the right-side auxiliary CSL 42R. The illumination control unit 47 is configured to change the illumination states (for example, the illumination color, the illumination intensity, the blinking cycle, the illumination place, the illumination area and the like) of the left-side CSL 40L and the right-side CSL 40R. Also, the illumination control unit 47 is configured to change the illumination states (for example, the illumination color, the illumination intensity, the blinking cycle, the illumination place, the illumination area and the like) of the left-side auxiliary CSL 42L and the right-side auxiliary CSL 42R. The illumination control unit 47 is configured to control the illumination states of the left low beam lamp 60L and left high beam lamp 70L of the left-side headlamp 20L. For example, the illumination control unit 47 may be configured to move and/or change a light distribution pattern of the low beam to be emitted from the left low beam lamp 60L. Also, the illumination control unit 47 may be configured to move and/or change a light distribution pattern of the high beam to be emitted from the left high beam lamp 70L.

Likewise, the illumination control unit 47 is configured to control the illumination states of the right low beam lamp 60R and right high beam lamp 70R of the right-side headlamp 20R. For example, the illumination control unit 47 may be configured to move and/or change a light distribution pattern of the low beam to be emitted from the right low beam lamp 60R. Also, the illumination control unit 47 may be configured to move and/or change a light distribution pattern of the high beam to be emitted from the right high beam lamp 70R.

The vehicle exterior speaker system 50 includes a vehicle exterior speaker control unit 52 and a vehicle exterior speaker 53. The vehicle exterior speaker control unit 52 is configured to control the vehicle exterior speaker 53 so that a sound is to be output toward the outside of the vehicle 1C when the vehicle 1C detects a pedestrian. In other words, the vehicle exterior speaker control unit 52 is configured to output a sound (a guide voice such as "Please cross the crosswalk", a music and the like) to the vehicle exterior speaker 53, based on voice data saved therein.

The vehicle exterior speaker control unit 52 is configured by an electronic control unit (ECU) and is electrically connected to a power supply (not shown). The electronic control unit includes a microcontroller having a processor such as a CPU, an MPU and the like and a memory such as a ROM and a RAM, and other electronic circuits (for example, an amplification circuit, a DA (Digital to Analog) converter and the like). In the third embodiment, the vehicle control unit 3 and the vehicle exterior speaker control unit 52 are provided as separate configurations but may be integrally configured. Also, the voice data may be saved in advance in the ROM.

The vehicle exterior speaker 53 is configured to output a sound toward the outside of the vehicle 1C, so that the sound output from the vehicle exterior speaker 53 can be heard from the front of the vehicle 1C. The vehicle exterior speaker 53 is arranged at a front side of the vehicle 1C, and may also be arranged between the front grill 33 and the bumper 34 in the upper and lower direction of the vehicle 1C, as shown in FIG. 21, for example. The vehicle exterior speaker 53 may be a speaker of the related art, and includes at least a coil and a diaphragm. The vehicle exterior speaker 53 is configured to receive an electric signal indicative of the voice data from the vehicle exterior speaker control unit 52. The coil vibrates, in correspondence to the received electric signal, and the diaphragm vibrates in association with the vibration of the coil. In this way, since the air vibrates in association with the vibration of the diaphragm, the sound is output from the vehicle exterior speaker 53 to the outside. Also, the vehicle exterior speaker 53 may be a speaker disclosed in JP-A-2014-51161. In this case, the vehicle exterior speaker 53 is a vibrator arranged in the lamp chamber of the left-side headlamp 20L and/or the right-side headlamp 20R. The vibration generated from the vibrator is transmitted to the cover and housing of the headlamp, so that the sound is output toward the outside.

In the meantime, the vehicle exterior speaker 53 may be configured to output the sound to the entire surrounding (360°) of the vehicle exterior speaker 53 or may be a superdirective speaker configured to output the sound only in a specific direction (angle region). When the vehicle exterior speaker 53 is a superdirective speaker, the vehicle control unit 3 detects a pedestrian and specifies a relative positional relation between the vehicle 1C and the pedestrian, based on the surrounding environment information acquired from the camera 6 and/or the radar 7. Then, the vehicle control unit 3 selects a voice to be output from the vehicle exterior speaker 53. Thereafter, the vehicle control unit 3 transmits, to the vehicle exterior speaker control unit 52, a signal indicative of the relative positional relation and an instruction signal for instructing an output of the selected voice. The vehicle exterior speaker control unit 52 reads out voice data from the ROM, based on the received instruction signal, and outputs a sound having directionality from the vehicle exterior speaker 53 toward the pedestrian, based on the relative positional relation between the vehicle 1C and the pedestrian and the voice data. In this case, at a place distant from a place where the pedestrian exists, the sound output from the vehicle exterior speaker 53 may not be heard. Also, the vehicle exterior speaker 53 may have a plurality of speakers so as to output the sound having directionality toward the outside. Also, the sound that is to be output from the vehicle exterior speaker 53 may be a sound within a human audible zone (20 Hz to 20000 Hz) or may be ultrasonic waves.

The vehicle interior speaker system 80 includes a vehicle interior speaker 83, and a vehicle interior speaker control unit 82. The vehicle interior speaker 83 is configured to output a sound toward a passenger in the vehicle 1C, and is arranged at a predetermined place in the vehicle 1C. The vehicle interior speaker 83 is a speaker of the related art, for example. The vehicle interior speaker control unit 82 is configured to control the vehicle interior speaker 83 from which the same sound as the sound output from the vehicle exterior speaker 53 is to be output toward the passenger in the vehicle 1C.

The vehicle interior speaker control unit 82 is configured by an electronic control unit (ECU) and is electrically connected to the power supply (not shown). The electronic control unit includes a microcontroller having a processor such as a CPU, an MPU and the like and a memory such as a ROM and a RAM, and other electronic circuits (for example, an amplification circuit, a DA (Digital to Analog) converter and the like). In the third embodiment, the vehicle control unit 3 and the vehicle interior speaker control unit 82 are provided as separate configurations but may be integrally configured. Also, the same voice data as the voice data stored in the ROM of the vehicle exterior speaker control unit 52 may be saved in advance in the ROM of the vehicle interior speaker control unit 82.

The display device system 90 includes a display device 93, and a display control unit 92. Also, the display device system 90 may further include a storage device (not shown) such as a hard disk, a flash memory and the like, and an input operation unit (not shown) such as a touch panel configured to receive an input operation of a passenger. Also, the display device system 90 may be mounted with a car navigation system. Also, the vehicle interior speaker system 80 may be incorporated in the display device system 90. The display device 93 includes a liquid crystal monitor or an organic EL display, for example, and may be arranged at a predetermined place in the vehicle 1C. For example, the display device 93 may be arranged on a dashboard of the vehicle 1C or may be inserted in the dashboard. On the display device 93, the illumination states of the left-side CSL 40L and the right-side CSL 40R are displayed so that they can be visually recognized by the passenger in the vehicle 1C. For example, an image (hereinafter, referred to as 'headlamp image') showing a front view of the left-side headlamp 20L and the right-side headlamp 20R may be displayed on the display device 93. By the headlamp image, it is possible to perceive a current illumination state of the left-side headlamp 20L including the left-side CSL 40L and a current illumination state of the right-side headlamp 20R including the right-side CSL 40R.

The display control unit 92 is configured by a processor such as a CPU, an MPU and the like and a memory such as a ROM, a RAM and the like. The display control unit 92 is configured to display the illumination states of the left-side CSL 40L and the right-side CSL 40R on the display device 93. In particular, the display control unit 92 is configured to receive signals indicative of the illumination states of the left-side headlamp 20L and the right-side headlamp 20R from the vehicle control unit 3 and to generate or update headlamp image data on the basis of the received signals. The display control unit 92 is configured to display a headlamp image on the display device 93, based on the headlamp image data. For example, when the illumination state of the left-side CSL 40L or/and the illumination state of the right-side CSL 40R change, the display control unit 92 updates the headlamp image data, based on the signals received from the vehicle control unit 3, and displays the headlamp image on the display device 93, based on the updated headlamp image data. Here, when a predetermined light-emitting segment of the plurality of light-emitting segments 43L of the left-side CSL 40L is turned on (refer to FIGS. 27A-27B), it is possible to perceive that the predetermined light-emitting segment is turned on, from the headlamp image. In this way, the passenger in the vehicle can visually recognize the illumination states of the left-side headlamp 20L and the right-side headlamp 20R (in particular, the illumination states of the left-side CSL 40L and the right-side CSL 40R) from the headlamp image.

Figure 23:
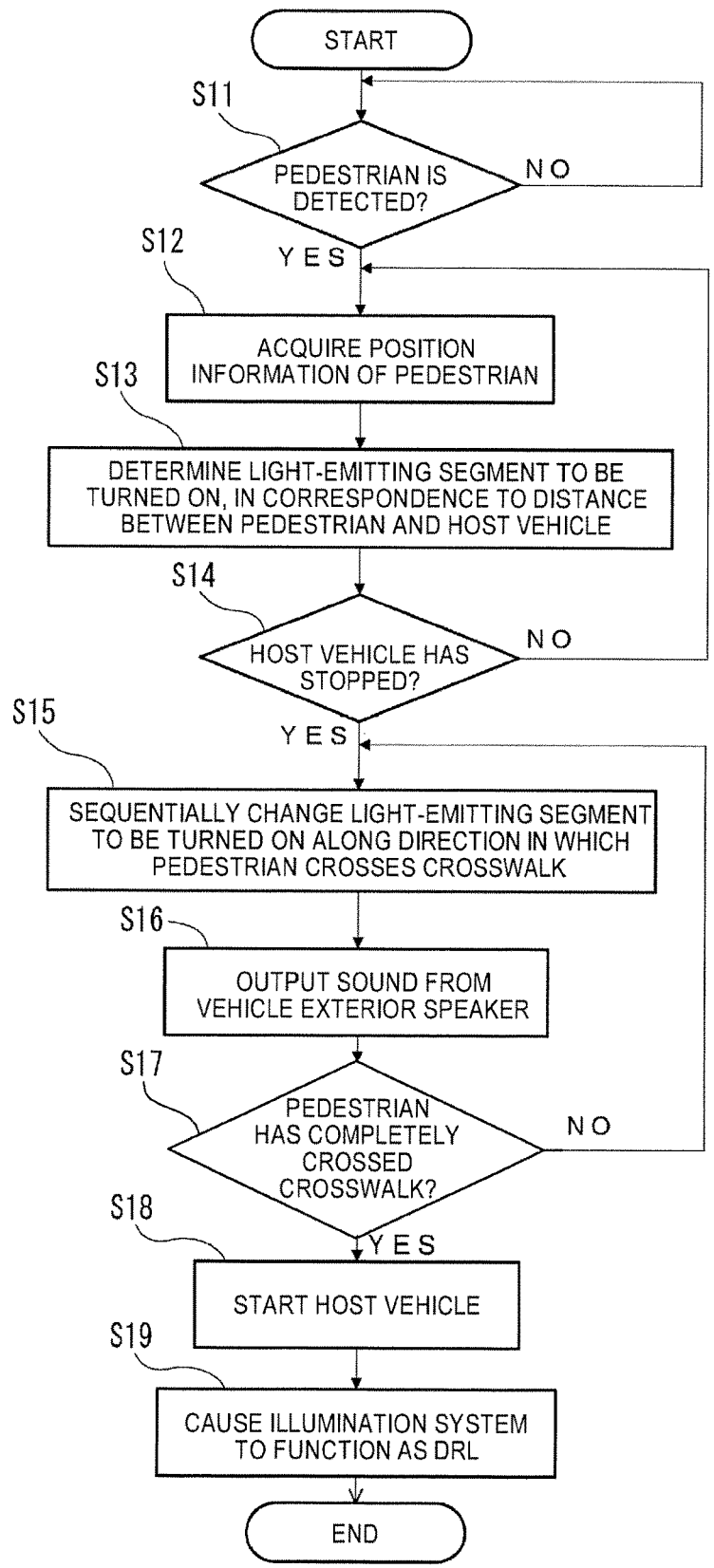
FIG. 23 is a flowchart for illustrating an operation flow of the vehicle illumination system of the third embodiment.
Figure 24A:
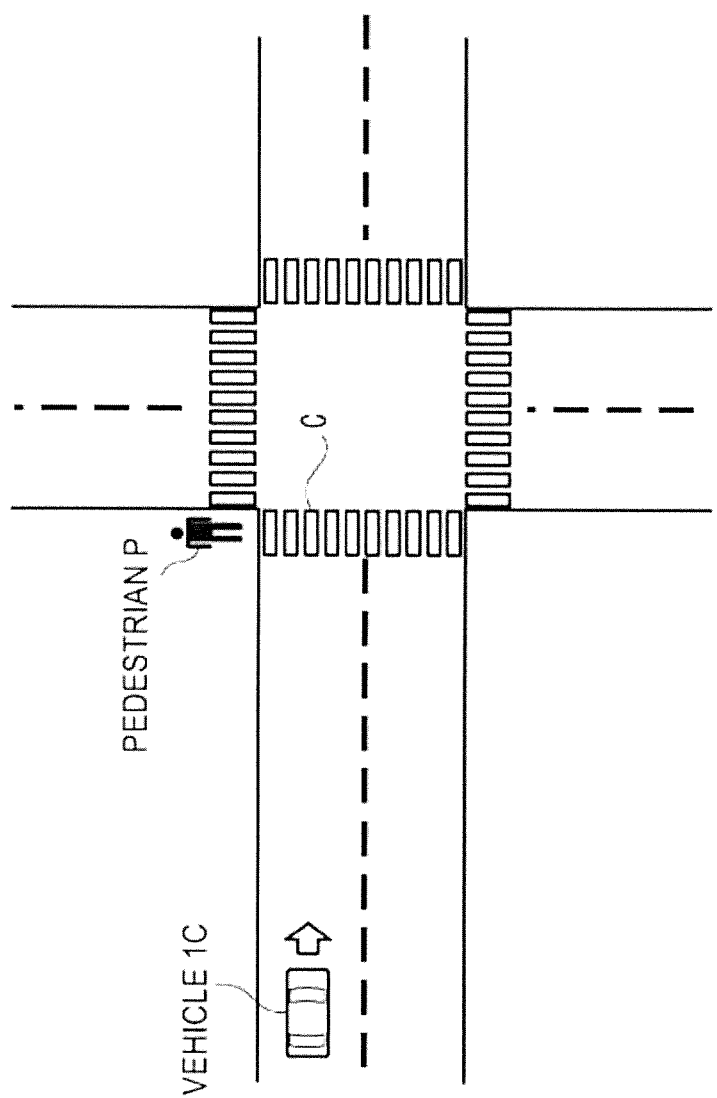
FIG. 24A depicts a situation where the pedestrian is in the vicinity of the crosswalk and the vehicle is approaching the intersection point.
Figure 24B:
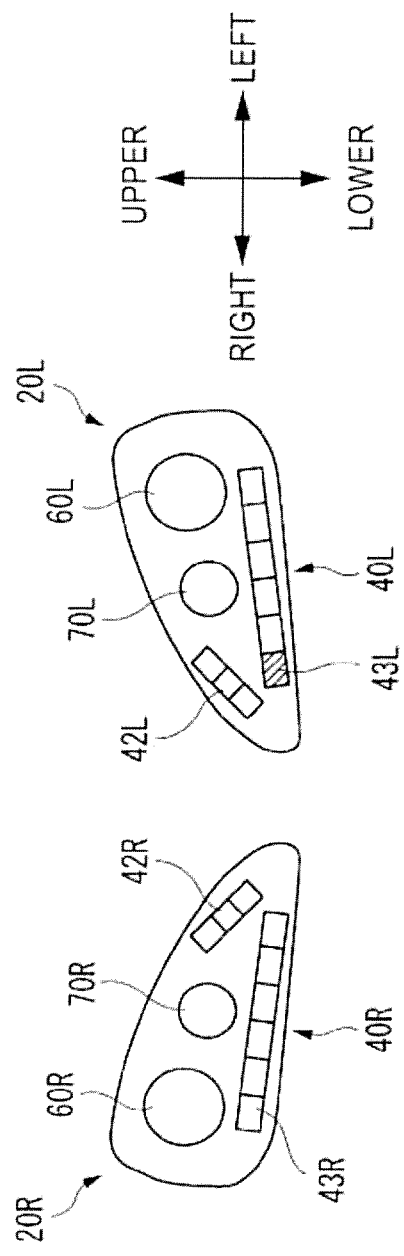
FIG. 24B depicts illumination states of a left-side illumination unit and a right-side illumination unit in the situation shown in FIG. 24A.

Subsequently, an operation flow of the illumination system 4 is described with reference to FIGS. 23 to 28B. FIG. 23 is a flowchart for illustrating an operation flow of the illumination system 4. FIG. 24A depicts a situation where the pedestrian P is in the vicinity of the crosswalk and the vehicle 1C is approaching the crosswalk C. FIG. 24B depicts illumination states of the left-side CSL 40L and the right-side CSL 40R in the situation shown in FIG. 24A. The descriptions of FIGS. 25A-25B and thereafter are basically the same as the descriptions of FIGS. 24A and 24B.

As shown in FIGS. 23 and 24A-24B, the vehicle control unit 3 (detection unit) first detects the pedestrian P in the vicinity of the crosswalk C ahead of the vehicle 1C traveling in the automatic driving mode (in particular, the full-automatic driving mode or the advanced driving support mode) (step S11). In particular, the camera 6 and/or the radar 7 acquires the surrounding environment information (for example, the image data and the like) of the vehicle 1C, and transmits the acquired surrounding environment information to the vehicle control unit 3. The vehicle control unit 3 detects the pedestrian P in the vicinity of the crosswalk C, based on the surrounding, environment information transmitted from the camera 6 and/or the radar 7. When detecting the pedestrian P, an object identification algorithm may be used, for example. When the pedestrian P is detected (YES in step S11), the vehicle control unit 3 (position information acquisition unit) acquires position information of the pedestrian P, based on the transmitted surrounding environment information (step S12). Here, the position information of the pedestrian P is the information about the relative position of the pedestrian P to the vehicle 1C. On the other hand, when the pedestrian P is not detected (NO in step S11), the processing returns to step S11.

Then, in step S13, the vehicle control unit 3 determines the light-emitting segment 43L to be turned on, in correspondence to the distance D (an example of the relative positional relation) between the pedestrian P and the vehicle 1C. Specifically, the vehicle control unit 3 may specify the distance D between the pedestrian P and the vehicle 1C, based on the position information of the pedestrian P (information about the relative position of the pedestrian P to the vehicle 1C). For example, the distance D may be the shortest distance between the pedestrian P and the vehicle 1C.

Then, the vehicle control unit 3 determines the light-emitting segment 43L to be turned on of the left-side CSL 40L, in correspondence to the specified distance D. Here, table or a relation equation indicative of a relation between a range of the distance D between the pedestrian P and the vehicle 1C and the light-emitting segment 43L to be turned on may be stored in advance in the vehicle control unit 3 (ROM). In this case, the vehicle control unit 3 may determine the light-emitting segment 43L to be turned on, based on the specified distance D and the table or relation equation indicative of the relation between the range of the distance D and the light-emitting segment 43L to be turned on.

Thereafter, the vehicle control unit 3 generates an illumination control signal for designating the light-emitting segment 43L to be turned on, and transmits the illumination control signal to the illumination control unit 47. The illumination control unit 47 supplies the electric signal to the light-emitting segment 43L to be turned on (i.e., the designated light-emitting segment 43L), based on the transmitted illumination control signal. In this way, the designated light-emitting segment 43L is turned on by the electric signal supplied from the illumination control unit 47.

Then, in step S14, the vehicle control unit 3 determines whether the vehicle 1C has stopped ahead of the crosswalk C, based on the traveling state information of the vehicle 1C acquired by the sensor 5. When it is determined that the vehicle 1 has not stopped ahead of the crosswalk C (i.e., the vehicle is traveling) (NO in step S14), the processing returns to step S12. In this way, the series of processing from step S12 to step S14 is repetitively executed until it is determined that the vehicle 1C has stopped.

For example, as shown in FIGS. 24A-24B, when the distance D between the vehicle 1C and the pedestrian P is D1, the vehicle control unit 3 determines that the light-emitting segment 43L, which is positioned at the rightmost side, of the six light-emitting segments 43L of the left-side CSL 40L is to be turned on, and transmits the illumination control signal to the illumination control unit 47. The illumination control unit 47 turns on the light-emitting segment 43L positioned at the rightmost side, based on the transmitted illumination control signal. Here, the illumination color of the light-emitting segment 43L positioned at the rightmost side is not particularly limited. For example, the light-emitting segment 43L positioned at the rightmost side may be turned on with the red light.

Figures 25A, 25B:
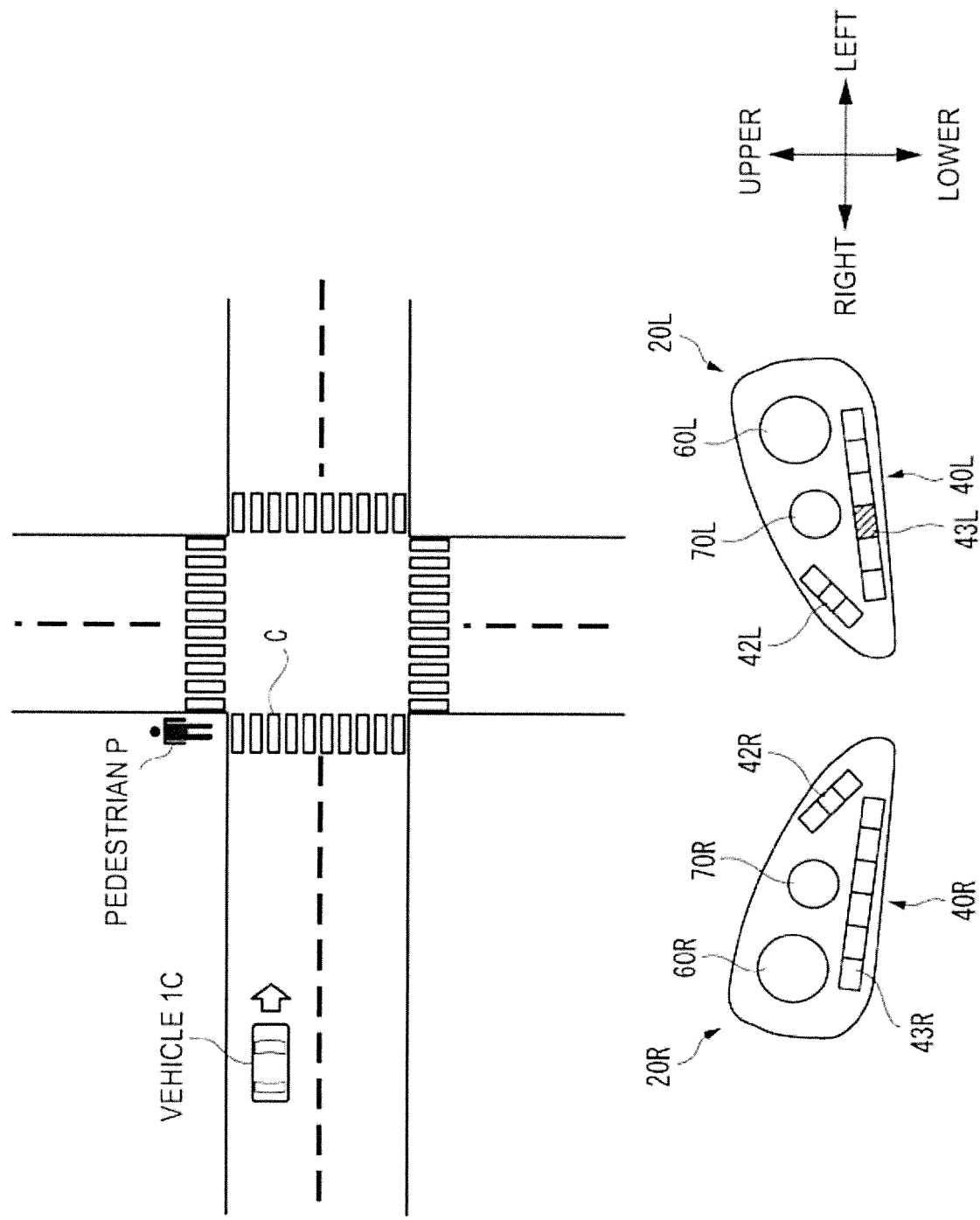
FIG. 25A depicts a situation where the pedestrian is in the vicinity of the crosswalk and the vehicle is approaching the intersection point.
FIG. 25B depicts illumination states of the left-side illumination unit and the right-side illumination unit in the situation shown in FIG. 24A.

Also, as shown in FIGS. 25A-25B, when the distance D between the vehicle 1C and the pedestrian P is D2 (here, D2<D1 because the vehicle 1C is traveling toward the intersection point), the vehicle control unit 3 determines that the light-emitting segment 43L, which is located at the third position from the right end of the left-side CSL 40L, of the six light-emitting segments 43L of the left-side CSL 40L is to be turned on, and transmits the illumination control signal to the illumination control unit 47. The illumination control unit 47 turns on the light-emitting segment 43L located at the third position from the right end, based on the transmitted illumination control signal.

Also, as shown in FIGS. 26A-26B, when the distance D between the vehicle 1C and the pedestrian P is D3 (here, D3<D2 because the vehicle 1C is traveling toward the intersection point), the vehicle control unit 3 determines that the light-emitting segment 43L, which is positioned at the leftmost side, of the six light-emitting segments 43L of the left-side CSL 40L is to be turned on, and transmits the illumination control signal to the illumination control unit 47. The illumination control unit 47 turns on the light-emitting segment 43L positioned at the leftmost side, based on the transmitted illumination control signal.

Also, although not shown, the illumination control unit 47 may turn on the light-emitting segments 43L located at second, fourth and fifth positions from the right end of the left-side CSL 40L, in correspondence to the distance D between the vehicle 1C and the pedestrian P. In this respect, when the distance D is D2, the light-emitting segment 43L located at the second position from the right end may be turned on. When the distance D is D4, the light-emitting segment 43L located at the fourth position from the right end may be turned on. Also, when the distance D is D5, the light-emitting segment 43L located at the fifth position from the right end may be turned on. At this time, a relation of $D1>D2>D3>D4>D5>D6$ is established.

In this way, the illumination control unit 47 is configured to change the illumination state of the left-side CSL 40L, in correspondence to the distance D between the vehicle 1C and the pedestrian P. In particular, the illumination control unit 47 is configured to sequentially change the light-emitting segment 43L to be turned on of the six light-emitting segments 43L of the left-side CSL 40L, in correspondence to the distance D between the vehicle 1C and the pedestrian P. In this respect, the illumination control unit 47 may be configured to sequentially change the light-emitting segment 43L to be turned on from the right end of the left-side CSL 40L toward the left end as the distance D decreases.

Returning to FIGS. 24A-24B, when the vehicle control unit 3 determines that the vehicle 1C has stopped ahead of the crosswalk C (YES in step S14), the illumination control unit 47 sequentially changes the light-emitting segment to be turned on of the six light-emitting segments 43L of the left-side CSL 40L and the six light-emitting segments 43R of the right-side CSL 40R, along the direction (hereinafter, referred to as 'movement direction') in which the pedestrian P crosses the crosswalk C (step S15). In this way, when the vehicle 1C has stopped after detecting the pedestrian P, the illumination control unit 47 changes the illumination states of the left-side CSL 40L and of the right-side CSL 40R.

Figure 27A:
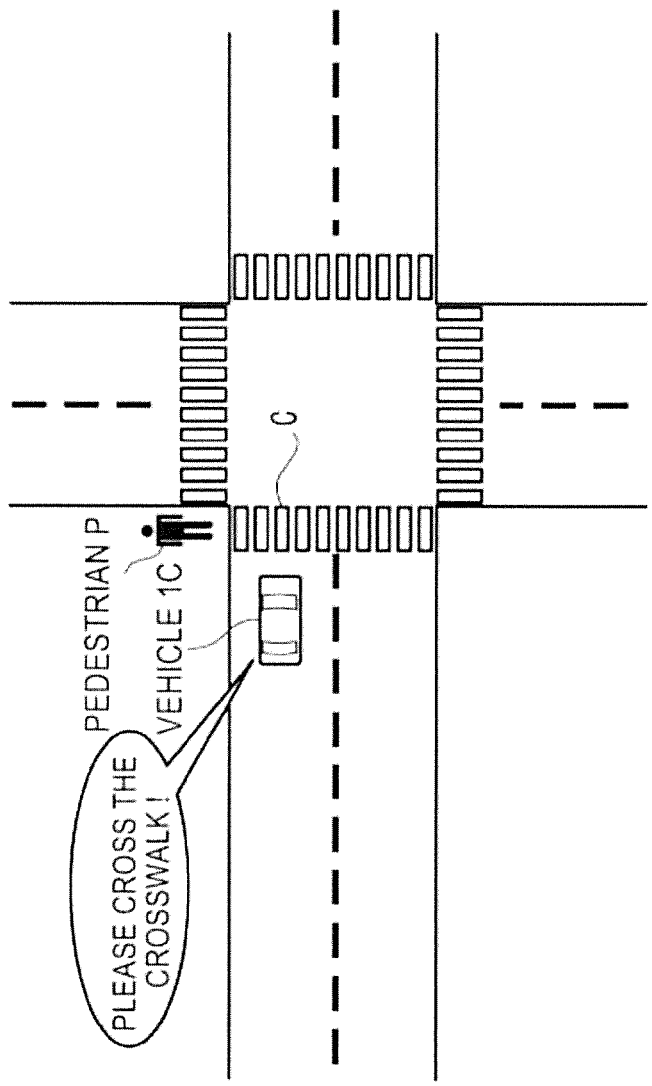
FIG. 27A depicts a situation where the pedestrian is in the vicinity of the crosswalk and the vehicle has stopped ahead of the crosswalk.

Specifically, when it is determined that the vehicle 1C has stopped, based on the traveling state information of the vehicle 1C acquired by the sensor 5, the vehicle control unit 3 determines the movement direction of the pedestrian P by determining whether the pedestrian P exists at the left side or the right side relative to the vehicle 1C. For example, as shown in FIG. 27A, when the pedestrian P exists at the left side relative to the vehicle 1C, the vehicle control unit 3 determines that the pedestrian P exists at the left side relative to the vehicle 1C and determines that the movement direction of the pedestrian P is a rightward direction, as seen from the vehicle 1C. To the contrary, when the pedestrian P exists at the right side relative to the vehicle 1C, the vehicle control unit 3 determines that the pedestrian P exists at the right side relative to the vehicle 1C and determines that the movement direction of the pedestrian P is a leftward direction, as seen from the vehicle 1C.

Figure 27B:
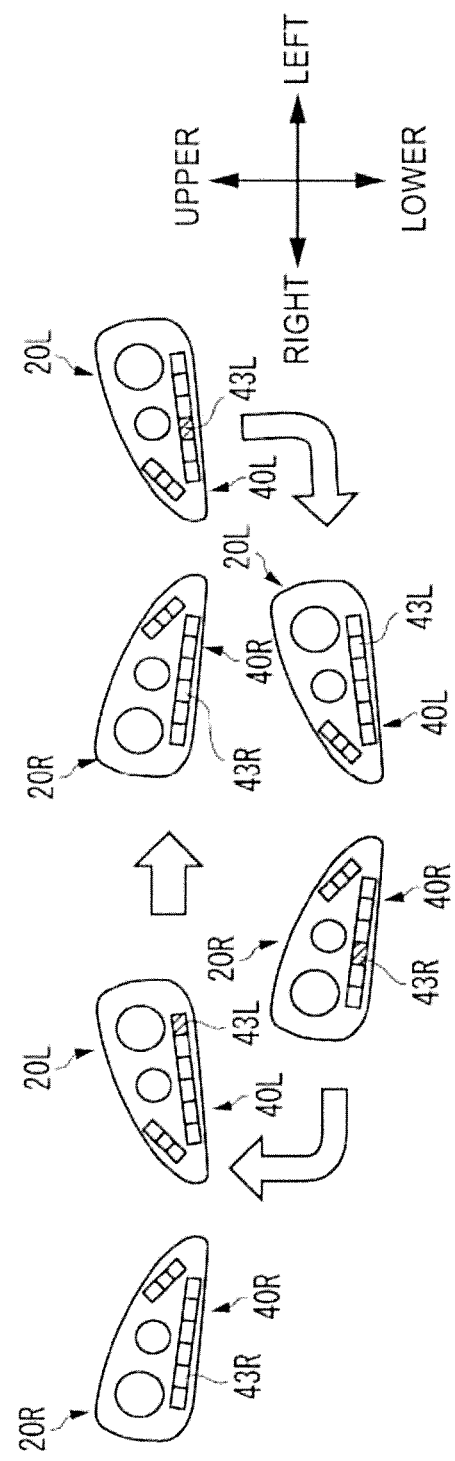
FIG. 27B depicts illumination states of the left-side illumination unit and the right-side illumination unit in the situation shown in FIG. 27A.

Then, the vehicle control unit 3 generates an illumination control signal for instructing generation of an illumination pattern to be sequentially turned on along the movement direction of the pedestrian P and transmits the illumination control signal to the illumination control unit 47. The illumination control unit 47 sequentially changes the light-emitting segment to be turned on of the six light-emitting segments 43L; 43R along the movement direction of the pedestrian P, based on the transmitted illumination control signal. For example, in the situation shown in FIG. 27A, the vehicle control unit 3 transmits an illumination control signal for instructing generation of an illumination pattern to be sequentially turned on rightward to the illumination control unit 47, and the illumination control unit 47 sequentially changes rightward the light-emitting segment to be turned on, based on the transmitted illumination control signal. In FIG. 27B, the light-emitting segment 43L positioned at the leftmost side, the light-emitting segment 43L located at the fourth position from the left end of the left-side CSL 40L and the light-emitting segment 43R located at the fourth position from the left end of the right-side CSL 40R are respectively turned on. However, actually, one light-emitting segment may be sequentially turned on or two or more light-emitting segments may be sequentially turned on between the light-emitting segment 43L positioned at the leftmost side (hereinafter, referred to as 'light-emitting segment 43Lm') and the light-emitting segment 43R positioned at the rightmost side (hereinafter, referred to as 'light-emitting segment 43Rm'). In the meantime, the sequential lighting of the light-emitting segments includes not only the lighting where the light-emitting segment is turned on one by one between the light-emitting segment 43Lm and the light-emitting segment 43Rm but also the lighting where the light-emitting segment is turned on every other segment (or every two or more segments).

Then, in step S16, the vehicle exterior speaker control unit 52 outputs a sound (a guide voice such as "Please cross the crosswalk", and the like) from the vehicle exterior speaker 53 toward the outside (in particular, the pedestrian P) of the vehicle 1C. In this case, the vehicle control unit 3 selects a voice to be output from the vehicle exterior speaker 53, and transmits an instruction signal for instructing the selected voice to be output to the vehicle exterior speaker control unit 52. The vehicle exterior speaker control unit 52 reads out the voice data saved in the ROM, based on the received instruction signal, and transmits the electric signal indicative of the voice data to the vehicle exterior speaker 53. In this way, the sound is output from the vehicle exterior speaker 53. In the meantime, the vehicle exterior speaker 53 may be a super-directive speaker, as described above.

Also, the vehicle interior speaker control unit 82 may output a sound from the vehicle interior speaker 83 after the sound is output from the vehicle exterior speaker 53 or upon the output of the sound from the vehicle exterior speaker 53. In this case, the vehicle interior speaker control unit 82 receives the instruction signal for instructing the selected voice to be output from the vehicle control unit 3, and reads out the voice data, which indicates the same sound as the sound to be output to the vehicle exterior speaker 53, from the ROM on the basis of the instruction signal. Then, the vehicle interior speaker control unit 82 transmits the electric signal indicative of the read voice data to the vehicle interior speaker 83. In this way, the same sound as the sound to be output from the vehicle exterior speaker 53 is output from the vehicle interior speaker 83.

Also, in steps S15 and S16, the headlamp image may be displayed on the display device 93. The passenger in the vehicle cam visually recognize the illumination states of the left-side headlamp 20L and the right-side headlamp 20R (in particular, the illumination states of the left-side CSL 40L and the right-side CSL 40R) from the headlamp image displayed on the display device 93. In this case, the display control unit 92 receives the signals indicative of the illumination states of the left-side headlamp 20L and the right-side headlamp 20R from the vehicle control unit 3, and generates the headlamp image data on the basis of the received signals. The display control unit 92 displays the headlamp image on the display device 93, based on the headlamp image data.

Then, in step S17, the vehicle control unit 3 determines whether the pedestrian P has completely crossed the crosswalk C, based on the surrounding environment information transmitted from the camera 6 and/or the radar 7. When it is determined that the pedestrian P has not completely crossed the crosswalk C (NO in step S17), the processing returns to step S15. In this way, while the pedestrian P is crossing the crosswalk C, the processing of step S15 and step S16 is repetitively executed.

According to the third embodiment, the light-emitting segment to be turned on of the six light-emitting segments 43L; 43R is sequentially turned on along the movement direction of the pedestrian P, so that the illumination states of the left-side CSL 40L and of the right-side CSL 40R are changed. In this way, the pedestrian Pin the vicinity of the crosswalk C can perceive that the vehicle 1C recognizes the pedestrian P by seeing the sequential change of the light-emitting segment to be turned on, and can thus cross in relief the crosswalk C. As a result, the light-emitting segment is sequentially turned on along the movement direction of the pedestrian P, so that the pedestrian P is urged to cross the crosswalk C.

Also, when the vehicle 1C detects the pedestrian P, the sound is output from the vehicle exterior speaker 53. For this reason, the pedestrian P can perceive that the vehicle 1C recognizes the pedestrian P by hearing the sound output from the vehicle exterior speaker 53, and can thus feel relieved. Also, even when the illumination system 4 is out of order, the vehicle system 2C can continue to perform pedestrian-to-vehicle communication by the vehicle exterior speaker 53. In this way, it is possible to provide the vehicle system 2C capable of improving the reliability of the pedestrian-to-vehicle communication function by the two systems of the illumination system 4 and the vehicle exterior speaker system 50.

Also, according to the third embodiment, since the same sound as the sound output from the vehicle exterior speaker 53 is output toward the passenger in the vehicle 1C, the passenger can perceive that pedestrian-to-vehicle communication is appropriately performed between the pedestrian P and the vehicle 1C by hearing the sound, and can thus feel relieved. Also, since the illumination states of the left-side headlamp 20L and the right-side headlamp 20R (in particular, the illumination states of the left-side CSL 40L and the right-side CSL 40R) are displayed on the display device 93 so that the passenger can visually recognize the same, the passenger can perceive that pedestrian-to-vehicle communication is appropriately performed between the pedestrian P and the vehicle 1C, and can thus feel relieved.

Returning to FIGS. 24A-24B, when it is determined that the pedestrian P has completely crossed the crosswalk C (YES in step S17), the vehicle control unit 3 starts the vehicle 1C (step S18). Specifically, the vehicle control unit 3 transmits the accelerator control signal to the accelerator actuator 16, and the accelerator actuator 16 controls the accelerator device 17, based on the transmitted accelerator control signal. In this way, the vehicle 1 is started. On the other hand, before the pedestrian P has completely crossed the crosswalk C, the vehicle 1C may be started. In the meantime, before the vehicle 1C starts, the vehicle exterior speaker control unit 52 may output a guide voice such as "the vehicle is to start" from the vehicle exterior speaker 53. Thereby, the pedestrian in the vicinity of the vehicle 1C can perceive in advance that the vehicle 1C is to start by hearing the guide voice output from the vehicle exterior speaker 53.

Then, as shown in FIG. 28B, the illumination control unit 47 turns on all the light-emitting segments 43L, 43R with the white light, thereby causing the illumination system 4 to function as the DRL (step S19). In particular, the vehicle control unit 3 transmits an illumination control signal for instructing the illumination system 4 to function as the DRL to the illumination control unit 47, and the illumination control unit 47 supplies the electric signal to the white LED 400d belonging to each of the light-emitting segments 43L, 43R, based on the transmitted illumination control signal. Each white LED 400d emits the white light, in correspondence to the supplied electric signal. The illumination system 4 may be caused to function as the DRL after the vehicle 1C has passed the intersection point, as shown in FIG. 28A, or immediately after the vehicle 1C is started. In this way, the series of operation flows of the illumination system 4 are over. In the meantime, the illumination control unit 47 may cause the illumination system 4 to function as the clearance lamp, instead of the DRL.

Fourth Embodiment

Figure 29:
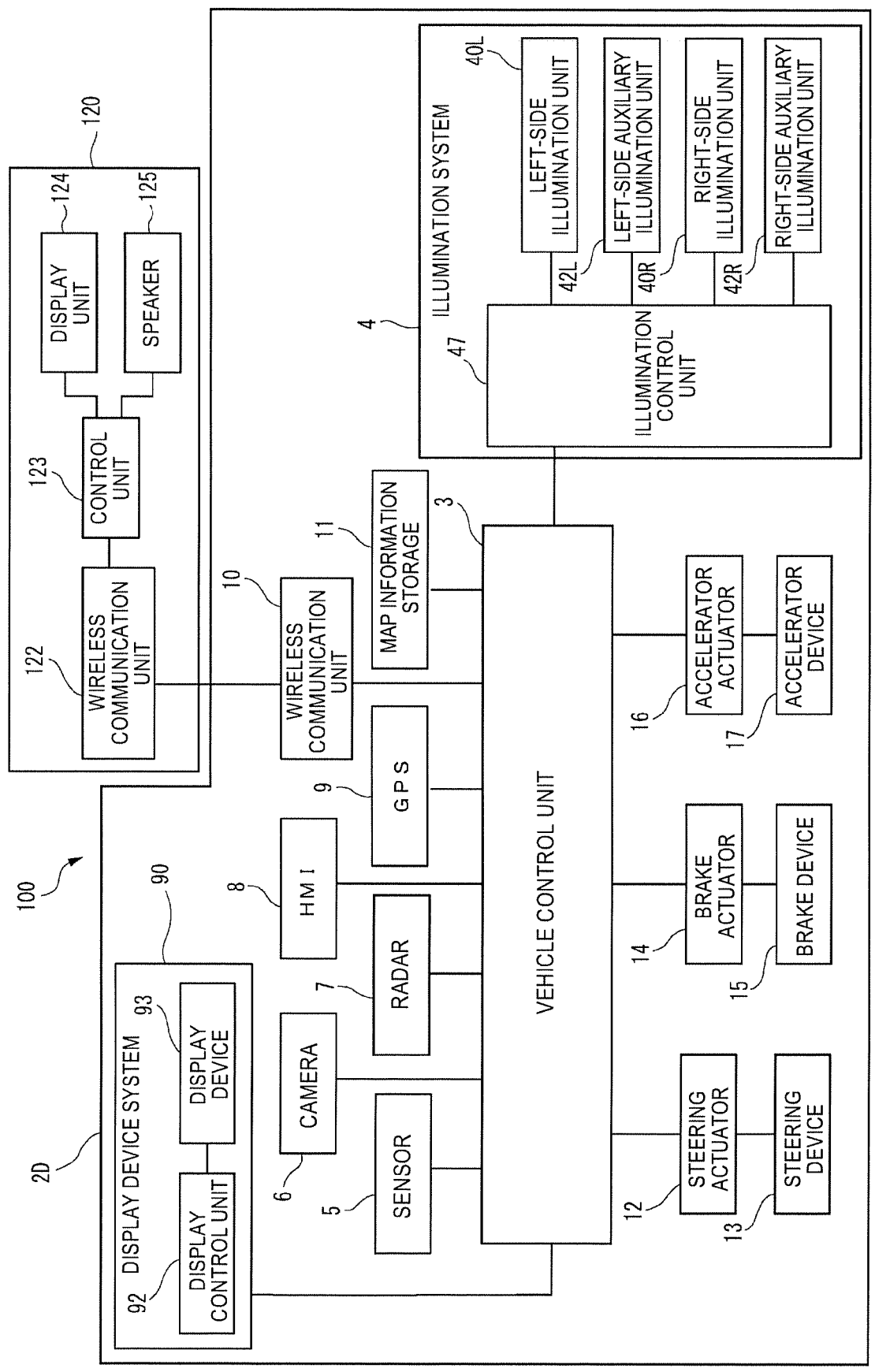
FIG. 29 is a block diagram depicting a pedestrian-to-vehicle communication system including a vehicle system in accordance with a fourth embodiment of the present invention.
Figure 30:
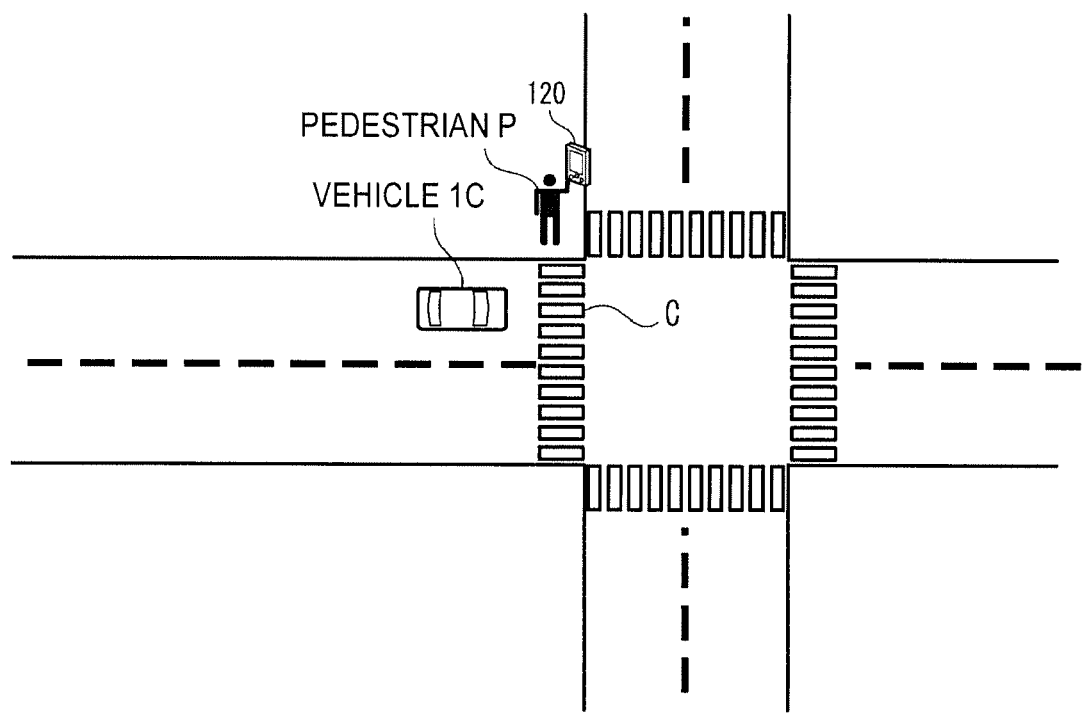
FIG. 30 depicts the pedestrian who is in the vicinity of the crosswalk and carries a portable electronic device and the vehicle that has stopped ahead of the crosswalk.

A vehicle system 2D of a fourth embodiment and a pedestrian-to-vehicle communication system 100 configured by the vehicle system 2D (vehicle 1C) and a portable electronic device 120 are described with reference to FIGS. 29 and 30. In the meantime, the matters already described in the third embodiment are not repeatedly described. FIG. 29 is a block diagram depicting the pedestrian-to-vehicle communication system 100 including the vehicle system 2D. FIG. 30 depicts the pedestrian P who is in the vicinity of the crosswalk C and carries the portable electronic device 120 and the vehicle 1C that has stopped ahead of the crosswalk C.

The vehicle system 2D shown in FIG. 29 is different from the vehicle system 2C shown in FIG. 22, in that the vehicle exterior speaker system 50 and the vehicle interior speaker system 80 are not provided. The portable electronic device 120 (hereinafter, simply referred to as 'electronic device 120') is carried by the pedestrian P, and is a smart phone, a tablet, a wearable device or a notebook computer, for example. The electronic device 120 includes a wireless communication unit 122, a control unit 123, a display unit 124, and a speaker 125. The wireless communication unit 122 is configured to perform wireless communication with the wireless communication unit 10 of the vehicle system 2D and to cause the electronic device 120 to be connectable to a communication network such as the Internet. The wireless communication unit 122 may be configured to perform communication with the wireless communication unit 10 in an ad hook mode directly or via an access point.

The control unit 123 includes a processor such as a CPU, an MPU and the like and a memory such as a ROM, a RAM and the like, and is configured to control each operation of the electronic device 120. For example, the control unit 123 is configured to control at least one of an illumination state (an illumination color, a blinking and the like) of the display unit 124 and a speaker state (voice state) of the speaker 125, based on a control signal transmitted from the vehicle 1C. The display unit 124 is a display device configured to display information, for example, and is configured to emit light to an outside. For example, the control unit 123 is configured to display a predetermined image on the display unit 124, based on predetermined image data saved in the memory. The speaker 125 is configured to convert the electric signal transmitted from the control unit 123 into voice (in other words, the speaker 125 is configured to output voice from the electric signal), and includes at least a coil and a diaphragm.

Subsequently, processing in which the vehicle system 2D (vehicle 1C) changes the display state of the display unit 124 of the electronic device 120 is described. First, as shown in FIG. 30, when the vehicle 1C has stopped ahead of the crosswalk C after detecting the pedestrian P, the illumination control unit 47 sequentially changes the light-emitting segment to be turned on of the six light-emitting segments 43L of the left-side CSL 40L and the six light-emitting segments 43R of the right-side CSL 40R along the movement direction (refer to step S15 in FIG. 23).

Then, instead of step S16 shown in FIG. 23, the vehicle control unit 3 transmits a communication request signal to the wireless communication unit 122 of the electronic device 120 via the wireless communication unit 10 so as to establish wireless communication (ad hook communication) between the vehicle system 2D and the electronic device 120. Then, after the wireless communication unit 122 receives the communication request signal, the control unit 123 executes predetermined processing. Thereafter, the control unit 123 transmits a reply signal to the communication request signal to the wireless communication unit 10, via the wireless communication unit 122. In this way, wireless communication is established between the vehicle system 2D and the electronic device 120.

Subsequently, the vehicle control unit 3 (transmission unit) generates a display control signal (an example of the first control signal) for instructing change of the display state (an illumination color, a blinking and the like) of the display unit 124, and then transmits the display control signal to the electronic device 120 via the wireless communication unit 10. The control unit 123 of the electronic device 120 receives the display control signal via the wireless communication unit 122 and then changes the display state (an illumination color, a blinking and the like) of the display unit 124, based on the display control signal. Also, the control unit 123 may display a predetermined image for urging the pedestrian P to cross the crosswalk or may change an initial screen to be displayed on the display unit 124.

In the meantime, while changing the display state of the display unit 124 of the electronic device 120 or instead of the change, the vehicle control unit 3 (transmission unit) may generate a voice control signal (an example of the first control signal) for instructing change of the speaker state (voice state) of the speaker 125 and then transmit the voice control signal to the electronic device 120 via the wireless communication unit 10. At this time, the control unit 123 of the electronic device 120 receives the voice control signal via the wireless communication unit 122, and then changes the speaker state (voice state) of the speaker 125, based on the voice control signal. For example, the control unit 123 may output the guide voice such as "Please cross the crosswalk" from the speaker 125.

In the fourth embodiment, instead of the step (step S16 in FIG. 23) of outputting the sound from the vehicle exterior speaker 53, the step of changing the display state and/or the speaker state of the electronic device 120 carried by the pedestrian P is provided, so that the reliability of the pedestrian-to-vehicle communication function is improved. In the meantime, in the fourth embodiment, all steps except step S16 of FIG. 23 may be executed.

Like this, according to the fourth embodiment, the pedestrian P can securely perceive that the vehicle 1C recognizes the pedestrian P by visually recognizing the change in the illumination states of the left-side CSL 40L and the right-side CSL 40R and detecting at least one of the display state and the speaker state of the electronic device 120, and can thus feel relieved. Also, even when the left-side CSL 40L and the right-side CSL 40R are out of order, the vehicle system 2D can continue to perform pedestrian-to-vehicle communication by the wireless communication with the electronic device 120. In this way, it is possible to provide the vehicle system 2D capable of increasing the reliability of the pedestrian-to-vehicle communication function.

Fifth Embodiment

Figure 31:
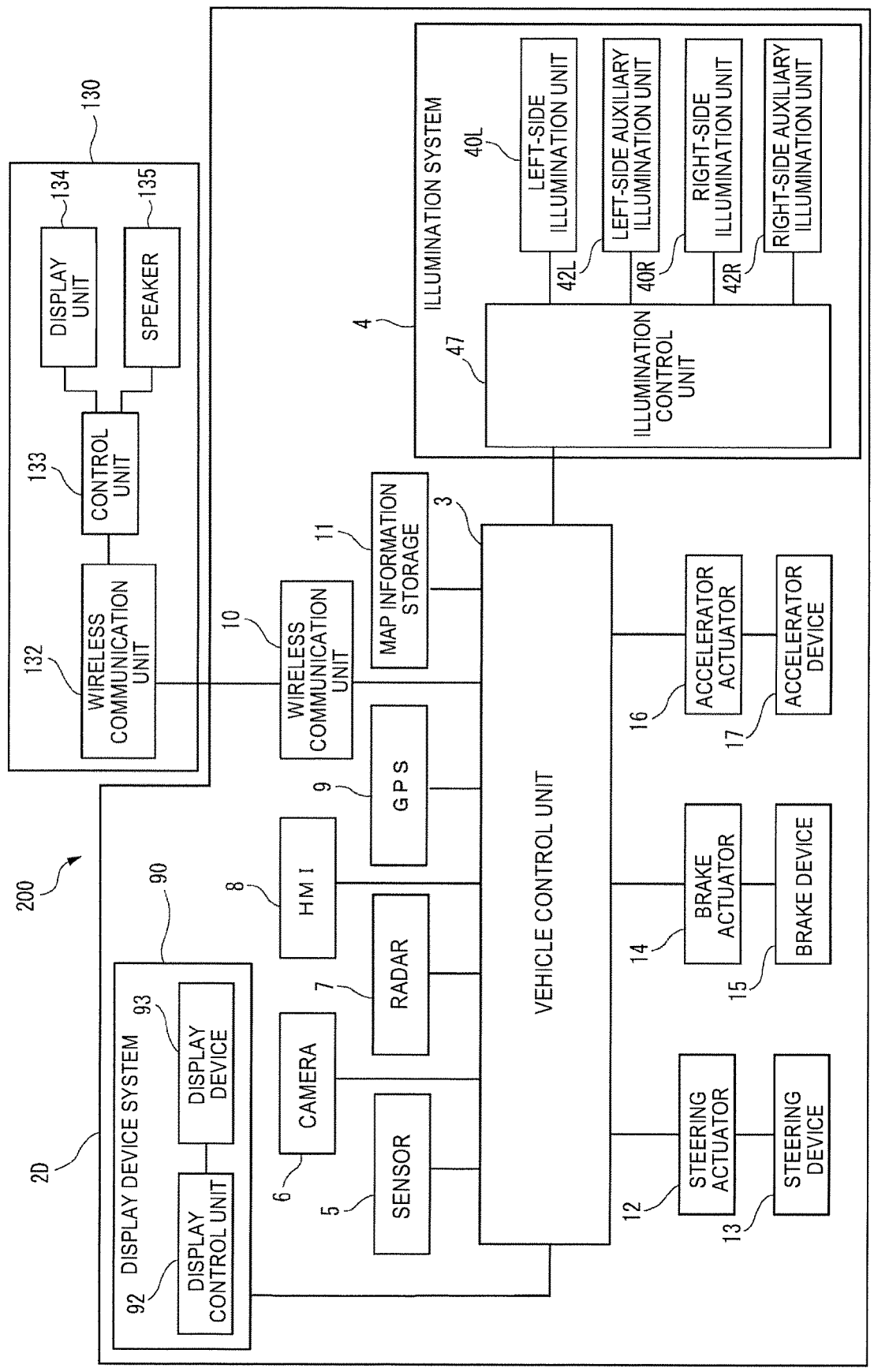
FIG. 31 is a block diagram depicting a road-to-vehicle communication system including a vehicle system in accordance with a fifth embodiment of the present invention.
Figure 32:
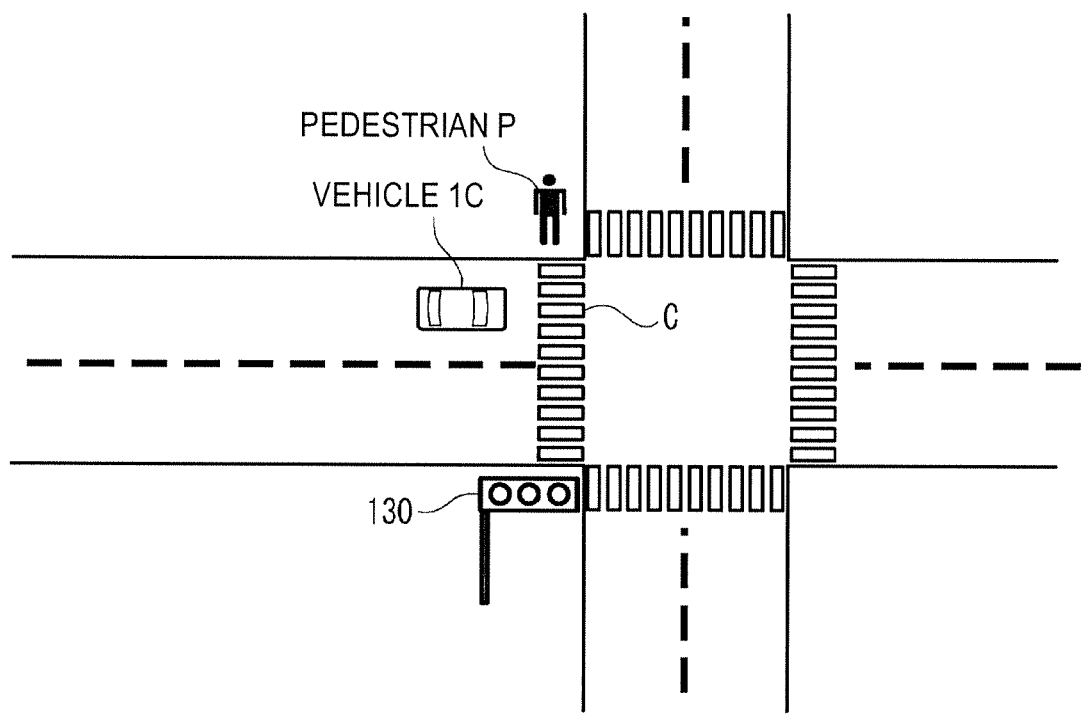
FIG. 32 depicts the pedestrian who is in the vicinity of the crosswalk, the vehicle that has stopped ahead of the crosswalk, and a traffic light equipped in the vicinity of the crosswalk.

Subsequently, a vehicle system 2D of a fifth embodiment and a road-to-vehicle communication system 200 configured by the vehicle system 2D (vehicle 1C) and a traffic light 130 (an example of the traffic infrastructure equipment) are described with reference to FIGS. 31 and 32. In the meantime, the matters already described in the first and second embodiments are not repeatedly described. FIG. 31 is a block diagram depicting the road-to-vehicle communication system 200 including the vehicle system 2D. FIG. 32 depicts the pedestrian P who is in the vicinity of the crosswalk C, the vehicle 1C that has stopped ahead of the crosswalk C, and the traffic light 130 equipped in the vicinity of the crosswalk C.

The traffic light 130 is one of the traffic infrastructure equipment provided in the vicinity of the pedestrian P, and includes a wireless communication unit 132, a control unit 133, a display unit 134, a speaker 135, and a signal lamp (not shown). The wireless communication unit 132 is configured to perform wireless communication with the wireless communication unit 10 of the vehicle system 2D, and to cause the traffic light 130 to be connectable to the communication network such as the Internet. The wireless communication unit 132 may be configured to directly perform communication with the wireless communication unit 10.

The control unit 133 includes a microcontroller having a processor such as a CPU, an MPU and the like and a memory such as a ROM, a RAM and the like, and other electronic circuits, and is configured to control each operation of the traffic light 130. For example, the control unit 133 is configured to control at least one of an illumination state (an illumination color, a blinking and the like) of the display unit 134 and a speaker state (voice state) of the speaker 135, based on a control signal transmitted from the vehicle 1C. The display unit 134 is a display device configured to display information, for example, and is configured to emit light to an outside. The display unit 134 may be mounted at a predetermined place of a telephone pole for supporting a signal lamp. For example, the control unit 133 is configured to display a predetermined image on the display unit 134, based on predetermined image data saved in the memory.

The speaker 135 is configured to convert the electric signal transmitted from the control unit 133 into voice.

Subsequently, processing in which the vehicle system 2D (vehicle 1C) changes the display state of the display unit 134 of the traffic light 130 is described. As shown in FIG. 32, when the vehicle 1C has stopped ahead of the crosswalk C after detecting the pedestrian P, the illumination control unit 47 sequentially changes the light-emitting segment to be turned on of the six light-emitting segments 43L of the left-side CSL 40L and the six light-emitting segments 43R of the right-side CSL 40R along the movement direction (refer to step S15 in FIG. 23).

Then, instead of step S16 shown in FIG. 23, the vehicle 1C establishes wireless communication connection with the traffic light 130. For example, the wireless communication connection between the traffic light 130 and the vehicle 1C is established by a passive scan method or an active scan method. In the case of the active scan method, the control unit 133 of the traffic light 130 broadcasts a communication request signal (beacon) toward an outside with a predetermined cycle via the wireless communication unit 132. The vehicle control unit 3 receives the communication request signal transmitted from the traffic light 130, via the wireless communication unit 10. Then, the vehicle control unit 3 transmits a reply signal to the communication request signal to the wireless communication unit 132, via the wireless communication unit 10. In this way, the wireless communication is established between the vehicle system 2D and the traffic light 130.

Then, the vehicle control unit 3 (transmission unit) generates a display control signal (an example of the second control signal) for instructing change of the display state (an illumination color, a blinking and the like) of the display unit 134, and transmits the display control signal to the traffic light 130, via the wireless communication unit 10. The control unit 133 of the traffic light 130 receives the display control signal via the wireless communication unit 132, and changes the display state (an illumination color, a blinking and the like) of the display unit 134 on the basis of the display control signal. Also, the control unit 133 may display a predetermined image for urging the pedestrian P to cross the crosswalk on the display unit 134.

In the meantime, while changing the display state of the display unit 134 of the traffic light 130 or instead of the change, the vehicle control unit 3 (transmission unit) may generate a voice control signal (an example of the second control signal) for instructing change of the speaker state (voice state) of the speaker 135 and then transmit the voice control signal to the traffic light 130 via the wireless communication unit 10. At this time, the control unit 133 of the traffic light 130 receives the voice control signal via the wireless communication unit 132, and then changes the speaker state (voice state) of the speaker 135, based on the voice control signal. For example, the control unit 133 may output the guide voice such as "Please cross the crosswalk" from the speaker 135. In the meantime, in the fifth embodiment, all steps except step S16 of FIG. 23 may be executed.

Like this, according to the fifth embodiment, the pedestrian P can securely perceive that the vehicle 1C recognizes the pedestrian P by visually recognizing the change in the illumination states of the left-side CSL 40L and the right-side CSL 40R and detecting at least one of the display state and the speaker state of the traffic light 130, and can thus feel relieved. Also, even when the left-side CSL 40L and the right-side CSL 40R are out of order, the vehicle system 2D can continue to perform pedestrian-to-vehicle communication by the wireless communication with the traffic light 130.

In this way, it is possible to provide the vehicle system 2D capable of increasing the reliability of the pedestrian-to-vehicle communication function.

Although the embodiments of the present invention have been described, it goes without saying that the technical scope of the present invention should not be interpreted limitedly by the descriptions of the embodiments. It will be understood by one skilled in the art that the embodiments are just exemplary and that the embodiments can be diversely changed within the scope of the invention defined in the claims. The technical scope of the present invention should be determined on the basis of the scope of the invention defined in the claims and its equivalent scope.

In the specification, the driving mode of the vehicle includes the full-automatic driving mode, the advanced driving support mode, the driving support mode, and the manual driving mode. However, the driving mode of the vehicle should not be limited to the four modes. The classification of the driving mode of the vehicle may be appropriately changed, in accordance with laws or rules relating to the automatic driving in each country. Likewise, the definitions of "the full-automatic driving mode", "the advanced driving support mode" and "the driving support mode" described in the embodiments are just examples, and can be appropriately changed, in accordance with laws or rules relating to the automatic driving in each country.

Also, in the specification, the other light-emitting elements such as semiconductor laser may be provided to each of the light-emitting segments 43L, 43R, instead of the LED. Also, it should be noted that the LED described in the embodiments includes an OLED (Organic Light Emitting Diode).

Also, in the specification, each of the left-side CSL 40L and the right-side CSL 40R includes the six light-emitting segments. However, the number of the light-emitting segments is not limited to six. For example, the number of the light-emitting segments may be appropriately set, in correspondence to a type of the vehicle 1 to which the illumination system 4 is to be mounted. Also, the number of LEDs included in the light-emitting segments is not limited to four. For example, the light-emitting segment may include one or more LEDs.

Also, in the specification, the six light-emitting segments 43L (or the six light-emitting segments 43R) are arranged side by side on one line in the right and left direction. However, the light-emitting segments 43L may be arranged in a predetermined direction (for example, the upper and lower direction) other than the right and left direction.

Also, in the specification, the illumination system 1 capable of presenting the information, which indicates that the vehicle 1 recognizes the pedestrian P, to the pedestrian P has been described. However, the present invention can be applied to an illumination system capable of presenting information, which indicates that the vehicle 1 recognizes the other vehicle, to a driver of the other vehicle, too. That is, the target object that is to be recognized by the vehicle 1 is not limited to the pedestrian and includes the other vehicle (an automobile, a motorcycle, a bicycle, and the like).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A vehicle illumination system provided to a vehicle capable of traveling in an automatic driving mode and configured to detect a target object, the vehicle illumination system comprising:
   a left-side communication support lamp and a right-side communication support lamp configured to emit light toward an outside of the vehicle and arranged to be visually recognized from the front of the vehicle;
   wherein at least one of the left-side communication support lamp and the right-side communication support lamp are configured to indicate a turn signal; and an illumination controller configured to change an illumination state of at least one of the left-side communication support lamp and the right-side communication support lamp,
   wherein each of the left-side communication support lamp and the right-side communication support lamp includes a plurality of light-emitting segments arranged side by side in a right and left direction of the vehicle,
   wherein the illumination controller is configured to change an illumination state of each of the plurality of light-emitting segments, and wherein upon the vehicle detecting the target object, the illumination controller changes the illumination state of at least one of the left-side communication support lamp and the right-side communication support lamp in correspondence to a relative positional relation between the vehicle and the target object.

2. The vehicle illumination system according to claim 1, wherein upon detecting the target object and the vehicle stopping, the illumination controller is configured to change the illumination states of at least one of the left-side communication support lamp and the right-side communication support lamp.

3. The vehicle illumination system according to claim 2, wherein upon detecting the target object and the vehicle stopping, the illumination controller is configured to sequentially change a light-emitting segment, which is to be turned on or turned off, of at least one of the plurality of light-emitting segments of the left-side communication support lamp and the right-side communication support lamp, along a movement direction of the target object.

4. The vehicle illumination system according to claim 1, wherein each of the plurality of light-emitting segments includes:
   a first light-emitting element configured to emit light of a first color;
   a second light-emitting element configured to emit light of a second color; and
   a third light-emitting element configured to emit light of a third color,
   wherein the first color, the second color and the third color are different, and
   wherein the illumination controller is configured to individually control lightings of the first light-emitting element, the second light-emitting element and the third light-emitting element.

5. The vehicle illumination system according to claim 4, wherein the first light-emitting element is configured to emit red light,
   wherein the second light-emitting element is configured to emit green light, and
   wherein the third light-emitting element is configured to emit blue light.

6. A vehicle system comprising:
a detector configured to detect a target object and the like;
a position information acquisition unit configured to acquire position information of the target object; and
the vehicle illumination system according to claim 1.

7. A vehicle capable of driving in an automatic driving mode and comprising the vehicle system according to claim 6.

8. A vehicle illumination system provided to a vehicle capable of traveling in an automatic driving mode and configured to detect a target object, the vehicle illumination system comprising:
a communication support lamp configured to emit light toward an outside of the vehicle and arranged to be visually recognized from the front of the vehicle; and
an illumination controller configured to change an illumination state of the communication support lamp,
wherein the communication support lamp includes a plurality of light-emitting segments arranged side by side in a predetermined direction,
wherein each of the plurality of light-emitting segments includes a plurality of light-emitting elements configured to emit lights, wherein light-emitting colors of the plurality of light-emitting elements are different, wherein the illumination controller is configured to individually control lightings of the plurality of light-emitting elements, thereby changing an illumination state of each of the plurality of light-emitting segments,
wherein the illumination controller is configured to control the illumination state of the communication support lamp so that the illumination system is to indicate a turn signal and to function as a daytime running lamp, a turn signal lamp or a clearance lamp, and
wherein upon the vehicle detecting the target object, the illumination controller changes the illumination state of at least one of the left-side communication support lamp and the right-side communication support lamp in correspondence to a relative positional relation between the vehicle and the target object.

9. The vehicle illumination system according to claim 8,
wherein each of the plurality of light-emitting segments include:
a white light-emitting element configured to emit white light;
a red light-emitting element configured to emit red light;
a green light-emitting element configured to emit green light; and
a blue light-emitting element configured to emit blue light, and
wherein the illumination controller is configured to control the illumination state of the communication support lamp so that the illumination system is to function as a daytime running lamp.

10. The vehicle illumination system according to claim 9,
wherein a luminescence intensity of the white light that is to be emitted from the white light-emitting element is greater than a luminescence intensity of white light that is to be obtained by mixing the red light to be emitted from the red light-emitting element, the green light to be emitted from the green light-emitting element and the blue light to be emitted from the blue light-emitting element.

11. The vehicle illumination system according to claim 8, wherein each of the plurality of light-emitting segments includes:
an amber light-emitting element configured to emit amber light;
a green light-emitting element configured to emit green light; and
a blue light-emitting element configured to emit blue light, and
wherein the illumination controller is configured to control the illumination state of the communication support lamp so that the illumination system is to function as a turn signal lamp.

12. A vehicle illumination system provided to a vehicle capable of traveling in an automatic driving mode and configured to detect a target object, the vehicle illumination system comprising: a headlamp mounted to a front surface of the vehicle; a communication support lamp configured to emit light toward an outside of the vehicle; and an illumination controller configured to change an illumination state of the communication support lamp, wherein the communication support lamp is configured to indicate a turn signal; wherein the headlamp includes: a housing; a cover mounted to the housing; and at least one lamp configured to emit light toward the outside of the vehicle and arranged in a lamp chamber formed by the housing and the cover, wherein the communication support lamp is arranged in the lamp chamber and includes a plurality of light-emitting segments arranged side by side in a predetermined direction of the vehicle, wherein the illumination controller is configured to change an illumination state of each of the plurality of light-emitting segments, and wherein upon the vehicle detecting the target object, the illumination controller changes the illumination state of at least one of the left-side communication support lamp and the right-side communication support lamp in correspondence to a relative positional relation between the vehicle and the target object.

13. The vehicle illumination system according to claim 12,
wherein the at least one lamp includes:
a low beam lamp configured to emit a low beam toward a front of the vehicle; and
a high beam lamp configured to emit a high beam toward a front of the vehicle.

14. The vehicle illumination system according to claim 12,
wherein the illumination controller is configured to control the illumination state of the communication support lamp so that the communication support lamp is to function as a daytime running lamp.

15. The vehicle illumination system according to any claim 12,
wherein each of the plurality of light-emitting segments include:
a first light-emitting element configured to emit light of a first color;
a second light-emitting element configured to emit light of a second color; and
a third light-emitting element configured to emit light of a third color,
wherein the first color, the second color and the third color are different, and
wherein the illumination controller is configured to individually control lightings of the first light-emitting element, the second light-emitting element and the third light-emitting element, thereby changing the illumination state of each of the plurality of light-emitting segments.

16. The vehicle illumination system according to claim 15,
   wherein the first light-emitting element is configured to emit red light,
   wherein the second light-emitting element is configured to emit green light, and
   wherein the third light-emitting element is configured to emit blue light.

* * * * *